(12) United States Patent
Hilliard et al.

(10) Patent No.: US 12,461,935 B1
(45) Date of Patent: *Nov. 4, 2025

(54) SYSTEM AND METHODS FOR PROCESS MINING USING INTEGRATED DATA FABRIC

(71) Applicant: Appian Corporation, McLean, VA (US)

(72) Inventors: Matt Hilliard, McLean, VA (US); Jacob Rank, McLean, VA (US); Caroline Brautigan, McLean, VA (US); Amol Shah, McLean, VA (US); John Frederick Lentz, Sterling, VA (US); Adam Glaser, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,373

(22) Filed: Sep. 23, 2024

Related U.S. Application Data

(63) Continuation of application No. 18/652,586, filed on May 1, 2024, now Pat. No. 12,099,518.

(51) Int. Cl.
*G06F 16/26* (2019.01)
*G06F 16/28* (2019.01)

(52) U.S. Cl.
CPC ............ *G06F 16/26* (2019.01); *G06F 16/282* (2019.01)

(58) Field of Classification Search
CPC ...... G06F 16/776; G06F 16/803; G06F 16/26; G06F 16/282
USPC ................................................. 707/776, 282
See application file for complete search history.

(56) References Cited

U.S. PATENT DOCUMENTS

2012/0284258 A1* 11/2012 Liu ..................... G06F 16/2246
707/E17.014

\* cited by examiner

*Primary Examiner* — Baoquoc N To
(74) *Attorney, Agent, or Firm* — Scale LLP

(57) ABSTRACT

The disclosed system and methods relate to guided process mining. A system includes a processor and memory configured to provide a graphical user interface to a user device. The interface includes a user-selectable-parameter element and representations of processes. Upon user selection of a process, a guided investigation is launched based on the current setting of the user-selectable-parameter element. Upon completion of the investigation, a second graphical user interface is provided, configured to present data regarding the process based on user interactions during the investigation. The system also includes methods for process mining using integrated data from multiple systems, and for generating templated objects for process mining.

20 Claims, 58 Drawing Sheets

Add Process

Select a Case Record Type | Select an Event History Record Type | Configure Case Data | Configure Event Data | Configure Process Properties

Select a Case Record Type
Select a record type that stores the core data for your business process.

ALL RECORD TYPES

🔍 Search record type names or descriptions 1300B-2

APPLIED FILTERS  RECORD EVENTS  [Configured  X]  Clear Filters

[SOURCE TYPE ▼] [SOURCE NAME ▼] [RECORD EVENTS(1) ▼]  SORT BY NAME (A TO Z) ▼

1300B-1
PQT Price Quotes
37K rows

Software Features
5.3K rows

1300B

[CANCEL]                                                                    [NEXT]

Create Custom Field

SELECT A TEMPLATE

- A Groups Based on Aggregations — 1300E-1
- A Groups Based on a Range — 1300E-2
- A Groups Based on a Date Difference — 1300E-3

GROUPS BASED ON AGGREGATIONS

Aggregate a field from a one-to-many relationship by calculating the sum, average, count, maximum, minimum, or distinct count. Then, group the data based on the results.

FOR EXAMPLE

Support Cases have a one-to-many relationship with comments, where one support case can have many comments. You want to know which support cases have a "Low", "Medium", or "High" engagement based on the number of comments.

You can use this template to create a custom field called "Case Engagement" so support cases with fewer than 5 comments display as "Low", support cases with 6 to 10 comments display as "Medium", and support cases with more than 10 comments display as "High".

— 1300E-4

| caseId | Count of Comments | Case Engagement |
|---|---|---|
| 10012 | 15 | High |
| 10013 | 7 | Medium |
| 10017 | 0 | Low |
| 10019 | 4 | Low |
| 10020 | 10 | Medium |

5 items

CANCEL     NEXT

Create Custom Field
CONFIGURE VALUES
Aggregate Data
Aggregation Field ⓘ          Aggregation Function Select a field
Aatp Department Goal
Etb Department Team
Etb Engineering Tribe
Fm Feature Product Relationship Join Table    Count of    1300G-1
Plm Software Product
Sr Software Release Synced Custom Field Value
Group 1
Group 2

Filter Values

BACK    CANCEL

Uca Product Use Case
Sr Software Release

Includes Values ≤    Upper limit 1
Includes any remaining values

TEST
Id
Number (Integer)

Id - Number (Integer)
Title - Text
Description - Text
Tags - Text
Submitter - Text
Status - Text
Modifiedby - User
Newsentryid - User
Tribe - Group
Intriagewith - Text ⊞ Custom Field
     Text Click TEST to preview values

NEXT

Create Custom Field

SELECT A TEMPLATE

- Groups Based on Aggregations
- Groups Based on a Range
- Groups Based on a Date Difference

GROUPS BASED ON A DATE DIFFERENCE

Calculate the difference between two date or date and time fields and organize the difference into groups

For Example
You have the fields "submittedOn" and "closedOn", and you want to know which tickets were overdue.

Using this template, you can create a custom field called "status" that calculates the difference between the submitted date and closed date, then displays values as, "On Time" when the difference is less than or equal to 7 days, and "Overdue" if it's greater than 7 days.

| submittedOn | closedOn | status |
|---|---|---|
| 5/1/2022 | 5/12/2022 | Overdue |
| 5/2/2022 | 5/12/2022 | Overdue |
| 5/6/2022 | 5/12/2022 | On Time |
| 5/7/2022 | 5/12/2022 | On Time |

CANCEL    NEXT 1300J-1

Add Process

| Select Case | Select Events | Configure Case | Configure Events | Manage Access |

Search Fields — 1300L-1

🔍 Search dataset...

▸ ⊡ 🗂 123 Order ← 1300L-2
▸ ⊡ 🅰 A Activity ← 1300L-6, 1300L-7
  ⊡ 🗓 Start
  ⊡ 🗓 End
▸ ☐ ⭐ Custom Fields

[ ADD CUSTOM FIELDS ] ← 1300L-3

CONFIGURE PROCESS EVENT DATA

Lorem ipsum dolor Lorem ipsum dolor sit amet, consectetur adipiscing elit, sed do eiusmod tempor incididunt ut labore.

🗒 Rows: 7,500,000    🗒 Cases: 10,100

| Order ⓘ ⋮ Event Log | Activity ⓘ ⋮ Event Log | Start ⓘ ⋮ Event Log | End ⓘ ⋮ Event Log |
|---|---|---|---|
| 1001 | Receive Order | 2022-07-05 2:25 | 2022-07-05 2:25 |
| 1001 | Spread Dough | 2022-07-05 2:40 | 2022-07-05 2:40 |
| 1001 | Add Sauce | 2022-07-05 2:45 | 2022-07-05 2:46 |
| 1001 | Add Toppings | 2022-07-05 2:48 | 2022-07-05 2:50 |
| 1001 | Add Cheese | 2022-07-05 2:51 | 2022-07-05 2:52 |
| 1001 | Bake | 2022-07-05 2:53 | 2022-07-05 2:58 |
| 1001 | Slice | 2022-07-05 3:01 | 2022-07-05 3:03 |
| 1001 | Box it | 2022-07-05 3:04 | 2022-07-05 3:04 |
| 1001 | Delivery | 2022-07-05 3:08 | 2022-07-05 3:22 |

↑ 1300L-4

∨ FILTERS

[ ADD FILTERS ] ← 1300L-5

[ NEXT ]

CANCEL

Add Process

Select a Case Record Type | Select an Event Record Type | Configure Case Data | Configure Event Data | Configure Process Properties

Process Properties ← 1300M-1

Process Name*

Jira Tickets — 1300M-2

Process Description

Process for moving tickets through the SDLC

Manage Process Security

Specify which users or groups can view or perform analysis activities for this process

| User or Group | Permission Level | |
|---|---|---|
| Admin User | | |
| Kelsey Ross Designer X | Analyst ▾ | ✕ |
| ⊕ Add Users or Groups | Viewer ▾ | ✕ |

BACK  CANCEL                                              FINISH CONFIGURATION

Create KPI — 1600D

KPI type
Count

Configuration

Properties

What would you like your KPI to count?

1600D-2 Activities  1600D-3 Sequences  1600D-4 Attributes ← 1600D-1

Count activity [Quote Owner ▾]

Count Format
◉ Absolute Number  ○ Percentage
Count Options
◉ Occurrences of the activity  ○ Cases with activity  ← 1600D-5

KPI Preview

Quote Owner Activity
Count
13,323

[GO BACK]   [NEXT]

SYSTEM AND METHODS FOR PROCESS MINING USING INTEGRATED DATA FABRIC

CROSS-REFERENCE TO RELATED APPLICATION(S)

This application is a continuation of U.S. application Ser. No. 18/652,586, filed May 1, 2024.

The contents of each of the above referenced applications are hereby incorporated by reference in their entirety.

TECHNICAL FIELD

Various aspects of the present disclosure relate generally to systems and methods for process mining and, more particularly, to systems and methods for process mining using ordered insights, integrated data fabric, and closed-loop mining.

BACKGROUND

Process mining is a method of analyzing processes based on data generated by information systems. Traditional process mining platforms extract data from various sources, such as databases, logs, and other systems, to create a visual model of the process flow. These platforms then analyze the model to identify bottlenecks, inefficiencies, and deviations from the ideal process.

However, traditional process mining platforms have several limitations. First, they often require manual intervention to extract and prepare the data for analysis. This can be a time-consuming and error-prone process, especially because process mining typically involves dealing with large volumes of data from multiple sources. Second, traditional platforms typically analyze the data in a static manner, without considering the dynamic nature of processes. This can lead to inaccurate or outdated insights. Third, traditional platforms often lack the ability to incorporate additional data sources, such as external data or data from other parts of the organization, into the analysis. This can limit the depth and breadth of the insights that can be derived from the process mining.

Traditional data mining platforms are limited to insights related to factors captured in the initial dataset, as traditional data mining platforms usually require a lengthy and error-prone data gathering step. Moreover, the data gathering step must be redone every time an additional factor needs to be included in the analysis, or when a new analysis is desired (as underlying data generally changes/updates on a much more frequent timetable).

Traditional data mining platforms usually also require complex and cumbersome setup and configuration processes in order to run a particular data mining operation. This limits the accessibility and speed of data mining, particularly on an otherwise low code or no code platform with users who may not be versed in data science or coding of mining operations. This setup process also introduces errors when setting up complex process mining investigations, leading users to miss potential factors or insights, and decreasing the usability and value of the results.

Furthermore, traditional process mining platforms typically provide a list of potential issues or insights, but do not prioritize or rank these insights based on their potential impact or relevance to the goals of the process, and may not account for relevant data that is associated with the data being analyzed but is not in the analyzed dataset. This can make it difficult for users to identify the insights that are the most valuable or actionable. Additionally, these platforms do not provide a way to simulate the potential impact of changes to the process, making it difficult for users to make informed decisions about process improvements.

Moreover, traditional process mining platforms usually require complex and time-consuming data engineering processes to ingest data for process mining. For instance, data scientists and/or engineers may be required to process, correlate, and synthesize data across numerous data files (e.g., csv files or other logs or log files) to generate process mining data.

Therefore, there is a present demand for a more efficient, dynamic, and goal-oriented process mining platform that can automatically extract and analyze data from various sources (including data associated with but not used in the process being mined), efficiently set up new process mining investigations, prioritize insights based on their potential impact, and simulate the potential outcomes of process changes.

The present disclosure is directed to overcoming one or more of these above-referenced challenges.

SUMMARY OF THE DISCLOSURE

According to certain aspects of the disclosure, systems, methods, and computer readable memory are disclosed for process mining.

In some cases, a system for guided process mining may include: at least one processor; and at least one memory configured to store instructions that, when executed by the at least one processor, cause the at least one processor to perform operations. The operations may include: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

In some cases, a computer-implemented method for guided process mining may include: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

In some cases, a non-transitory computer readable medium may store instructions that, when executed by at least processor, cause the at least processor to execute a method for guided process mining. The method may include: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

In some cases, a system for process mining using an integrated set of data from one or more systems may include: at least one processor; and at least one memory configured to store instructions that, when executed by the at least one processor, cause the at least one processor to perform operations. The operations may include: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

In some cases, a computer-implemented method for process mining using an integrated set of data from one or more systems may include: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

In some cases, a non-transitory computer readable medium may store instructions that, when executed by at least processor, cause the at least processor to execute a method for process mining using an integrated set of data from one or more systems. The method may include: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

In some cases, a system for generating templated objects for process mining may include: at least one processor; and at least one memory configured to store instructions that, when executed by the at least one processor, cause the at least one processor to perform operations. The operations may include: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

In some cases, a computer-implemented method for generating templated objects for process mining may include: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

In some cases, a non-transitory computer readable medium may store instructions that, when executed by at least processor, cause the at least processor to execute a method for generating templated objects for process mining. The method may include: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

Figure 10B:
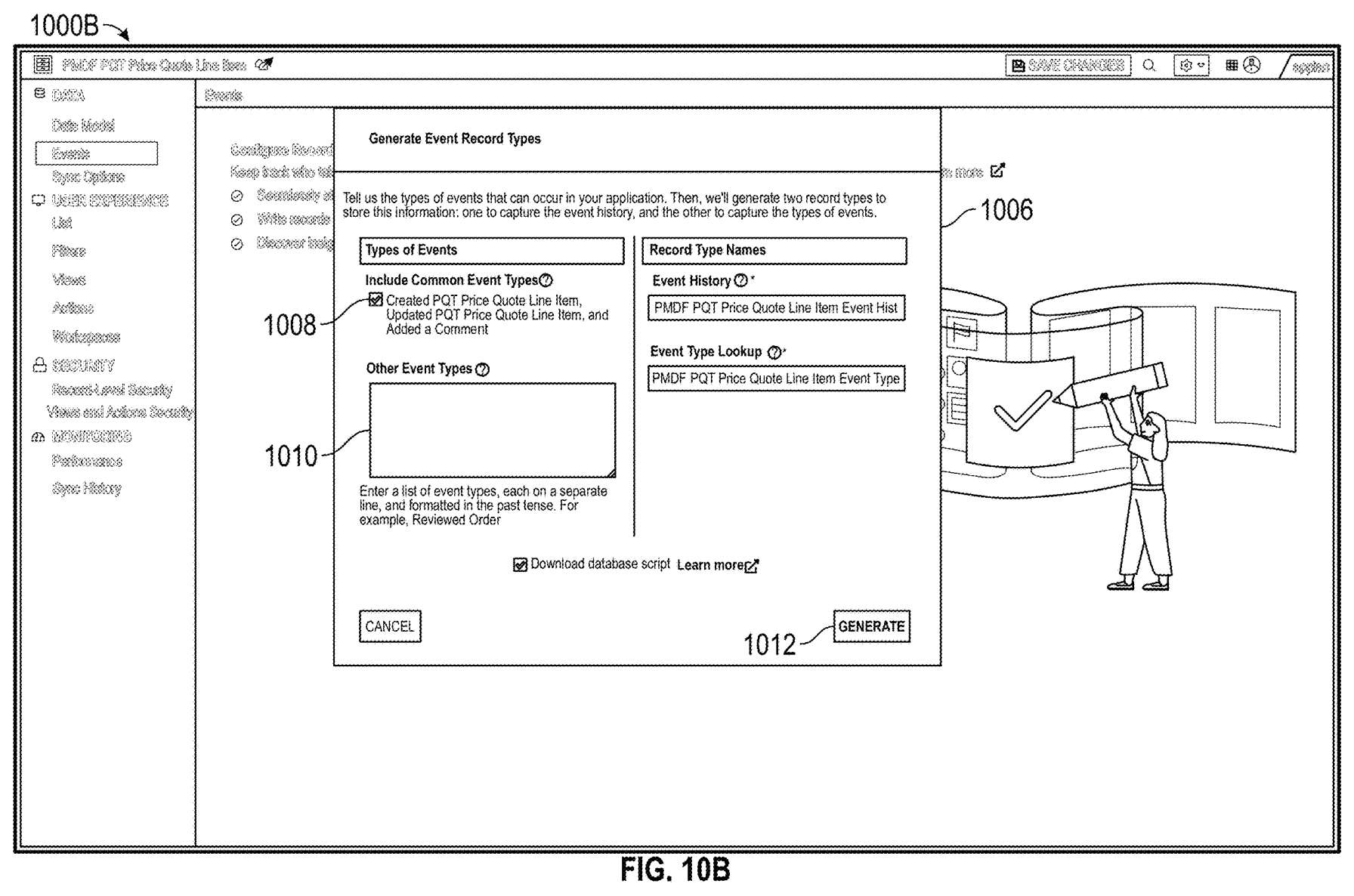
Figure 10C:
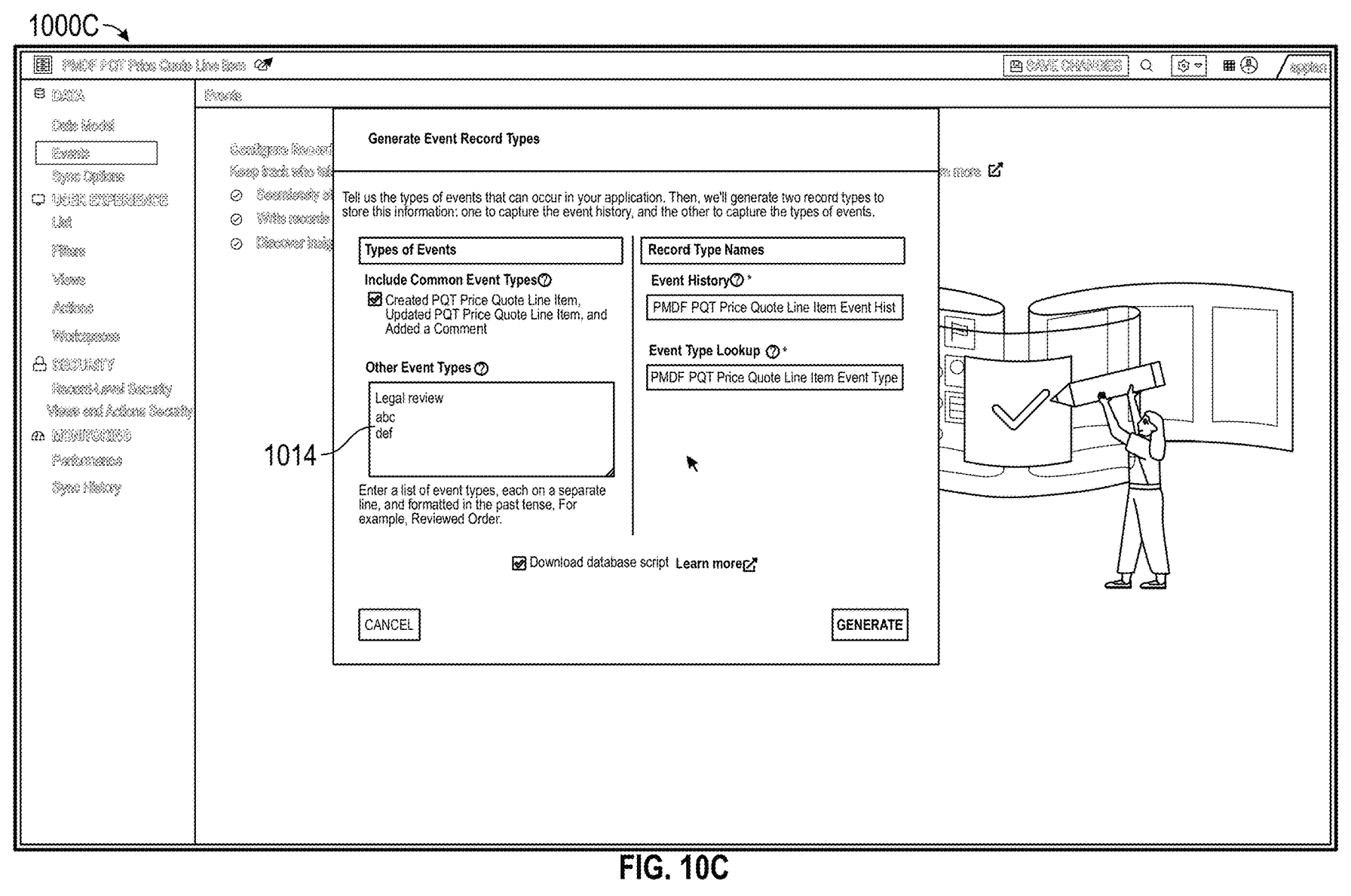

FIGS. 10A-10G depict graphical user interfaces for closed-loop mining using generated objects.

FIGS. 13A-13M depict graphical user interfaces for process mining using an integrated data fabric.

DETAILED DESCRIPTION

In general, the present disclosure is directed to methods and systems for process mining using ordered insights, integrated data fabric, and closed-loop mining.

As discussed herein, users of the platform 105 may define software processes using low-code or no-code to implement user-defined functionality. The functionality may provide different types of services, analysis, development capabilities, and software processes which may be related to business processes. In general, each time a software process is invoked or node of a software process is invoked, the execution of the software process may assign an identifier, so that the software process may differentiate executions between at least two executions (and generally among a plurality of executions). The at least two executions may be executed at the same or different periods of time, and the like. In some cases, the identifier may be a case identifier (e.g., for a single execution of the software process), a software process identifier, a user identifier (e.g., that initiated a process, performed an action within the process, or updated a record of a process, etc.), or a system identifier (e.g., that performed an automation).

Moreover, as discussed herein, the platform 105 may enable users to perform an investigation of a software process. An investigation may provide, in an iterative fashion, filters to a set of data used by a software process to identify factors that impact the software process. The investigation may utilize closed loop mining records, an integrated data fabric, and dynamic factor determination in process mining to enable a user (e.g., an analyst) to determine factors that impact the software process and to take steps, in the real world or by modifying the software process, to improve the efficiency, time, cost, and like, of the software process. Process mining may be a process to analyze data associated with, and often created as part of, a sequence of events, actions, or data inputs or updates in one or more software processes, which may be associated with a business process. Process mining may enable users to generate insights about the sequence, the actions, or the data inputs or updates in one or more software processes.

Environment

Figure 1:
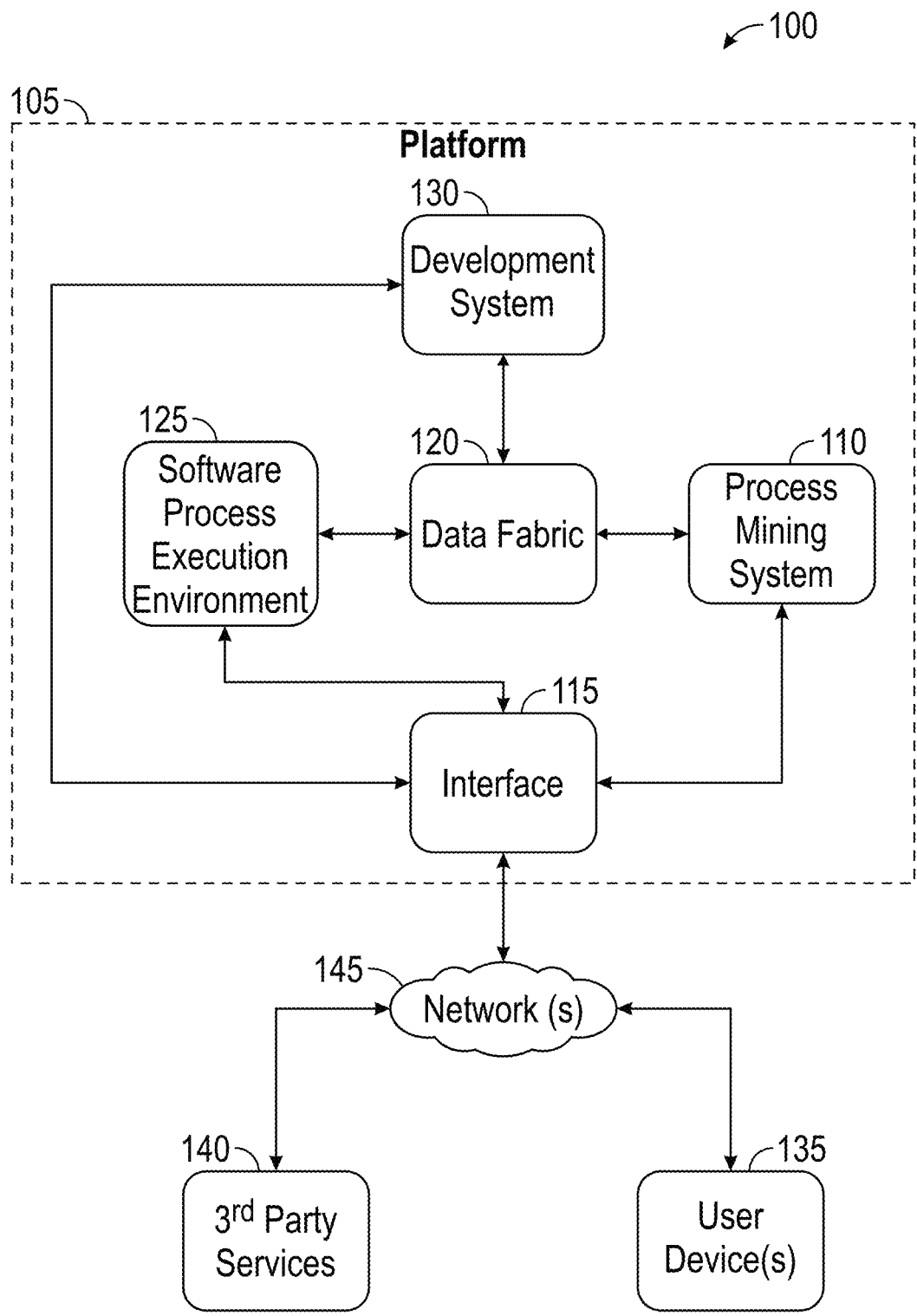
FIG. 1 shows an example environment for process mining using ordered insights, integrated data fabric, and closed-loop mining.

FIG. 1 shows an example environment 100 for process mining using ordered insights, integrated data fabric, and closed-loop mining. The environment 100 may include a platform 105, user device(s) 135, third party services 140, and network(s) 145. The platform 105 may include one or more of a process mining system 110, an interface 115, a data fabric 120, a software process execution environment 125, and a development system 130.

The user device(s) 135 (hereinafter "user device 135" for ease of reference) may be a personal computing device, such as a cell phone, a tablet, a laptop, or a desktop computer. In some cases, the user device 135 may be an extended reality (XR) device, such as a virtual reality device, an augmented reality device, a mixed reality device, and the like. In some cases, the user device 135 may be associated with a user (e.g., a user of the platform 105, an organization-as-user (or organization user) of the platform 105, an end user of software provided by organization, via the platform 105, or even a third party service invoking actions of a software process) of services provided by the platform 105. For instance, in some cases, users (e.g., employees) or software functions of an organization may use (e.g., invoke) software processes to perform associated functions and actions. In some cases, users (e.g., end users of the organization or organization users), or software functions used (i.e., invoked) by end users may use (i.e., invoke) software processes to perform associated functions or actions. The user may have a user account associated with the user device 135 that uniquely identifies the user (e.g., within the organization and the organization may have an organization account) within the platform 105. In some cases, the user device 135 may be a server or computer system (e.g., a cloud service) associated with the organization, which hosts software or functions for the user/organization. The user device 135 may interact with the platform 105 via graphical user interfaces or application programming interfaces, and the like, as discussed herein.

The network(s) 145 may include one or more local networks, private networks, enterprise networks, public networks (such as the internet), cellular networks, and satellite networks, to connect the various devices in the environment 100. Generally, the various devices of the environment 100 may communicate over network(s) 145 using, e.g., network communication standards that connect endpoints corresponding to the various devices of the environment 100.

The third party services 140 may include external systems, platforms, or services that provide additional data, functionality, or capabilities to or that can be integrated into the platform 105. These services may offer supplementary information that can enhance the data analysis and process mining capabilities of the platform 105. For example, third party services 140 may include customer relationship management (CRM) systems, enterprise resource planning (ERP) systems, financial services, supply chain management tools, external databases, cloud services, artificial intelligence (AI) services, and other data providers or analytics services. The availability of and/or integration of these services allows the platform 105 to access a wider range of data sources, thereby enabling the enrichment of the process mining analysis with external insights and enabling a more comprehensive understanding of the processes being examined.

The platform 105 may be an advanced computational environment designed to facilitate process mining by integrating various subsystems that work in concert to extract, compile, augment, analyze, and refine process-related data. The platform 105 may include a suite of tools and interfaces that enable users to define, monitor, and optimize software processes through a combination of data-driven insights and simulation techniques. The platform leverages an integrated data fabric to seamlessly connect and harmonize data from disparate sources, providing a unified view of process flows and performance metrics. With capabilities such as low-code/no-code process development, automated data extraction, dynamic analysis, and closed-loop mining, the platform 105 empowers organizations and end users to achieve continuous process improvement and operational excellence.

The process mining system 110 may be an analytical tool designed to analyze factors of software processes by leveraging the power of data. The process mining system 110 may operate within the platform 105, which serves as a comprehensive environment for process development (i.e., process definition), execution, and optimization. The process mining system 110 may extract valuable insights from a myriad of data sources, including internal databases, logs, system resources, memory, third-party services, and other types of data sources. By constructing a detailed visual model of the process flow, the process mining system 110 may identify and prioritize potential issues, inefficiencies, and deviations, offering users actionable insights that are ranked based on their impact and relevance to the process goals.

The process mining system 110 may integrate the data fabric to collect data from diverse sources, ensuring that users have access to the latest information for analysis. The process mining system 110 also features closed-loop mining capabilities, so that software process development, execution, and event logs are "ready to be mined" as soon as they are created. In some cases, the process mining system 110 enables simulation of process changes and the assessment of potential outcomes. This enables users to make informed decisions about process improvements with an understanding of the implications.

The process mining system 110 may be engineered to address the limitations of traditional process mining platforms by offering a more efficient, dynamic, and goal-oriented solution. It automates data extraction and analysis, prioritizes insights for better decision-making, and supports simulation for a proactive approach to process enhancement. Through these capabilities, the process mining system 110 may facilitate continuous process improvement and help organizations achieve operational efficiency.

The interface 115 may serve as a communication hub that facilitates the exchange of messages, data, and commands between various components of the environment 100. The interface 115 may be designed to interpret the content and purpose of incoming messages and to route them to the appropriate destination component based on predefined routing rules or dynamic conditions. The interface 115 may ensure that messages are delivered in a secure, reliable, and efficient manner, maintaining the integrity and confidentiality of the information being transmitted. Additionally, the interface 115 may provide logging and monitoring capabilities to track the flow of messages and to assist in troubleshooting and performance optimization.

The data fabric 120 may facilitate the integration and harmonization of data from a multitude of sources, both internal and external to the platform 105. The data fabric 120 may serve as a centralized layer that abstracts the complexity of underlying data structures, enabling seamless access and manipulation of data across various systems and services. The data fabric 120 may employ advanced virtualization techniques to create a unified and coherent view of data, irrespective of its original format or location, thus empowering users to perform process mining with greater depth and accuracy.

By leveraging the data fabric 120, the platform 105 can dynamically aggregate, correlate, augment, and present data in a manner that is both meaningful and actionable for users engaged in process mining activities. The data fabric 120 may support the construction of investigation pipelines that can include custom data fields and complex nested relationships, thereby enriching the process mining analysis with comprehensive insights. This integrated approach ensures that users can derive a holistic understanding of software processes, identify bottlenecks, and uncover opportunities for optimization without being hindered by data silos or disparate systems.

Furthermore, the data fabric 120 may be equipped with robust identity and access management capabilities, ensuring that data access is governed by strict security policies and that sensitive information is protected. The data fabric 120 may not only simplify process mining (by reducing data migration and/or export) but also may enhance the quality and reliability of the insights generated, thereby contributing to informed decision-making and strategic process improvements.

The software process execution environment 125 may serve as a dynamic and scalable platform for the execution and management of software processes within the platform 105. The software process execution environment 125 may be designed to handle the complexities of running multiple software processes concurrently, each potentially with its own set of variables, execution paths, and user interactions. The software process execution environment 125 may provide a robust infrastructure that supports the execution of software processes defined using low-code or no-code methodologies, enabling users to rapidly deploy and iterate on software processes.

The software process execution environment 125 may include a set of components that work together to ensure efficient and reliable process execution. These components may include a task manager, executors, datastores, a frontend, and a software process database. The task manager orchestrates the distribution of tasks to executors, which are responsible for carrying out the computational work associated with process nodes. Datastores serve as repositories for the variables and state data of software processes, providing persistence and statefulness to the execution environment.

The frontend component acts as an interface between the user devices and the execution environment, facilitating user interactions such as starting, interacting with, monitoring, and modifying software processes. It may also provide tools for defining and configuring software processes, leveraging the development system's capabilities to enable users to create and update software processes with ease.

The software process execution environment 125 may be designed to be elastic and scalable, capable of adjusting its compute and storage resources to meet the demands of the software processes it hosts. This elasticity ensures that the environment can handle varying loads, from a few simple processes to complex, high-volume process executions.

In some cases, the software process execution environment 125 may provide computational power and infrastructure to support the process mining capabilities of the platform 105. The software process execution environment 125 may enable the seamless execution of user-defined software processes, support dynamic analysis, and contribute to the closed-loop mining approach, which is one feature that sets the platform 105 apart from traditional process mining solutions.

The development system 130 may facilitate the creation, configuration, and deployment of software processes tailored to the specific requirements of a user/organization. The development system 130 may provide a user-friendly environment where users can define software processes using low-code or no-code methodologies, enabling rapid development and customization without the need for extensive programming knowledge.

The development system 130 may include a set of software modules and datastores that cooperate to streamline the software process development lifecycle. The development system 130 may include a template module for initiating object templating subroutines, an update module for validating and updating seed data, and an object generator module for generating and deploying objects based on production data. The development system 130 may also feature a user environment that interacts with users through graphical user interfaces, allowing them to select, modify, and generate user-defined software processes.

The development system 130 may be designed to support the generation of objects that are both standardized and customizable. The development system 130 may enable users to create objects that conform to organizational standards while also allowing for the creation of account-specific and composite objects that address the design requirements of different user groups or organizational units.

Furthermore, the development system 130 may be equipped with a set of datastores that manage the lifecycle of generated objects, from their inception to deployment and reuse. These datastores include a register datastore for tracking object generation requests, an object template datastore for managing object templates, a conflict datastore for resolving naming and functional conflicts, and a generated object datastore for facilitating the reuse of generated objects.

The development system 130 may also enable consistent and usable data for process mining. For instance, by enforcing the action of writing to event logs, the development system 130 facilitates closed-loop process mining, from software process development to process mining insight. Moreover, the development system 130 may increase data accuracy, and reduce human-in-the-loop errors.

Software Process Execution Environment

Figure 2:
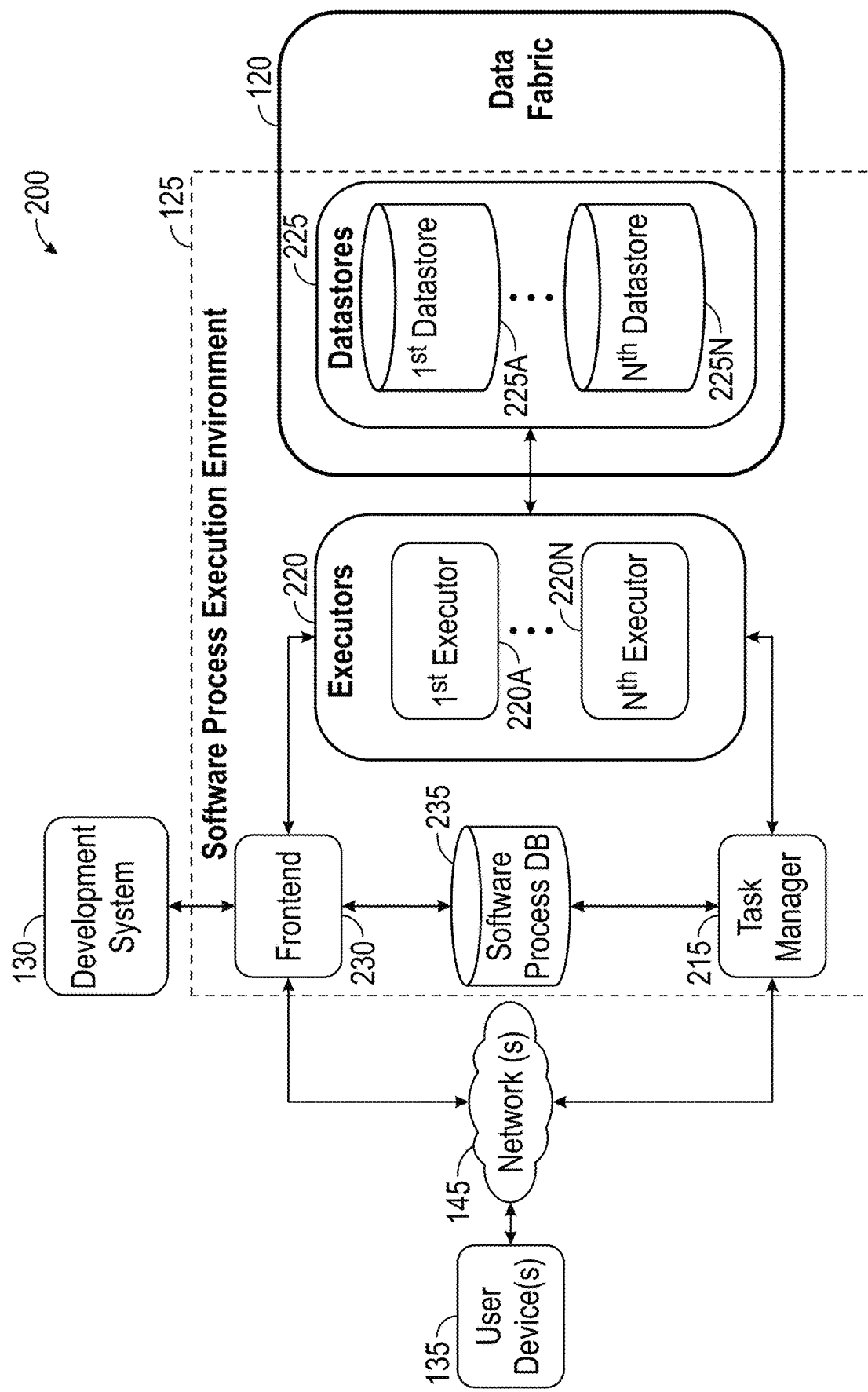
FIG. 2 shows a block diagram of a software process execution environment.

FIG. 2 shows a block diagram 200 of a software process execution environment 125. The features of FIG. 2 may apply to any of 1, 3, 4, 5, 6A-6B, 7, 8A-8B, 9A-9B, 10A-10G, 11, 12A-12B, 13A-13M, 14, 15A-15C, 16A-16R, and 17. The block diagram 200 may depict the user device(s) 135 interacting, via the network(s) 145 and the interface 115, with the software process execution environment 125. In some cases, the software process execution environment 125 may include a task manager 215, executors 220, datastores 225, a frontend 230, and a software process database 235. In some cases, the software process execution environment 125 may interact with the development system 130. In some cases, the software process execution environment 125 may interact with data fabric, including, for example, by interacting with the datastores 225.

Generally, the software process execution environment 125 may interact with users to generate, via the development system 130, user-defined software processes and execute the user-defined software processes in the software process execution environment 125. In some cases, the user-defined software processes may be executed in user or third-party hosted environments. In some cases, the software process execution environment 125 may have a compute layer, a storage layer, and a task manager, each of which can scale independently. Software processes, including starting a software process, may be abstracted as tasks that executors use to advance software processes. For instance, an executor may: pull a next task (e.g., query and receive) from a sub-group (e.g., from the task manager 215); retrieve a portion of code corresponding to the next task (e.g., from the software process database 235); execute the portion of code (e.g., retrieve data for one or more variables from local cache or a datastore 225, perform computations or inferences on retrieved data) to generate an updated variable or new variable; store, record, or output the updated variable or new variable (e.g., in cache or datastore 225, or to a separate system). The storage layer may persist in the process state, both external (e.g., variables of a software process) and internal (e.g., variables within the software process execution environment 125).

The frontend 230 may be a personal computing device, a server, a system of servers, a set of compute instances in the cloud (e.g., hosted by a cloud service provider), and the like. In some cases, the frontend 230/the interface 115 may interact with user devices to receive user inputs regarding software processes; and add, update, or delete software processes based on the user inputs regarding software processes, as discussed herein with the development system 130. See FIG. 4. For instance, the frontend 230/the interface 115 may manage user interactions and transmit the user interactions to the development system 130, which hosts a software process development environment to enable users of user devices 135 to define, configure, and/or update software processes. In some cases, the platform 105 may enable the users to define software processes using a no-code or low code process.

Generally, the software processes, each individually, may be configured to be represented in an object-based model. In some cases, the object-based model may be a graphical model. See, e.g., FIG. 3. An object-based model for a software process may include at least one process node, a set of process nodes (e.g., any of 1 to N nodes), and/or a plurality of process nodes. The plurality of process nodes may include at least a first process node and a second process node. Each of the process nodes of the plurality of process nodes may correspond to a software subroutine. A software subroutine may include a discrete portion (or portions) of software executable code that advance a software process. In some cases, at least a first set of the plurality of process nodes, in accordance with software subroutines, may retrieve and perform operations on values of variables associated with the software process.

In some cases, the frontend 230 may initiate specific software processes in response to triggering conditions associated with the specific software processes. In some cases, the triggering conditions may be defined by designer of the model (e.g., the end-user performing some action through a user interface, such as inputting data or submitting a form, or upon exceeding some threshold time after the end of a previous event) or determined or suggested by the software process execution environment 125. In some cases, the triggering conditions may be (1) time-based, and/or (2) event-based. A time-based trigger condition may initiate the specific software process at a set interval (e.g., every day or hour and the like) or some elapsed period after the completion of a previous action or node. An event-based trigger condition may initiate the specific software process in response to (1) a request from a user device 135 (e.g., an end-user's device or a server of the organization), (2) a request from a different software process, (3) a request from a third-party server (e.g., a different service associated with or provided to the organization), and/or (4) a detection of a change in data stored in the datastores 225.

The software process database 235 may be a structured or unstructured database or other data storage system (e.g., time series database, data lake, etc.). The software process database 235 may store software processes for users/organizations. The software process database 235 may provide (all or subroutines of) software processes to the executors 220, so that the executors 220 may execute tasks associated with nodes of the software processes. In response to instructions from the frontend 230, the software process database 235 may add software processes, update software processes (e.g., modify subroutines, arrangement of process nodes, etc.), or delete software processes or process nodes. The software process database 235 may store and manage the software processes in association with user or organization identifiers. The software process database 235 may restrict access to specific users (or groups of users) and/or specific organizations.

The executors 220 may be zero, one, or a plurality of executors. The executors 220 may be a compute layer for the software process execution environment 125. The executors 220 may be configured to execute tasks associated with software processes. The tasks may be entire subroutines or parts of subroutines (e.g., loop instances, recursive instances, or parallel parts of a subroutine associated with a process node). The executors 220 may be elastic and/or stateless. An executor of the executors 220 may be a single-tenant compute instance (i.e., associated with a single user or organization). In some cases, the executors 220 may be a set of virtual machines (VMs). For instance, the VMs may be java virtual machines (JVMs). In some cases, the executors 220 may consume work requests from a work requests queue (e.g., managed by the task manager 215). In some cases, the executors 220 may be expression-evaluation environments that load (in-memory) types, usernames, rules, functions, smart services (a process node with a specific functionality and whose attributes can be specified by the designer), etc. referenced by the tasks the executors 220 consume.

In some cases, the executors 220 may, based on executor load (e.g., software process load, metrics of individual executors, metrics of software processes, etc.) and other factors, add or remove executors from the software process execution environment 125. Thus, the executors 220 may include zero, one, or a plurality of executors, as the load on the software process execution environment 125 increases or decreases. As depicted in FIG. 2, the executors 220 may include a first executor 220A through a Nth executor 220N, where the number of executors, N, is determined based on the load. As the load increases, new executors may be added to distribute process load across all executors of the executors 220. In some cases, new executors may receive tasks from existing executors. As the load decreases, existing executors may migrate tasks to remaining executors and end decommissioned executors. In some cases, migrated tasks may be moved between VMs on the same compute instance (e.g., server), or between VMs on different compute instances (e.g., servers).

For a specific initiation of a software process on the software process execution environment 125, the software process execution environment 125 may determine a subset (e.g., all, or less than all) of executors 220 to execute tasks associated with one or more of the plurality of process nodes of the software process. The other (if any) executors of the executors 220 may execute tasks associated with other (if any) software processes.

The datastores 225 may be zero, one, or a plurality of datastores, such as structured or unstructured databases or other data storage systems (e.g., time series databases, data lakes, etc.). The datastores 225 (e.g., "a first datastore") may be a storage layer for the software process execution environment 125. The datastores 225 may be configured to store values of variables associated with software processes. The datastores 225 may be elastic and/or stateful. In some cases, the datastores 225 may be multi-tenant cloud storage systems (e.g., relational, in-memory, NoSQL, etc.). In some cases, the datastores 225 may be a set of database tables.

The datastores 225 may be exposed to executors 220 through a key-value application programming interface (API) to abstract the storage implementation in a storage layer. In some cases, the datastores 225 may be configured to store design and runtime information for both user (or organization) and system data. For instance, the datastores 225 may store software subroutines (of the object-based model from the software process database 235), process variables (variables accessible to any node in a software process), node variables (variables accessible to a particular node in a software process), internal state data associated with the particular attributes of a running process, error and debugging information, and/or statistical information or aggregate data about running or completed processes. Process executors may retrieve any of the following types of data, or any other data associated with one or more processes, by providing the appropriate key to the API to retrieve the data (i.e., value) from the datastore.

In some cases, the datastores 225 may, based on system load (e.g., storage load, software process load, etc.) and other factors, add or remove datastores from the software process execution environment 125. Thus, the datastores 225 may include zero, one, or a plurality of datastores, as the load on the software process execution environment 125 increases or decreases. As depicted in FIG. 2, the datastores 225 may include a first datastore 225A through a Nth datastore 225N, where N is determined based on the load. As the load increases, new datastores may be added to distribute input/output process time and/or distribute storage size across all N datastores of the datastores 225. In some cases, new datastores may receive migrated data from existing datastores. As the load decreases, existing datastores may migrate data to remaining datastores and decommission existing datastores. In some cases, migrated data may be moved between datastores on a same storage device, or between datastores on different storage devices.

The task manager 215 may assign process nodes or tasks of process nodes to specific executor(s) of the plurality of executors. The means by which the assignment is conducted is by examining the information contained in a work request. A work request is a message sent from either the frontend 230 or one of the executors 220 to the task manager 215 that contains all information required by one of the executors 220 to carry out at least one task associated with at least one process node. In some cases, the task manager 215 may assign the first process node to a first executor of the plurality of executors, such that tasks associated with the first process node will be executed by the first executor, and assign the second process node to a second executor of the plurality of executors, such that tasks associated with the second process node will be executed by the second executor. In this manner, the software process execution environment 125 may execute the software process that was initiated by the frontend 230.

When executing the initiated software process, the software process execution environment 125 may: execute, using the first executor, a first set of tasks associated with the first process node. In this case, the executing of the first set of tasks may cause at least a first value of the variables associated with the software process to be modified in the first datastore. Moreover, when executing the initiated software process, the software process execution environment 125 may: execute, using the second executor, a second set of tasks associated with the second process node. In this case, the executing of the second set of tasks may cause at least the first value of the variables associated with the software process to be again modified in the first datastore. In some cases, the task manager 215 may assign process nodes or tasks thereof in various methods, such as based on storage load or executor load, and the like.

In some cases, the task manager 215 may include a set of partitioned message queues (e.g., Kafka® topics). In these cases, a work request may be enqueued onto a partition of a message queue. That work request will eventually be consumed by an executor, resulting in the evaluation of some amount of software code (which could correspond to less code than is required to evaluate a single process node or correspond to the code for multiple process nodes). The executors consume work requests to advance individual software processes. A set of executors may cooperate to consume work requests from a specific topic. The number of partitions in a topic may determine a level of parallelism in the software process execution environment 125. At any given time, one partition may be consumed by exactly one executor, while multiple partitions may be consumed by a single executor. When work requests can be parallelized, the task manager 215 may enqueue (i.e., assign) work requests to different partitions (whether in random fashion or by algorithmically assigning specific work requests to specific partitions). Work requests are consumed sequentially from a single partition. The order in which they are consumed corresponds to the order in which they are enqueued on the partition. The elastic executors 220A-N may enqueue related (i.e., using the same variables or having one be dependent in some way on the other) or unrelated work (i.e., not using the same variables and not being dependent in some way on the other) requests on a single partition. Because work requests are consumed sequentially, the execution of work requests enqueued later on a single partition will be delayed relative to the execution of work requests earlier in the queue. In these cases, software process metrics and/or executor metrics may re-balance work requests, either those already assigned or incoming work requests.

In some cases, the task manager 215 may, in response to an instruction to execute the software process (e.g., from the frontend 230), generate a plurality of tasks based on the plurality of process nodes. To assign a first set of tasks to the first executor 220A and a second set of tasks to the second executor (e.g., the Nth executor 220N), the task manager 215 may be configured to, based on load-balancing rules: assign the first set of tasks to a first sub-group of a first group and assign the second set of tasks to a second sub-group of the first group. The first executor 220A may be assigned to pull pending tasks from the first sub-group, and the second executor (e.g., the Nth executor 220N) may be assigned to pull pending tasks from the second sub-group. In some cases, the load-balancing rules may be configured to assign the plurality of tasks to sub-groups based on (1) dependencies between the process nodes, (2) number of already assigned tasks for each sub-group, (3) compute resources being utilized by the executors, (4) throughput/latency metrics of the executors, and (5) throughput/latency metrics of the software process.

To generate the plurality of tasks based on the plurality of process nodes, the task manager 215 may be configured to: generate at least one task for each process node of the plurality of process nodes. In the case that a process node is indicated to be a parallel process node or a multi-task process node, the task manager 215 may be configured to: generate at least two tasks for the process node. In some cases, the two tasks may be processed on different threads of the same executor. In some cases, the two tasks may be processed on different executors.

Object-Based Model

Figure 3:
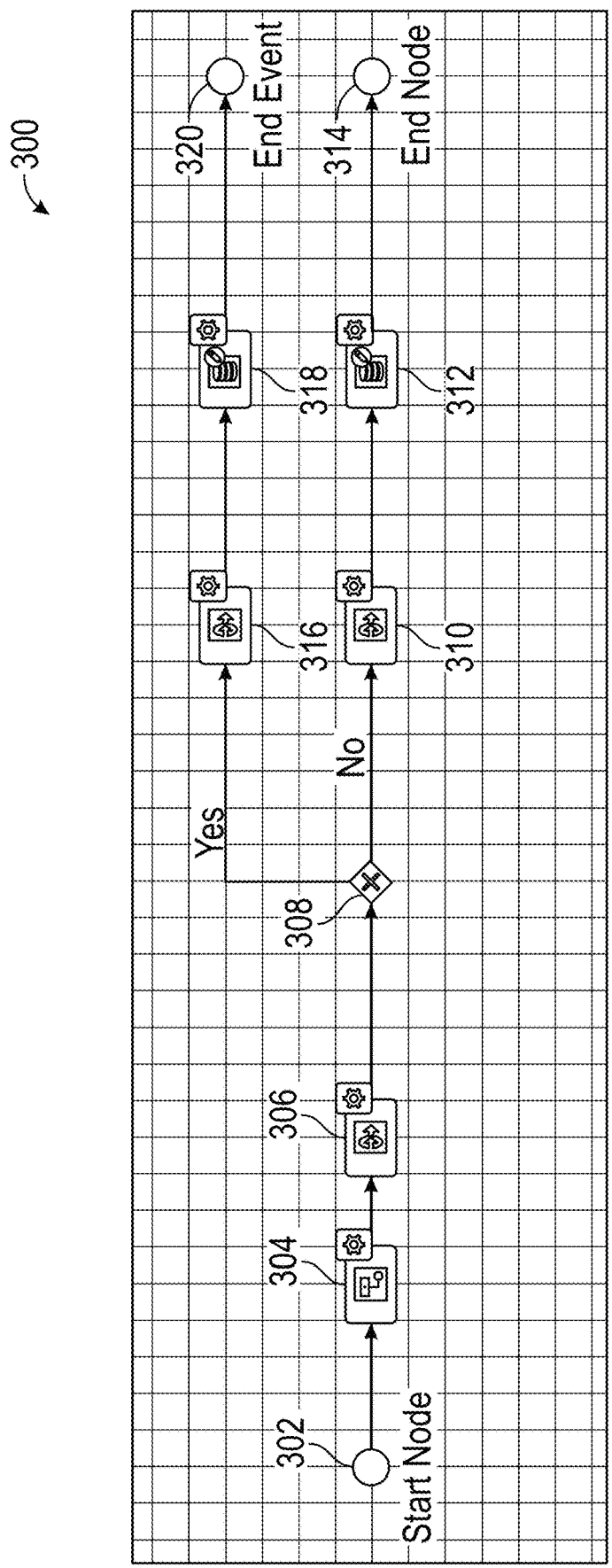
FIG. 3 depicts a diagram schematically showing an object-based model comprising a plurality of process nodes.

FIG. 3 depicts a diagram schematically showing an object-based model 300 comprising a plurality of process nodes 302-320. The features of the object-based model 300 of FIG. 3 may apply to FIGS. 1, 2, 4, 5, 6A-6B, 7, 8A-8B, 9A-9B, 10A-10G, 11, 12A-12B, 13A-13M, 14, 15A-15C, 16A-16R, and 17.

The object-based model 300 may be a graphical model stored in the software process database 235. The nodes of the object-based model 300 may correspond to software subroutines of the software process.

The plurality of process nodes 302-320 may include, at least, a start node 302, at least one end node 314/320, and optionally may include one or more intermediate nodes 304-312 and 316-318.

The start node 302 may initiate the software process. For instance, the start node 302 may be associated with the triggering conditions to start the software process. In response to a trigger condition initiating the software process, the start node 302 may cause the assigned executors of other nodes, such as at least one of the one or more intermediate nodes 304-312 and 316-318, to retrieve and store (e.g., in the first datastore 225A) associated code and/or connections (e.g., pointers to local caches or API key values for software process variables) (collectively, "preparation actions"). In some cases, additionally or alternatively, the start node 302 may be a timing mechanism to facilitate later determination of, for instance, metrics associated with the executor and/or the software process (e.g., how long the process runs, on average). In the case that the preparation actions are handled by the software process execution environment 125, the start node 302 may solely perform the timing mechanism.

The at least one end node 314/320 may end the software process. For instance, the end node 314 or the end node 320 may indicate an end of the timing mechanism of the software process. The end node 320 may also indicate to the executor 220A-N that the software process has ended. In some cases, the software process may include end nodes that indicate an end at different points in time (e.g., for branches that are not exclusive) and each branch may end at different points in time. In some cases, the software process may include end nodes that indicate an end of the entire software process, even if other branches of the process were still being executed.

The one or more intermediate nodes 304-312 and 316-318 may perform various functions. For instance, tasks of the intermediate nodes' executors may be to perform one or combinations of: (a) retrieving a first set of values for the variables of the first software process and/or retrieve data from a different system (collectively, input data); (b) performing a function to (1) transform the input data, (2) determine a logical result of a logical expression on the input data, and/or (3) infer one or more inferences based on the input data (collectively, output data); and (c) storing the output data as a new value of a specific variable, store the output data as a value of a newly instantiated variable of the first software process, and/or create, update, or delete a record.

For instance, to retrieve the first set of values, the task may determine whether to access a local cache or the datastores 225A-N, and retrieve data therefrom, or it may determine the value of an input to an expression by evaluating an expression specified by the designer in an expression language. In some cases, the task may determine the need to access other systems (e.g., third party systems or systems associated with the software process execution environment 125). For instance, node 304 may retrieve data associated with an event that triggered the software process depicted in FIG. 2.

In some cases, a node may transform data in the software process. For instance, node 306 may transform input data into a defined format.

In some cases, a node may determine a logical result based on variables of the software process. For instance, node 308 may determine which branch (or multiple branches) to take based on values of the variables of the software process. A logical expression may be arbitrarily complex based on input values and logical operators.

In some cases, a node may determine a calculation (e.g., of a deterministic process) or an inference (e.g., of a machine learning process) based on variables or sets of variables retrieved in earlier steps. For instance, node 316 may determine a calculation, while node 310 may determine an inference based on the same or different variables of the software process.

In some cases, a node may store output data as a value of a variable (existing or new) or a record. For instance, nodes 312 and 318 may create or update records with data output by previous nodes. In some cases, intermediate values (e.g., those that do not populate a record during the software process) may be cleared before another software process executes.

In some cases, such as node 310, the task manager 215 may determine several tasks that correspond to the node 310 (e.g., the node may have one or more subprocesses). The several tasks may be performed in sequence (on a same executor) or in parallel (on separate executors or threads thereof), depending on configurations supplied by the designer of the node. For instance, node 310 may perform a loop functionality (e.g., a loop instance) or multiple node instance (MNI) functionality. MNI functionality may repeat the same set of actions multiple times (e.g., with different data, updated data, and the like).

Development System

Figure 4:
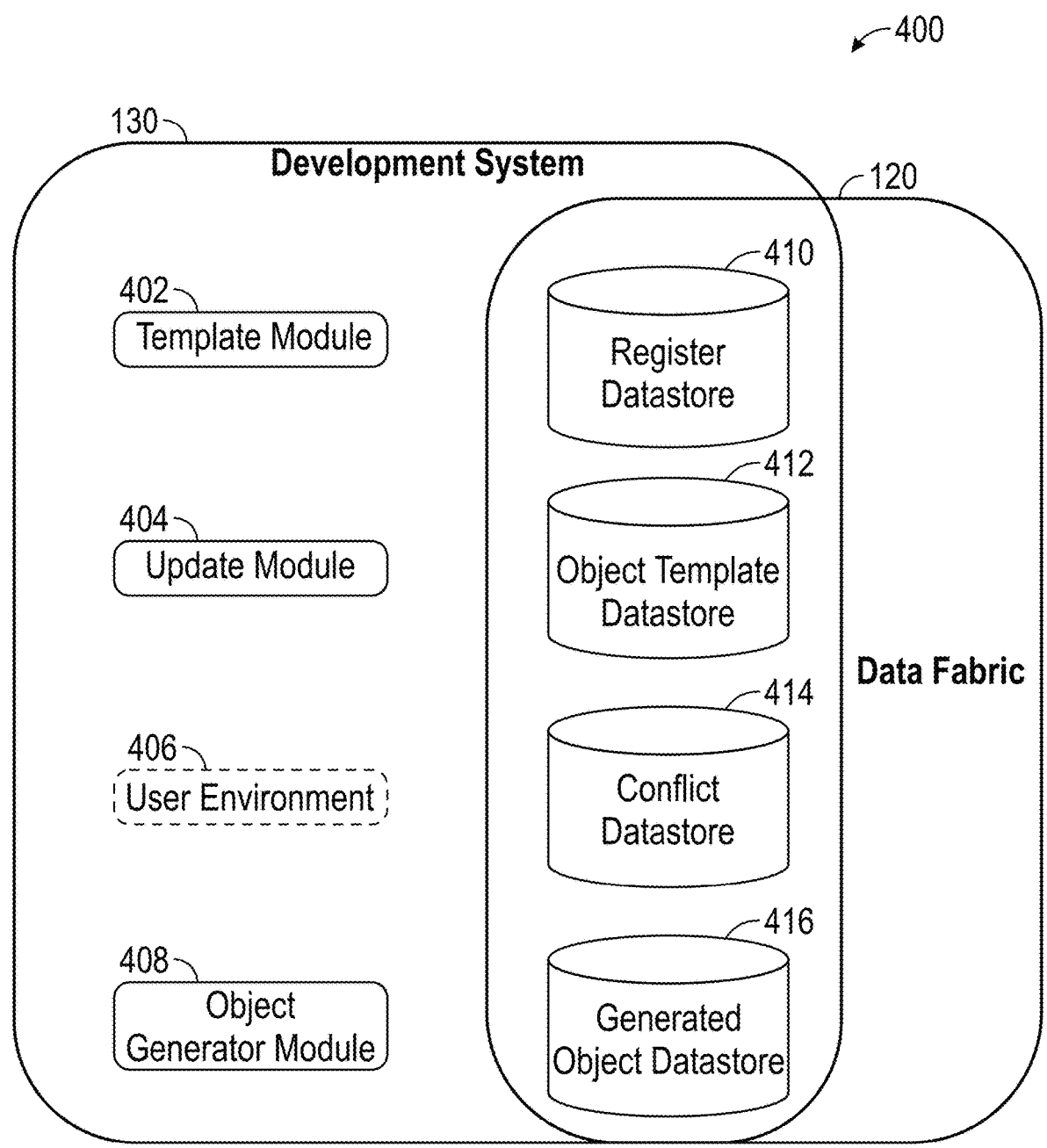
FIG. 4 depicts a block diagram schematically showing a development system for generating objects in a platform.

FIG. 4 depicts a block diagram 400 schematically showing a development system 130 for generating objects in a platform 105. The features of the block diagram 400 of FIG. 4 may apply to FIGS. 1, 2, 3, 5, 6A-6B, 7, 8A-8B, 9A-9B, 10A-10G, 11, 12A-12B, 13A-13M, 14, 15A-15C, 16A-16R, and 17.

As discussed above, the development system 130 may host a software process development environment to add, update, or delete software processes based on the user inputs regarding software processes. For instance, the software process development environment may provide graphical user interfaces for users to interact with the software process development environment to select, modify, and generate user-defined software processes. In some cases, the development system 130 may receive a first request from a user device and obtain a seed file, check the seed file, and generate an object based on seed data of the seed file, as discussed herein. In some cases, the development system 130 may interact with the user via graphical user interfaces to modify aspects of the seed data/features of the object, and then generate the object based on the modified seed data. After the object is generated, the development system 130 may store/transmit the object to various endpoints. In some cases, the object may be transmitted to a user device 135, to allow the object to run locally for the user. In some cases, the object may be transmitted to the software process database 235, so that the object may be stored for future execution in the software process execution environment 125. In some cases, these actions may be referred to as "deploying" the object for run time use. In some cases, the object may be stored in the generated object datastore 416 (see FIG. 4) to facilitate reuse of generated objects, e.g., by account, user, and the like.

In particular, the development system 130 may include a template module 402, an update module 404, and an object generator module 408, and one or more datastores. In some cases, the development system 130 may include a user environment 406; while in other cases, the development system 130 may interact with the user environment 406 hosted on the frontend 230 or the user device 135.

The one or more datastores may include a register datastore 410, an object template datastore 412, a conflict datastore 414, and a generated object datastore 416. The one or more datastores may be structured or unstructured databases or other data storage systems (e.g., time series databases, data lakes, etc.). While the register datastore 410, the object template datastore 412, the conflict datastore 414, and the generated object datastore 416 are depicted in FIG. 4 as separate datastores, the register datastore 410, the object template datastore 412, the conflict datastore 414, and the generated object datastore 416 may be combined or separated in various combinations to store the referenced data.

The development system 130 may host a software process development environment to add, update, or delete software processes based on the user inputs regarding software processes. For instance, the software process development environment may provide graphical user interfaces for users to interact with the software process development environment to select, modify, and generate user-defined software processes. In some cases, the development system 130 may receive a request to initiate an object templating subroutine to generate a user-defined software process. In some cases, the object templating subroutine may automatically populate existing or generate new templated objects with user-defined data (e.g., data provided by the user at design time) or user-associated data (e.g., pre-existing system-generated or user-created data associated with the user and hosted on the environment 125). In response to the request to initiate the object templating subroutine, the development system 130 may obtain a seed file. A seed file may contain seed data relating to an object to be generated. Generally, the seed data may be parameters or values that populate predefined or user-defined fields in a text file with a structured data format (e.g., XML or JSON). In some cases, the development system 130 may transmit the seed file to a user environment. The user environment may be configured to: perform validation and/or update actions to the seed data; and after validating and/or updating the seed data, transmit the validated and/or updated seed data with a request to initiate an object generation subroutine. In some cases, the validation and update actions may automatically check for certain conditions, as discussed herein, and (in some cases allow) the user to modify or change portions of the seed file. The development system 130 may receive the validated and/or updated seed data. In some cases, the development system 130 may receive a request to initiate the object generation subroutine; while in other cases, the development system 130 may automatically determine to initiate the object generation subroutine (e.g., if no user feedback or interaction is a part of a generation process). For instance, the development system 130 may initiate the object generation subroutine based on an instantiation condition. The instantiation condition may result from a user making a selection indicating approval to generate the objects or may result from a trigger condition that occurs without explicit user approval to generate objects (e.g., no conflicts and no further user input required). The development system 130 may, in response to receiving the validated and/or updated seed data and the request to initiate the object generation subroutine, generate objects by performing one or both of: (i) generating one or more new objects; and (11) modifying one or more existing objects.

In some cases, the generated object is a logical unit in a low-code or no-code software development platform. A logical unit may be a software executable version of a software process that includes one or a plurality of software units to perform defined functions (e.g., data retrieval, data manipulation, or data storage). For instance, the logical unit may be an object-based model 300 that corresponds to software subroutines of a software process. In some cases, the generated object is configured to be displayed in a graphical model (see FIG. 3) displaying a plurality of software objects in a software architecture. In some cases, generating the object outputs a portable file configured to be deployed in a plurality of operating environments. For instance, the portable file may be an executable file (or components thereof) to deploy a runtime instance of a software process. In some cases, the development system 130 may be configured to transmit the portable file to the user environment or a user device, and the user environment/user device may be configured to use the portable file to deploy the new object and/or modified existing object.

In some cases, the generated object is at least one of: a standardized object, an account-specific object, and/or a composite object. A composite object may be a combination of at least two objects. A standardized object is one that may be made available to more than one user (based on account settings). An account-specific object may be an object available to some or all users associated with a specific account (for example, when an organization has a plurality of end users associated with the account). In some cases, the environment 125 may determine composite objects may be added as standardized objects or account-specific objects, and the like.

The template module 402 may be configured to obtain a seed file in response to a request to initiate the object templating subroutine. To obtain the seed file, the template module 402 may be configured to: select the object template from a plurality of object templates stored in the one or more data stores. For instance, the template module 402 may select the object template based on a user indication (e.g., by making a selection on a user interface) of a type of action or function to be performed by the object.

In some cases, the plurality of object templates may facilitate the generation of objects that perform a variety of software functions, such as data retrieval, data processing, data computations, data inferences, or data storage actions. In some cases, the plurality of object templates may facilitate the generation of objects that include actions associated with one or combinations of: (1) a default application, (2) a create record action, (3) an update record action, (4) a delete record action, (5) a CRUD (create, read, update, or delete) record action, (6) an event record action, (7) a view record data action, (8) data sync action, (9) a data manipulation function, (10) a data structure action, and/or (11) an event logging function.

The default application may include a pre-defined subset of the various software functions. The create record action may create a new record. The update record action may update data associated with a record. The delete record action may delete an existing record. The CRUD record action may perform one or more of create, read, update, or delete. In some cases, the CRUD and related actions may be performed in bulk. The event record action may generate event records to track changes to records over time. The view record data action may retrieve data from a record and generate a graphic/data for display to users. The data sync action may check that data is synchronized between a first source and a second source, and, if not, update one of the sources (e.g., based on time, sequence, and the like). The data manipulation function may perform arbitrary software functions. For instance, the data manipulation function may perform calculations, check conditions, perform inferences, and the like. The data structure action may create/generate, update, or delete a file, a database, a table in a database, a record in a database, a data structure, and the like.

The event logging function may automatically create event logging records, or create event logging fields within existing records, to be used to store information related to events or actions associated with a software process. The event logging function may thus create (or be associated with) a first record that captures the types of events that will be logged, and create (or be associated with) a second record to capture a history of events of the types specified in the first record. The event logging function may create (or use) event type code to write entries to the first record storing the types of actions that will be logged. The first record may include an identifier for each such entry to map to the second record.

The event logging function may include an event logging code to write an entry to the second record when an event of the type specified in the first record occurs. The second record may store the history of events that occurred (e.g., the log). In some cases, the event logging code may obtain at least a timestamp; an identifier associated with create, write, update, or delete actions (e.g., user ID or process ID); an identifier associated with the event (e.g., event ID); and any user-defined attributes intended by the user to be captured when an event of the type specified in the first record occurs (collectively the "event log data"). The event logging code may then automatically store the event log data in the second record.

In this manner, the user (e.g., a low-code or no-code developer of software processes) does not have to write the code and the system automatically creates the records, the names, and the fields to ensure that event logging works. In this manner, bugs or errors that might be introduced by human coding may be avoided. Moreover, event logs may be enriched by user-defined attributes, thereby enriching process mining.

In some cases, the template module 402 may interact with the register datastore 410 to store and track requests with generated objects/seed files. In this manner, groups of users (e.g., associated under a single organization) may share access to or track generated objects. The object template datastore 412 may store and update the plurality of object templates. The object template datastore 412 may store the object templates according to access rules, such as (1) generally available, (2) only available to certain organizations, and the like.

In some cases, the seed file may contain fields, which constitute metadata, that are to be populated with seed data by the object generation subroutine after the seed data has been validated and/or updated in the user environment. In some cases, the fields may be populated with data provided by the user and/or populated with data associated with the user stored in one or more data stores. For instance, a data source ID, a security group ID, a name field, a function field, and the like may be fields populated from user inputs or account information associated with the user/user device.

In some cases, the seed file may include at least two metadata sections. The two metadata sections may include a first metadata section and a second metadata section. The first metadata section may include identification or description data, and the second metadata section may include object metadata.

In some cases, the seed data may include groups of metadata within the object metadata. Each group of metadata may correspond to a particular object type and contain metadata used to generate or update at least one object. In some cases, each group of metadata may include a trigger subsection and an object metadata subsection. In some cases, the trigger subsection may define dependent object/field relationships. In some cases, based on the trigger subsection, the development system 130 may update a dependent object or field when a parent object (e.g., that has the trigger subsection) is updated.

In some cases, the seed file may further include a third metadata section. The third metadata section may define a user interface model to generate graphical user interfaces that are used to customize object templates. For instance, the third metadata section may define a wizard to customize the seed data. The seed file may not have this section if objects are generated directly from the seed data, which means an action does not support the customization of metadata of the seed data.

In some cases, a trigger subsection may be used to inform dependent objects/fields about changed metadata properties. For example, almost all objects may be secured using groups; in the case when a different group is selected, objects referencing a replaced group must be updated. In some cases, each trigger may include two parts: source section and target section. A source section may represent a customized/changed object.

The target section may represent dependent objects/fields directly/indirectly affected by a change in a source object.

The object metadata subsection may include fields required to generate the portable presentation of an object. The object metadata subsection may have a header section and a specific metadata section. The specific metadata section may include tracking/object uniqueness data in metadata.

Thus, in this manner, seed data of different template objects (alternatively, referred to as template recipes) may be populated using user-provided or system-provided data in a process that ensures: (1) design consistency, (2) increased security, and (3) functional interoperability with the environment 125. Moreover, the process ensures that developers do not have to implement design practices, structure, data population, security, or interoperability with the environment 125.

The update module 404 may perform the validation and/or update actions on a generated seed data of a seed file. In some cases, the validation and/or update actions may determine whether to generate a new object and/or whether to modify or reference/use an existing object. In some cases, the validating and/or updating the seed data/seed file in the user environment may be performed, at least in part, based on design rules established by the environment 125 and configured to enforce best design practices in the user environment. The design rules may be programmatic relationship rules about minimum data fields for objects, metadata, and the like; types of data in fields; data formats for fields; types of actions that can be sequenced together, and the like.

In some cases, the validating and/or updating the seed data/seed file in the user environment may be performed, at least in part, based on user inputs received by the user environment via a graphical user interface. In some cases, the user inputs may be user intentions (e.g., a type of action or file to generate as part of a software process). In some cases, the user inputs may indicate specific actions to perform or records/file/databases to update.

To perform the validation and/or update actions, the update module 404 may deconflict objects, functions, fields, or names of the seed data with existing data associated with the environment 125. In some cases, the deconflict process may check environment-wide data (e.g., root variables and the like) or check account specific data (e.g., deployed objects, security groups, variables, record, databases, and the like) against the seed data; and if a conflict is found, recommend an alternative name or recommend a replacement to use for the existing object found whose name conflicts with the seed data. In some cases, the deconflict process may perform one or combinations of: (1) a name deconflict process, (2) a reusable object process; (3) an authorization process; and/or (4) a customization process. Other deconflict processes may include URL deconflicts, uniqueness of containment relationship, and/or valid values/ properties (e.g., for graphics or charts, such as a PIE chart may only have one measure; table names must adhere to naming conventions, such as maximum length). The user environment 406 may store the seed data of the seed file. The user environment 406 may update the seed data in accordance with instructions from the update module 404/user device 135.

In some cases, the seed file may include one or more proposed objects, and the request to initiate the object templating subroutine may be associated with a user account (e.g., by user ID or user credentials of the request). The user account may be associated with existing objects (e.g., of an organization account).

The update module 404 may retrieve data from, add data to, and remove data from the conflict datastore 414. The conflict datastore 414 may store (1) a set of names of the existing objects, (2) a set of name-function pairs for the existing objects, (3) a security policy associated with the user account, and the like.

To perform the name deconflict process, the update module 404 may: check each name of the one or more proposed objects against the set of names of the existing objects. For instance, the update module 404 may determine that text strings that match between the one or more proposed objects against the set of names of the existing objects and return matching strings (or sub strings of a threshold similarity). If a conflict is determined for a first name of a first object, the update module 404 may generate a new name for the first object. For instance, the update module 404 may automatically replace with the matching name or recommend the matching name.

To perform the reusable object process, the update module 404 may: check each name and function of the one or more proposed objects against the set of name-function pairs for the existing objects. For instance, the update module 404 may determine if text strings of names match and also if the type of objects matches. If a conflict is determined for a first name-function pair of a first object with a matching object, the update module 404 may recommend the first object to be replaced by the matching object. Similarly, the update module 404 may determine whether groups or folders may be re-used and, if so, enforce or recommend re-usable groups or folders.

To perform the authorization process, the update module 404 may: check security groups of the one or more proposed objects against the security policy associated with the user account. For instance, the update module 404 may determine if a user requesting the object has authorization to access certain data or perform certain actions (e.g., delete a record), move data between different environments, and the like. If a conflict with the security policy is determined for a first object, the update module 404 may recommend a set of security groups for the first object. For instance, the update module 404 may recommend authorized groups (e.g., based on the user authorization) or storage locations, and the like. Similarly, before a user can issue a particular object generation request, the update module 404 may check if the user has privileges for types of objects which will be generated or updated by such request. For instance, a user must belong to a process model creator group in order to be allowed to generate a process model (e.g., a record action, write to an event log, etc.).

To perform the customization process, the update module 404 may: generate modified graphical user interfaces based on the seed data; transmit the graphical user interfaces to the user device; receive user requests via the modified graphical user interfaces; and update the seed data based on the user requests. In some cases, the update module 404 may re-check the updated seed data to confirm other deconflict processes are still satisfied after a user input requests a change.

To generate the object, the object generator module 408 uses a set of templates to produce portable presentations of new or existing objects, which may be an object-based model 300 (e.g., to be executed in the environment 125) or a software package (or subset thereof) to execute in a user environment. Generated portable objects can be deployed in any user environment 406, which is compatible with the definition version of those objects. A seed data and a recipe version associated with that seed data determine which particular generation template produces portable objects. Thus, the recipe versioning and the portable nature of objects allow the object template framework to simultaneously support different user environments 103 and "Continuous Integration and Deployment" and no code or low code development practices those environments follow.

Generated portable objects may be packaged to a deployable file. The deployable file may consist of the set of new or existing objects, and data supporting those objects. For instance, the object generator module 408 may perform one or both of: (i) generating a new object; and (ii) modifying an existing object. For example, additional data in a deployable file might be database scripts, configuration files or graphical artifacts.

In the case of generating a new object, the object generator module 408 may generate the deployable file (e.g., an XML file) for the generated object based on a first template and injections. To generate the deployable file, the generator module 308 may obtain the first template (e.g., a new object template such as a FTLX file) and inject data in a defined syntax (e.g., XML syntax) from the seed data (as modified or original). For instance, based on the object type to be generated, the generator module 308 may obtain a first new object template and inject specific data bits into fields to generate the deployable file. As an example, the object generator module 408 may export an existing object into a portable data structure (such as XML); use specific predefined transformation to either add, update, or remove snippets of code in a portable data structure (for example using XSLT); and import an updated portable data structure into a design object.

Objects further may be portable, meaning that the recipes may generate sets of objects that can be ported to different software process execution environments. Due to the portable nature of objects, different recipes that produce those object types can coexist, and the system may dynamically select the correct recipe to execute based on external factors, such as the version of the software process execution environment.

In the case of modifying an existing object, the object generator module 408 may generate the deployable file (e.g., an XML file) for the generated object based on a second template and injections. To generate the deployable file, the generator module 308 may obtain the second template (e.g., an existing object template such as an XSL file) and inject data in a defined syntax (e.g., XML syntax) from the seed data (as modified or original). For instance, based on the object type to be generated, the generator module 308 may obtain an XSL file for transforming XML of an existing object, and inject specific data bits into fields with preexisting values to generate the deployable file. In this manner, new XML data is injected in place of existing XML data in the existing XSL file to create a new XSL object. For instance, based on the object type to be generated, the generator module 308 may obtain an XSL file for updating XML of an existing object with XML code snippets corresponding to the logical modification of that existing object.

In the case of multiple objects (e.g., an application with multiple templates being used), the object generator module 408 may modify existing objects and/or generate new objects on an individual object-basis. Thus, the object generator module 408 may leverage existing objects to generate complex software processes without generating all new individual objects.

The generated object datastore 416 may store and track generated objects, e.g., by account, user, group, application, and the like. For instance, the generated object datastore 416 may store generated objects before the generated objects are deployed.

Data Fabric

Figure 5:
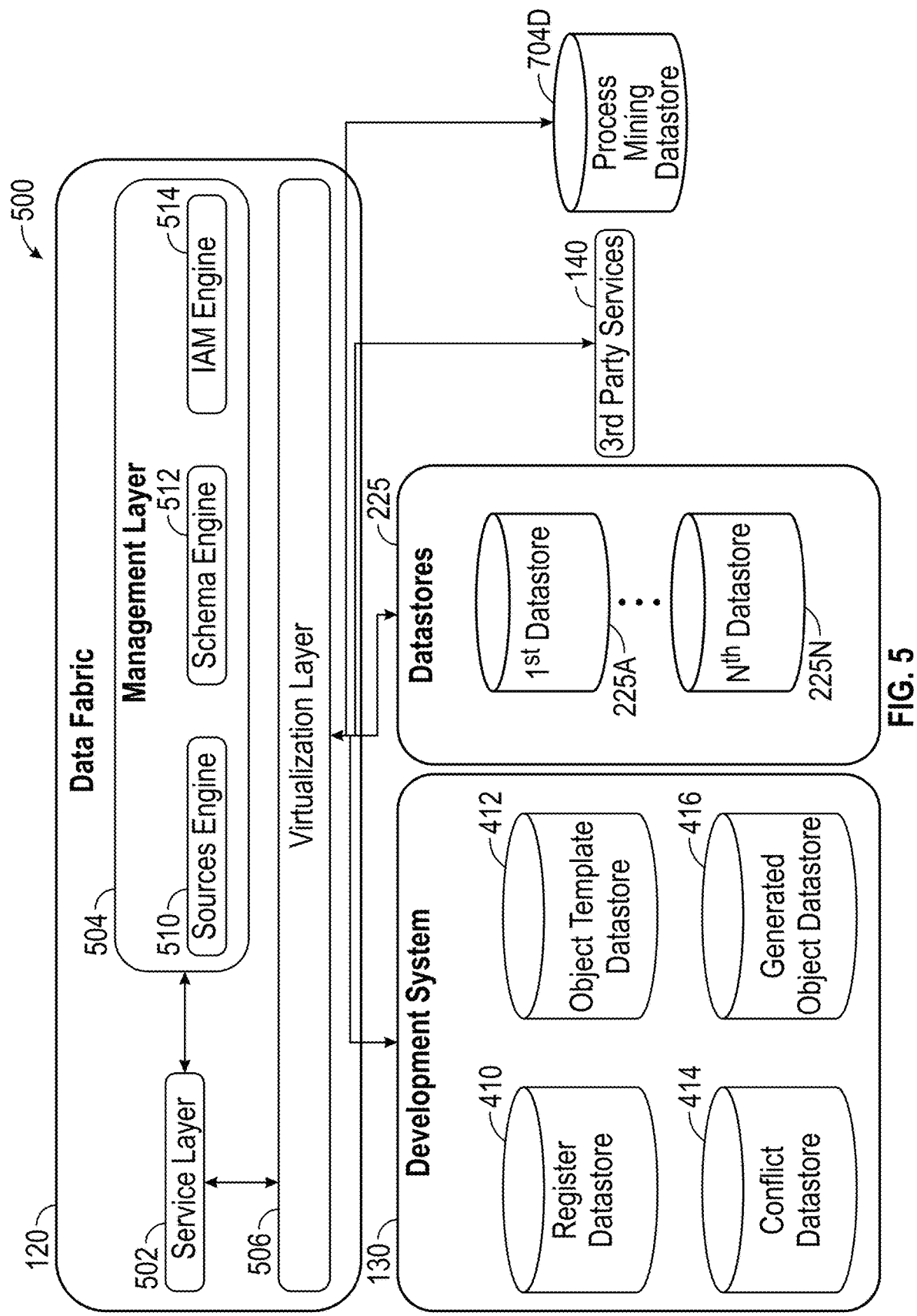
FIG. 5 shows a block diagram of a data fabric.
Figure 6A:
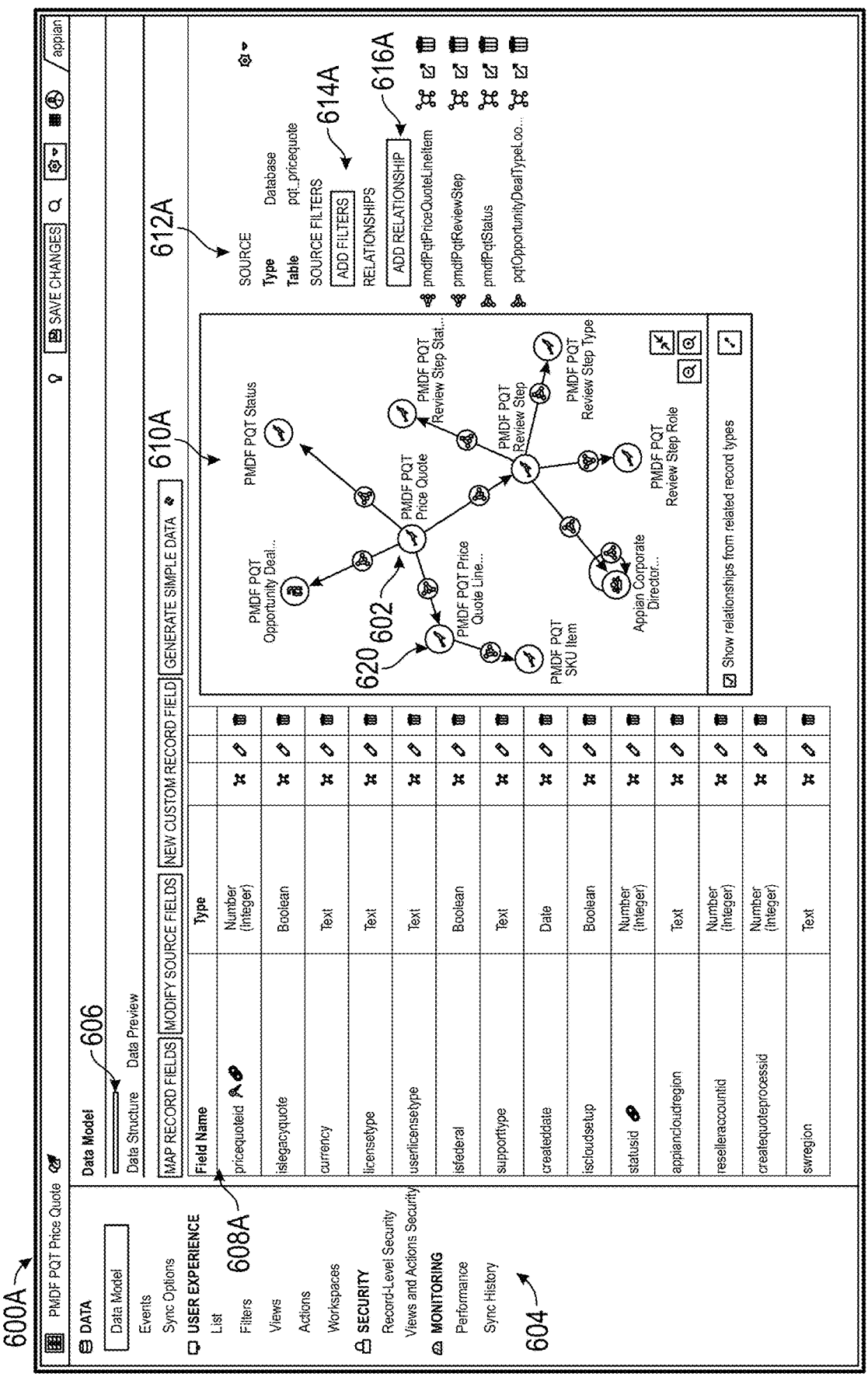
FIGS. 6A and 6B depict data models of schemas of a data fabric.
Figure 6B:
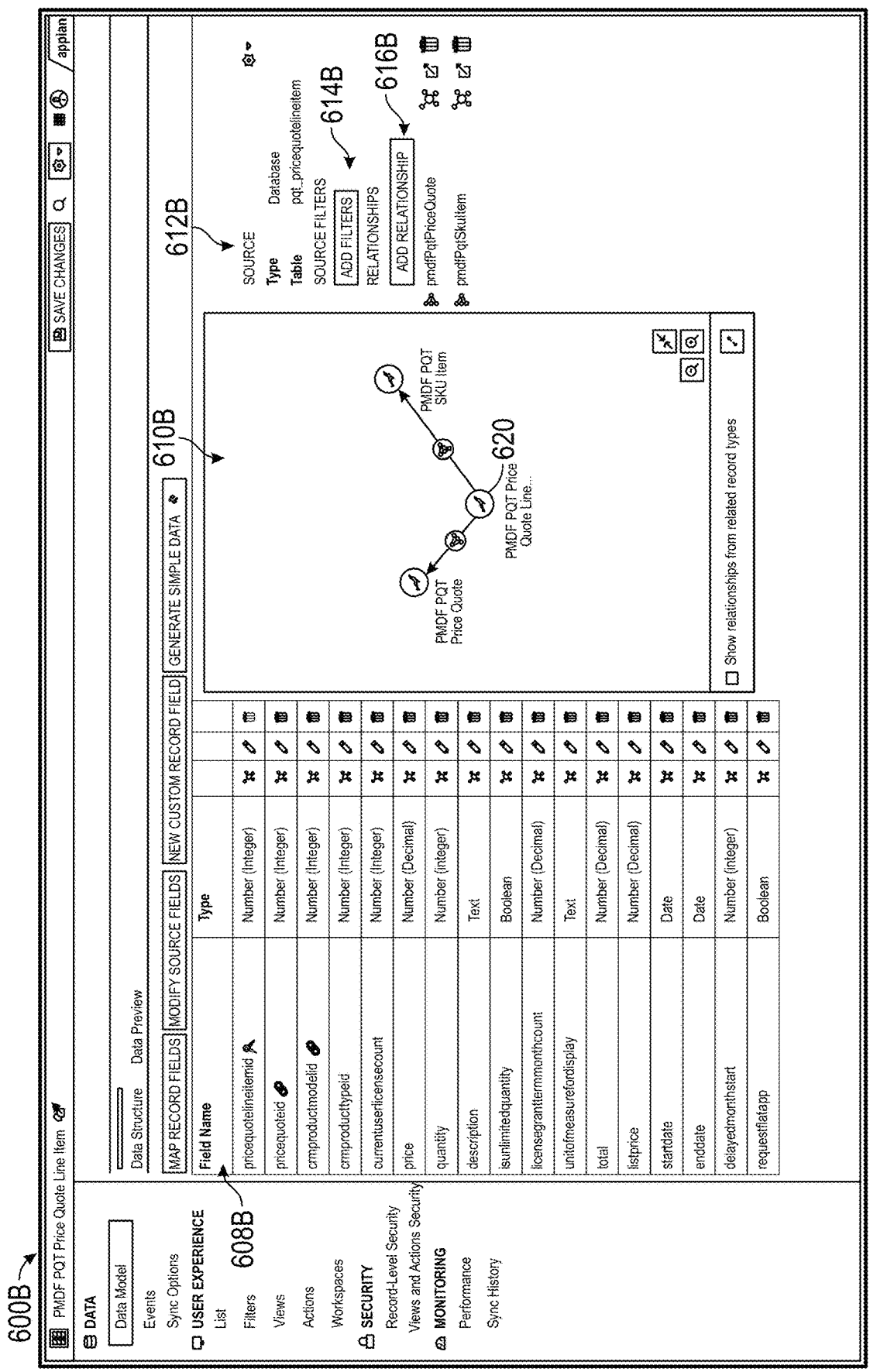

FIGS. 5 and 6A-6B depict features for a data fabric 115. The features of FIGS. 5 and 6A-6B may apply to any of 1, 2, 3, 4, 7, 8A-8B, 9A-9B, 10A-10G, 11, 12A-12B, 13A-13M, 14, 15A-15C, 16A-16R, and 17. FIG. 5 shows a block diagram 500 of a data fabric 120. FIGS. 6A and 6B depict data models of schemas, including a first schema GUI 600A and a second schema GUI 600B, of a data fabric 120.

Figure 7:
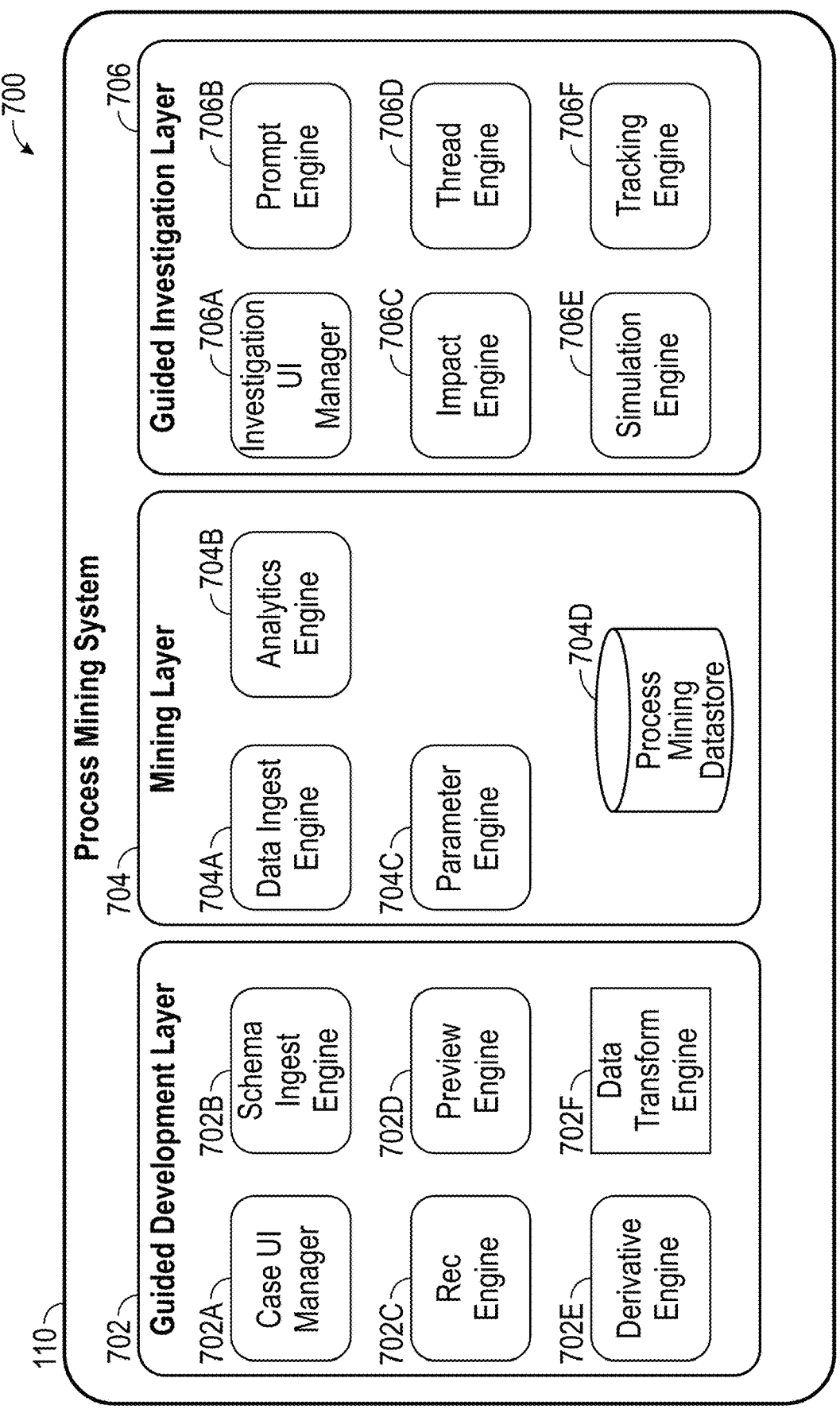
FIG. 7 shows a block diagram of a process mining system.

Turning to FIG. 5, the block diagram 500 may depict subsystems of the data fabric 120, and how the subsystems interact to receive data, store data, retrieve data, and serve data from one or more sources, including the development system 130, the datastores 225, the third party services 140, and/or the process mining datastore 704D (See FIG. 7). The subsystems of the data fabric 120 may include a service layer 502, a management layer 504, and a virtualization layer 506. The management layer 504 may include a sources engine 510, a schema engine 512, and an identify and access management engine 514 ("IAM engine 514").

The service layer 502 may receive and manage retrieve request(s) for data and store request(s) for data ("data fabric requests"). In response to data fabric requests, the service layer 502 may request relevant data from the management layer 504. For instance, based on the data fabric requests, the service layer 502 may request: endpoint data from the sources engine 510, schema data from the schema engine 512, and/or authorization permission from the IAM engine 514. If the authorization permission is granted by the IAM engine 514, the service layer 502 may request the virtualization layer 506 to store specific data to (or retrieve specific data from) one or more the sources, in accordance with the endpoint data.

The schema data may track underlying database schema of data stores (such as the development system 130, the datastores 225, and the process mining datastore 704D) and data structure schemas of services of the third party services 140 (collectively "physical/logical schema"). The schema data may also, or alternatively, map the physical/logical schema to a virtualized schema of data models of software processes. The schema engine 512 may present to users of the platform 105 the virtualized schema (see, e.g., FIGS. 6A and 6B), without requiring the users of the platform 105 to track, manage, or understand the physical/logical schema of the datastores 225, third party services 140, and/or process mining datastore 740D. In this manner, users of the platform 105 may manage data of software processes with respect to the virtualized schema and without reference to the physical/logical schema.

The virtualization layer 506 may perform data store or data retrieval process operations in accordance with requests from the service layer 502. The virtualization layer 506 may report successful storage to the service layer 502 and/or serve the requested data, as received from the sources.

Turning to FIGS. 6A and 6B, the first schema GUI 600A and the second schema GUI 600B may depict examples of virtualized schema for a software process. In particular, the first schema GUI 600A depicts a first schema that is connected in the virtualized schema of a software process to a second schema depicted in the second schema GUI 600B.

Each schema GUI includes various elements, such as a navigation bar 604, a data structure tab 606, a table section, a graphical representation section, a source field, a source filter section, and a relationship field. The navigation bar 604 may depict various links to different aspects of the software process, including the data model (depicted), events options, sync options, user experience, security, and monitoring. The data structure tab 606 depicts elements specific to the data model, as opposed to a data preview of underlying records/fields.

The elements may update based on which data model is being viewed by a user. For instance, in the first schema GUI 600A, the table section includes a first table 608A, the graphical representation section includes a first schema graphic 610A, the source field includes first source data 612A, the source filter section includes a first filter 614A, and the relationship field includes a first set of relationships 614A. In the second schema GUI 600B, the table section includes a second table 608B, the graphical representation section includes a second schema graphic 610B, the source field includes second source data 612B, the source filter section includes a second filter 614B, and the relationship field includes a second set of relationships 614B.

In each table section (e.g., the first table 608A and the second table 608B), the table section depicts various data and functions. For instance, the table section may include names of data fields, types for the data fields, and management functions.

In each graphical representation section (e.g., the first schema graphic 610A and the second schema graphic 610B), a graphic depicting a schema of the data fields is produced. The graphic depicts nodes and edges, where the nodes correspond to data fields, records, database tables, or databases of the software process and edges correspond to relationships between the nodes. In some cases, a node may correspond to a connected data field, record, database table, or database of the software process, which may not correspond to the physical/logical schema for the actual storage of the data in such data fields, record, database tables, or databases.

In some cases, a record may correspond to a database table, and, in such cases, the record may include data fields of the database table. In other cases, a record may combine data from different tables in the same database, tables in different databases, third party systems (e.g., via API calls, database calls, etc.), directories, files, other external data sources, or combinations of any of these sources. Records may, thus, combine data that is stored in various tables, records, or other containers within the software process execution environment 125 (e.g., datastores 225) with data that is stored externally to the software process execution environment 125 to appear to software processes running on the software process execution environment 125 as if the data were stored thereon. A record may thus provide any shape of data to software processes in the software process execution environment 125 so long as the data sources are accessible to the software process execution environment 125. In this manner, the data fields in records are accessible to the software processes. In some cases, the records (or data fields of those records) may come from third party systems. In these cases, a record may include one or more data fields made available from the third party system, but may not include all data fields which are made available by that third party system.

In each source field (e.g., the first source data 612A and the second source data 612B), the source field may depict various data corresponding to a node in the graphic schema (e.g., a record) and provide information about the underlying source of the data for that node. For instance, data storage type and related information (such as database/table information, or third party service data) may be reproduced in the source field.

In each source filter section (e.g., first filter 614A and the second filter 614B), the source filter section may depict filters. For instance, the source filter section provides user interface elements to select filters to find data fields/relationships.

In each relationship field (e.g., the first set of relationships 614A and the second set of relationships 614B), the relationship field may indicate the relationships between a current data model (or record, database table, or database) and connected data model(s) (or connected record(s), connected database table(s), or connected database(s)). For instance, each edge of the graphic may be listed in the set of relationships.

Turning to the first schema in the first schema graphic 610A, a node 602 representing the current data model is selected. From node 602, the first schema graphic 610A depicts relationships to other nodes (e.g., data field, records, database tables, and databases) that are involved in the software process, for instance second node 620. The data fabric 120 may store that relationship, along with the data model of the second node 620, depicted in the second schema graphic 610B.

In this manner, the data fabric is able to automatically provide nested connections between data fields/records/database tables/databases of different schema. Nested connections between data fields/records/database tables/databases of different schema may streamline process mining of complex software processes. For instance, as discussed herein, nested connections may enrich process mining by making attributes (e.g., of data models and/or other software processes) of nested connections tractable for insight for a primary software process. In this manner, onerous and complex data engineering may be avoided, errors reduced, and process mining may be enhanced by automatic pipelines of more and relevant data fields/records/database tables/databases. Moreover, process mining may be performed on real (or near real) time data for continuous process improvement and/or tracking.

Process Mining System

Figure 8A:
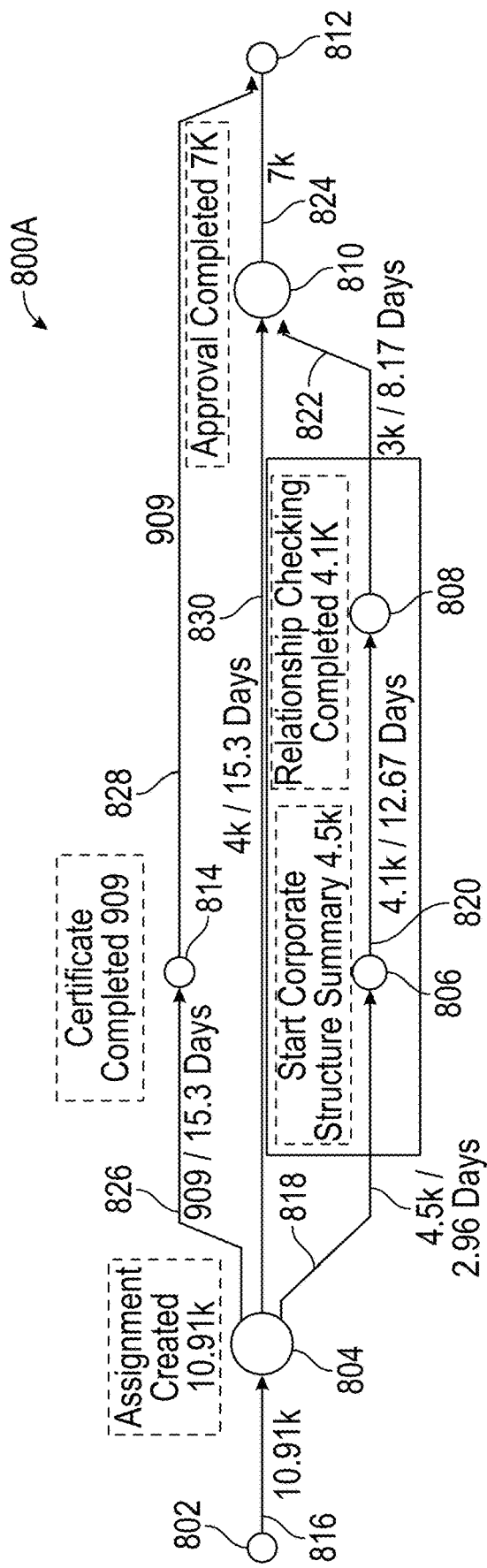
FIGS. 8A-8B depict a graphical model of a process, a state machine for generating an insight, and an investigation pipeline for process mining.
Figure 8B:
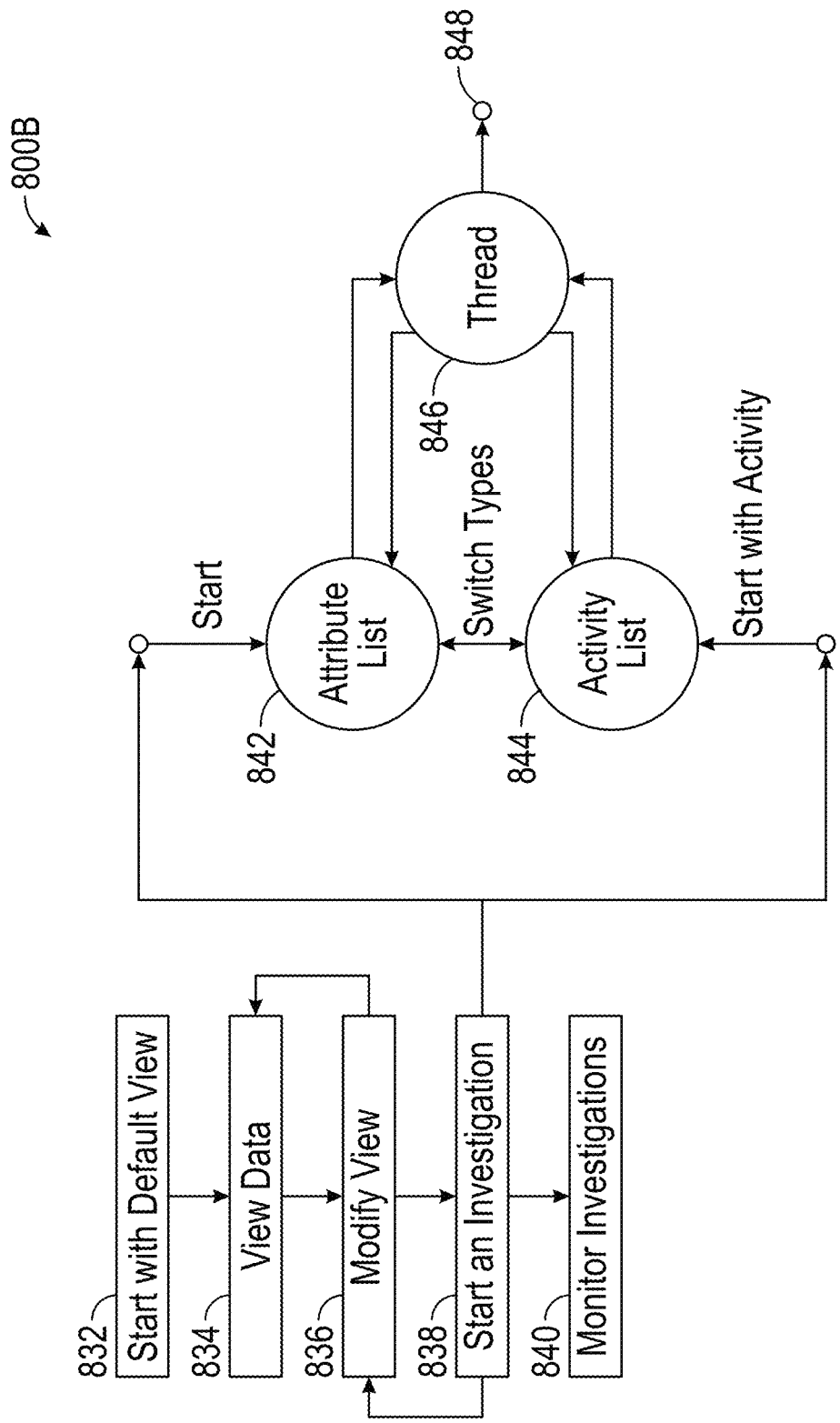

FIGS. 7 and 8A-8B depict features for a process mining system 110. The features of FIGS. 7 and 8A-8B may apply to any of 1, 2, 3, 4, 5, 6A-6B, 9A-9B, 10A-10G, 11, 12A-12B, 13A-13M, 14, 15A-15C, 16A-16R, and 17. FIG. 7 shows a block diagram 700 of a process mining system 110. FIGS. 8A-8B depict a graphical model 800A of a process, and a state machine 800B for generating an insight.

Turning to FIG. 7, the block diagram 700 may depict subsystems of the process mining system 110, and how the subsystems interact to develop investigation pipelines, collect data for process mining, perform process mining, and guide investigation of process mining data. The subsystems of the process mining system 110 may include a guided development layer 702, a mining layer 704, and a guided investigation layer 706. The guided development layer 702, the mining layer 704, and the guided investigation layer 706 may cooperate to find factors that affect performance of software processes, track performance of software processes, and streamline continuous improvement of software processes.

The guided development layer 702 enables data stewards, end users or automated processes whose task is to optimize software processes, to develop investigation pipelines for software processes, for instance using graphical user interfaces to select data fields and/or generate derived data fields. Investigation pipelines may be a set of code to gather, pre-process, and populate mining data in the mining layer 704, so that the mining layer may find and recommend factors that impact software processes, and user interfaces that provide the factors that impact software processes to data stewards or other end users. The guided development layer 702 may include a case UI manager 702A, a schema ingest engine 702B, a recommendation engine 702C, a preview engine 702D, a derivative engine 702E, and a data transform engine 702F.

The case UI manager 702A may serve as the central coordinator for user interactions within the guided development layer 702, facilitating the creation and refinement of investigation pipelines for software processes. The case UI manager 702A may manage the user interface flow, ensuring that data stewards are presented with relevant information and options at each step of the pipeline development process. The case UI manager 702A may interpret user inputs, such as selections of data fields and configurations for derived data fields, and orchestrate the subsequent actions across the various engines within the guided development layer 702. It also handles the retrieval and presentation of schemas, recommendations, and data previews, thereby enabling data stewards to make informed decisions about the composition of investigation pipelines. Through its management of the user interface, the case UI manager 702A may streamline the pipeline development process, making it more intuitive and efficient for users.

The schema ingest engine 702B may ingest and process schema information from various data sources to construct a comprehensive and integrated view of the data landscape for a given software process. The schema ingest engine 702B may extract additional schema details from connected systems, including databases, records, and data structures of third-party services, and translates them into a unified format that reflects the logical structure and relationships inherent in the data. The schema ingest engine 702B may read the data fields of records of third party systems and create new records in the platform 105 for data mining purposes (e.g., without changing the existing record that is used by the software processes of the software process execution environment 125). The schema ingest engine 702B may extract and utilize additional schema data from connected systems which is not available from, but is related to, existing records of the software process. This enables the schema ingest engine 702B to provide a virtualized schema that is both coherent and simplified, allowing data stewards to easily understand and navigate complex data relationships as they build investigation pipelines. By abstracting the intricacies of underlying data schemas, the schema ingest engine 702B may facilitate the selection of relevant data fields and the establishment of connections that are pertinent to process mining, thereby enhancing the efficiency and effectiveness of the mining process.

The recommendation engine 702C may recommend relevant data fields for inclusion in investigation pipelines. By evaluating patterns, trends, and correlations in past process mining activities, the recommendation engine 702C may identify and prioritize data fields that are likely to yield valuable insights into the software processes under examination. The recommendation engine 702C may assist data stewards by proposing a set of data fields that may be tailored to the specific parameters of the investigation, thereby streamlining the development process, and enhancing the quality of the resulting process mining data. The recommendation engine 702C may learn from previous investigations and adapt recommendations, thereby improving process mining and enhancing resultant insight decisions.

The preview engine 702D may provide real-time data previews to data stewards as they construct investigation pipelines. The preview engine 702D may dynamically generate visual representations of data samples based on user-selected data fields, enabling data stewards to immediately assess the relevance and quality of data before including it in an investigation pipeline. The preview engine 702D may interface with the data fabric to retrieve current data snapshots, which the preview engine 702D may then process to create accurate and informative previews. This immediate feedback loop may be useful in refining the investigation pipeline, ensuring that the data included is targeted for insights during the process mining analysis.

The derivative engine 702E may facilitate the creation of custom data fields for use in process mining investigations. The derivative engine 702E may provide a dynamic environment where data stewards can define new data fields by applying transformation functions to existing data fields from a set of data fields. The transformation functions may include mathematical operations, logical operations, or any combination thereof, to derive new values that can offer insights into the software processes under examination, which may not be available in existing data fields. The derivative engine 702E may enable the generation of the custom data fields based on user-defined criteria and parameters, thereby allowing for the customization of the investigation pipeline to meet specific analytical requirements. This capability may enhance the flexibility and depth of process mining by enabling the inclusion of tailored metrics and indicators that are not directly available in the raw data.

The data transform engine 702F may orchestrate the transformation and integration of data into a format suitable for process mining analysis. The data transform engine 702F may execute the investigation pipeline, retrieving data from various sources as specified by the pipeline's configuration, and apply the transformation functions defined by the derivative engine 702E to generate custom data fields. The data transform engine 702F may ensure that the data conforms to the schema requirements of the process mining system, facilitating seamless ingestion of the processed data. Additionally, the data transform engine 702F may manage the execution of data transformation tasks, ensuring that they are performed efficiently and in accordance with the user-defined parameters of the investigation pipeline. This includes handling complex data operations such as aggregations, filtering, and the application of logical conditions to refine the dataset for mining. The data transform engine 702F may convert raw data, thereby enabling the process mining system 110 to uncover patterns and trends that drive process optimization and improvement.

The mining layer 704 may mine data of software processes in investigation pipelines designed by data stewards in the guided development layer 702. In particular, the mining layer 704 may find one or more factors that impact software processes and iteratively (based on user interactions with the guided investigation layer 706) add factors to a thread. A thread may be a defined sequence of factors that filter a set of mining data. In some cases, the thread may be an analysis path. For instance, when a first factor is added to an original set of process mining data (e.g., based on a software process identifier, and a time period), the mining layer 704 may filter the original set of process mining data based on the first factor (e.g., to only case identifiers that have the first factor) to obtain a first filtered set of process mining data. When a second factor is added, the mining layer 704 may filter the first filtered set of process mining data (e.g., to only cases that have the first factor and the second factor) to generate a second filtered set of data. In some cases, the order that factors are added to a thread may change how the sets of data are filtered. For instance, if the second factor was added before the first factor (instead of, as discussed above, where the first factor was added before the second factor), the mining layer 704 may obtain a different set of data than the first filtered set of data. By adding factors to a thread, the mining layer 704 may surface (e.g., determine, present, and/or re-order) new factors that may correspond to root causes of impacts on the software processes. The mining layer 704 may include a data ingest engine 704A, an analytics engine 704B, a parameter engine 704C, and the process mining data store 704D.

The data ingest engine 704A may ingest and process data for subsequent mining activities. The data ingest engine 704A may also manage different versions of mining data for an investigation pipeline.

The analytics engine 704B may operate as the analytical core of the mining layer 704, applying sophisticated data analysis techniques to the process mining data ingested by the data ingest engine 704A. The analytics engine 704B may be designed to identify factors that impact software process performance, which could indicate areas for software process improvement. The analytics engine 704B may determine the potential impact of different factors on process outcomes. The factors generated by the analytics engine 704B may be used in guiding investigations of performance of software processes.

The parameter engine 704C may function as a dynamic configurator within the mining layer 704, responsible for managing and applying various parameters that direct the process mining analysis. The parameter engine 704C may interpret parameters set by users or predefined in the system to tailor the mining process to specific goals, such as optimizing for time, cost, or compliance. The parameter engine 704C may provide the logic and rules that define how data is to be evaluated, ensuring that the analytics engine 704B focuses on the aspects of the software processes that are of interest to the investigation. By adjusting the parameters, the parameter engine 704C allows for a flexible and targeted approach to process mining, enabling the discovery of insights that are aligned with the strategic objectives of the investigation. This adaptability makes the parameter engine 704C a flexible tool for refining the process mining results and enhancing the decision-making process.

The process mining data store 704D may be a centralized repository for storing and managing the data utilized in the process mining activities of the mining layer 704. The process mining data store 704D may be designed to handle the storage of large volumes of structured and unstructured data, including event logs, metadata, and processed data from various sources such as databases, logs, and third-party services. The process mining data store 704D may ensure the integrity and availability of the data, facilitating efficient retrieval for analysis by the analytics engine 704B. The process mining data store 704D may support the versioning of data to track changes over time and enables the correlation of data across different sources to provide a holistic view of the software processes.

The guided investigation layer 706 may manage user interactions (e.g., of analysts) to find factors affecting performance of software processes in investigation pipelines designed by data stewards in the guided development layer 702. The guided investigation layer 706 may include an investigation UI manager 706A, a prompt engine 706B, an impact engine 706C, a thread engine 706D, a simulation engine 706E, and a tracking engine 706F.

The investigation UI manager 706A may orchestrate a user experience during the guided investigation process, serving as the interface between the user and the underlying process mining components. The investigation UI manager 706A may manage the display of interactive elements, such as prompts, factors, and simulation tools, and respond to user inputs by updating the thread/analysis path and refining the focus of the analysis. The investigation UI manager 706A may ensure that the investigation is aligned with the user's objectives by dynamically adjusting the presentation of data and insights based on the user's interactions, selections, and feedback. This adaptive approach facilitates a more intuitive and efficient investigation process, enabling users to uncover the root causes of process performance issues and explore potential improvements in a structured and user-friendly environment.

The prompt engine 706B may serve as a dynamic facilitator within the guided investigation layer 706, responsible for generating and managing the sequence of user prompts that guide the investigation process. By leveraging data from the analytics engine 704B and the impact engine 706C, the prompt engine 706B may present users with an ordered list of factors that may influence the performance of the software processes under examination. The prompt engine 706B may prioritize these factors based on their potential impact, as determined by the current parameter settings and historical process data, thereby directing the user's attention to the areas of greatest potential improvement. The prompt engine 706B's interactive prompts are designed to engage users in a step-by-step exploration of the process data, encouraging a thorough and methodical approach to uncovering insights. This component plays a central role in ensuring that the guided investigation is both comprehensive and focused, leading to more effective and actionable process mining outcomes.

The impact engine 706C may operate as a strategic analyzer within the guided investigation layer 706, focusing on assessing the potential influence of various factors on the performance of software processes. The impact engine 706C may utilize data from the analytics engine 704B to calculate impact scores for each factor, which quantify the degree to which each factor affects the process outcomes. These impact scores are then used to rank the factors, providing a clear indication of which factors are the most consequential and thus warrant closer examination. The impact engine 706C may also interface with the prompt engine 706B to ensure that the factors presented to users are not just data-driven but also contextually relevant, taking into account the specific goals and parameters of the investigation. This enables a targeted and efficient approach to process mining, where users can focus their efforts on the factors that are likely to yield the greatest insights and benefits.

The thread engine 706D may function as a central component within the guided investigation layer 706, managing the progression and evolution of an investigation thread as users interact with the system. The thread engine 706D may record and track the sequence of factors that users select during the investigation, creating a structured path that reflects the user's analytical journey. As new factors are added to the thread, the thread engine 706D dynamically updates the investigation, refining the focus and directing subsequent process mining activities to areas influenced by the selected factors. This iterative process allows for a deep dive into the software processes, enabling users to progressively narrow down the scope of the investigation and identify root causes with precision. The thread engine 706D may ensure that each factor's impact is considered in context, maintaining the logical flow of the investigation, and supporting users in building a comprehensive understanding of the process dynamics.

The simulation engine 706E may serve as an advanced predictive component within the guided investigation layer 706, enabling users to simulate potential outcomes based on modifications to the software processes under investigation. The simulation engine 706E may leverage the data collected and analyzed by the analytics engine 704B, along with the impact assessments from the impact engine 706C, to model the effects of hypothetical changes to the process. The simulation engine 706E may provide a dynamic and interactive environment where users can adjust variables, test scenarios, and visualize the consequences of their decisions in real-time. This allows for the exploration of various 'what-if' situations, aiding in the identification of the most effective strategies for process improvement. By incorporating the current thread of factors into the simulation, the simulation engine 706E may ensure that the simulations are contextually relevant and aligned with the insights gained during the investigation, thus providing a powerful tool for decision support and strategic planning.

The tracking engine 706F may operate as a comprehensive monitoring component within the guided investigation layer 706, responsible for tracking the progress and outcomes of investigations into software process performance. The tracking engine 706F may maintain a detailed record of the investigation threads, including all user-selected factors and their associated impact scores, as well as any changes made during the simulation phase. The tracking engine 706F may be configured to periodically update the investigation data, re-evaluating the process mining results as new data becomes available or as further modifications to the software processes are implemented. This continuous tracking allows for the assessment of the long-term effectiveness of process changes and provides valuable feedback for future investigations. Additionally, the tracking engine 706F may alert users to any deviations or trends that emerge over time, ensuring that stakeholders remain informed and can take proactive measures to address any issues that arise.

Turning to FIGS. 8A-8B, the graphical model 800A of a software process, and the state machine 800B for generating an insight may explain features of process mining of software processes based on process nodes of no-code or low-code environments.

The graphical model 800A of a software process may visually depict analytics of the software process. The graphical model 800A may include a plurality of nodes 802-814 and a plurality of sequences 816-830 between respective nodes. For each node, the node may be sized based on analytics associated with the node, such as a count or percentage of cases associated with the node (for a given time period). For each sequence, the sequence may be sized and/or color coded based on analytics associated with the sequence between two nodes, such as a count or percentage of cases associated with the sequence and an impact metric of the sequence. The analytics for the nodes and/or sequences may be displayed adjacent/on the nodes and/or sequences. In some cases, sequences may loop back to a start node. In some cases, the sequence may be between different nodes.

In some cases, the analytics may be generated based on one or combinations of: data from the event log of a software process (e.g., when an activity (or node) started and ended), metadata of software process (e.g., the identity of the user that initiated a the software process), and/or data stored as part of the software processes (e.g., the entry of the amount of an invoice by an end user of the software process). Event logs of create, write, update, or delete actions may be useful for process mining, as the event log can be designed to track event related metadata (e.g., case identifier, user identifier, or system identifier, etc.) along with the event action itself, thereby enriching process mining and providing a time stamp for the create, write, update, or delete action. In the case of metadata and data, the data fabric and investigation pipeline may surface such features automatically. In the case of data fabric, the data fabric may provide nested relationships to indicate, e.g., a user identifier is associated with the first node. In the case of an investigation pipeline, the investigation pipeline may define extractions of derived attributes from underlying data. In this manner, process mining of complex software processes may become computationally tractable, especially as the amount of data fields and underlying data continues to grow.

The process mining system 110 may proceed through the state machine 800B for generating an insight. The process mining system 110 may start at first state 832. The first state 832 may be a default view of a dataset (e.g., analytics, schema, etc.) associated with a software process. The process mining system 110 may proceed to a second state 834 (e.g., based on user interactions) from the first state 832. The second state 834 may provide a specific view of data of the software process, such as high-level metrics or a graphical model, such as the graphical model 800A. The process mining system 110 may proceed to a third state 836 from the second state 834. The third state 836 may be a user interaction to select a different view of the dataset (e.g., tabular view) or apply different filters to the data. The process mining system 110 may alternatively return to a second state 834 showing new data/graphics or to a fourth state 838 to start an investigation. The process mining system 110 may proceed to a fifth state 840 after the investigation or return to the third state 836 based on user interactions (e.g., to view different data views and the like). The fifth state 840 may be a monitoring state for tracking (e.g., using the tracking engine 706F).

In the fourth state 838, the process mining system 110 may start with an attribute state 842 or an activity state 844 based on user interactions. In the fourth state 838, the process mining system 110 may move between the attribute state 842 or the activity state 844, and a thread state 846. The attribute state 842 may display attribute factors that may be, for example, data or metadata that impacts the software process. The attribute state 842 may display the attribute factors and related information (e.g., analytics), and order the attribute factors based on impact. The activity state 844 may display activity factors that are activities within the software process whose characteristic(s) impact the software process. The activity state 844 may display the activity factors and related information (e.g., analytics), and order the activity factors based on impact. Activities may be events at nodes of software processes that perform an action, such as a create, write, update, or delete action. For instance, an activity may be to write data to a data field in the software process. The corresponding technical or business process may be advanced or updated based on the activity. For instance, the write data action may indicate a certain real-world process (and corresponding actions within a software process) has been started, updated, advanced, or closed (e.g., account created, account verified, account closed). An attribute may be metadata related to the activities or the software process. For instance, an attribute may be a user that performed the event (e.g., who closed an account), the account type, a region associated with the account, and the like.

The thread state 846 may track and display factors that have been added to the thread. The user may select activities or attribute factors to be added to the thread state 846 (arrows pointing toward the thread state 846). The user may select activities or attribute factors to be removed from the thread state 846 (arrows pointing away from the thread substate 846). After making selections to the thread state 846 and reviewing impacts/simulations, the process mining system 110 may proceed to a saved state 848 (e.g., based on a user save selection).

While not depicted in the state machine 800B, the state machine may include other states. For instance, the state machine 800B could include a sequences or loops state to display sequence factors and loop factors. For instance, the state machine 800B could include a simulation state to display and provide user interactions to modify a simulation of an impact of a change to the software process.

Closed Loop Mining Using Generated Objects

Figure 9A:
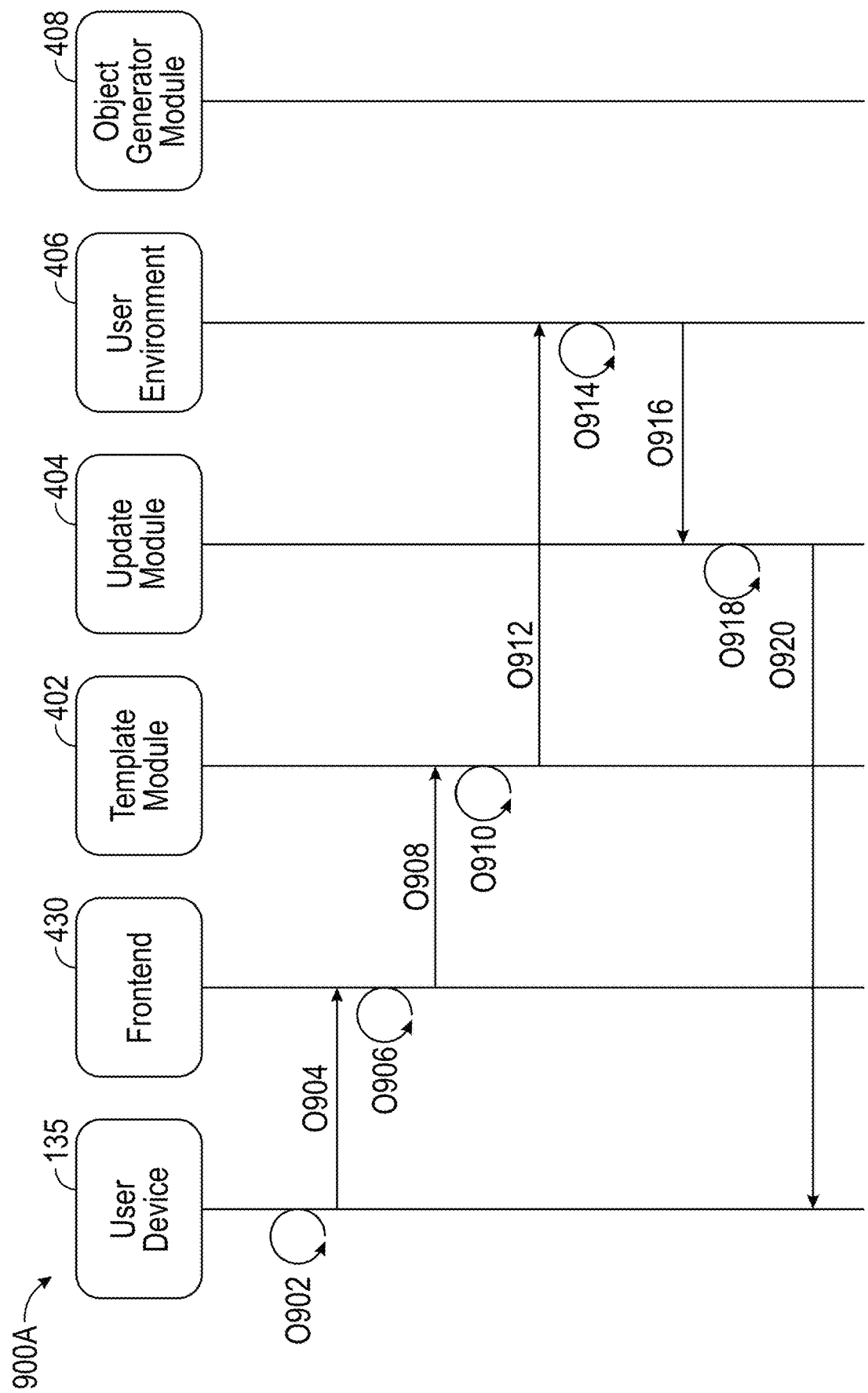
FIGS. 9A and 9B depict data flow diagrams for closed-loop mining using generated objects.
Figure 9B:
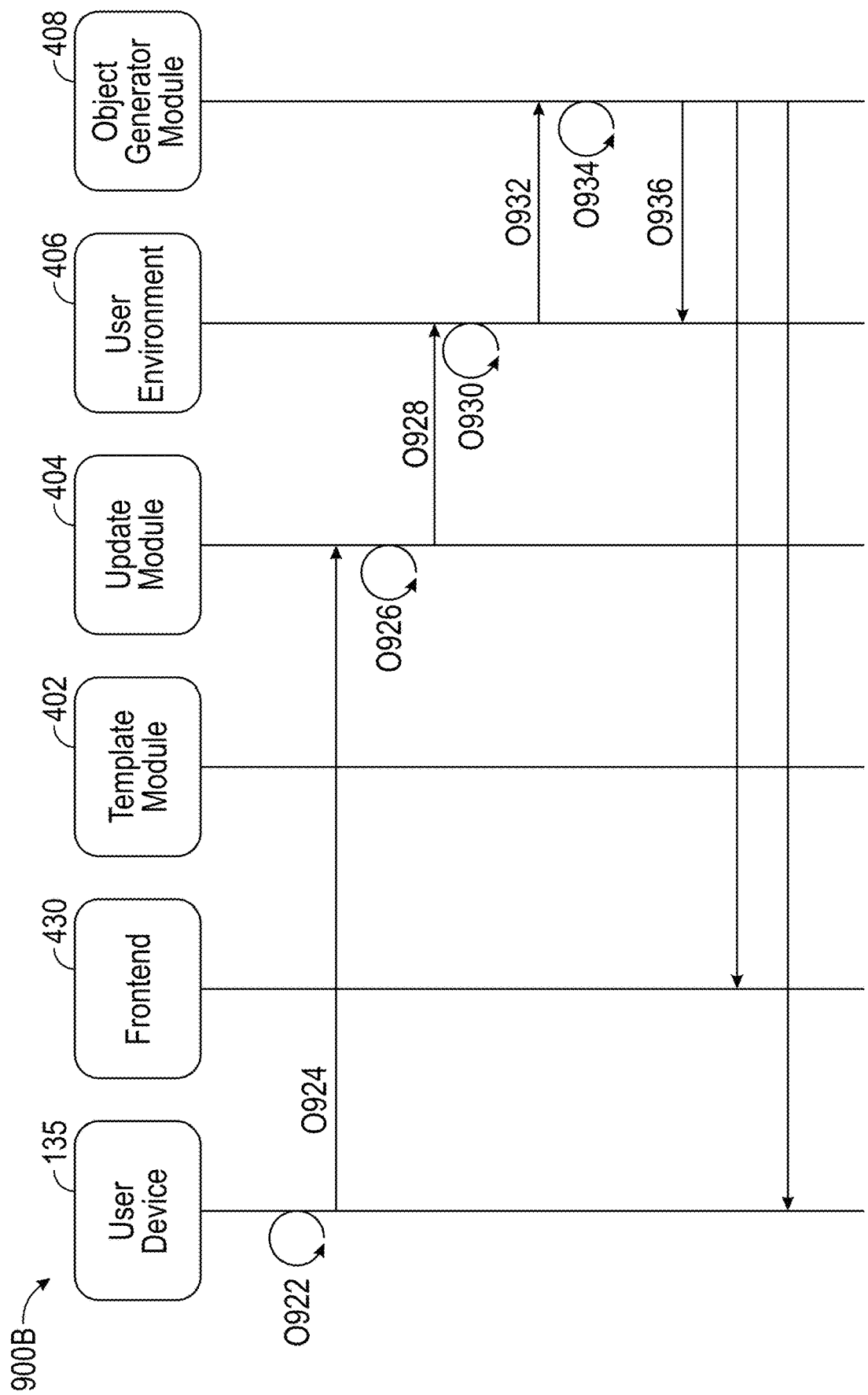
Figure 10A:
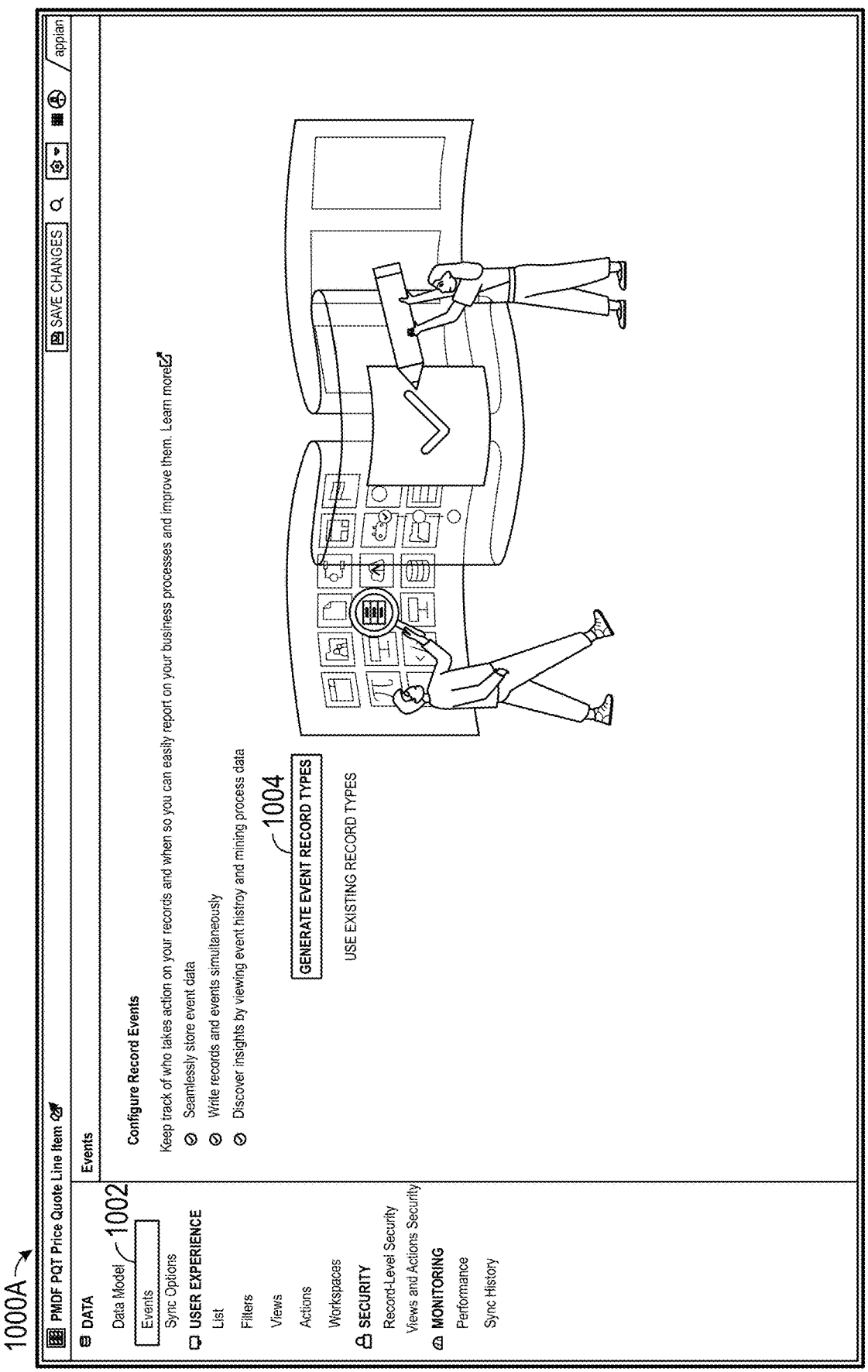
Figure 10D:
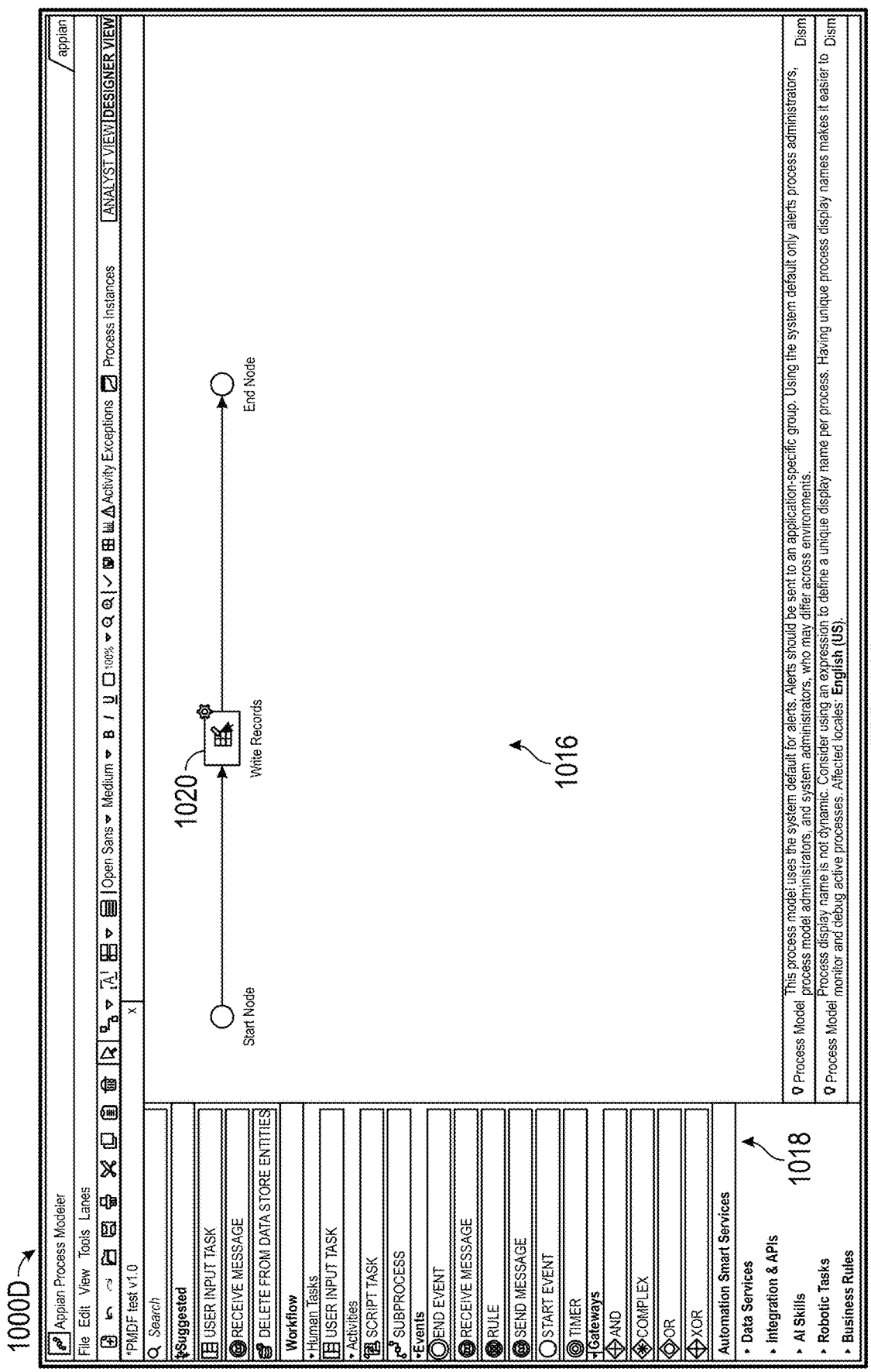
Figure 10E:
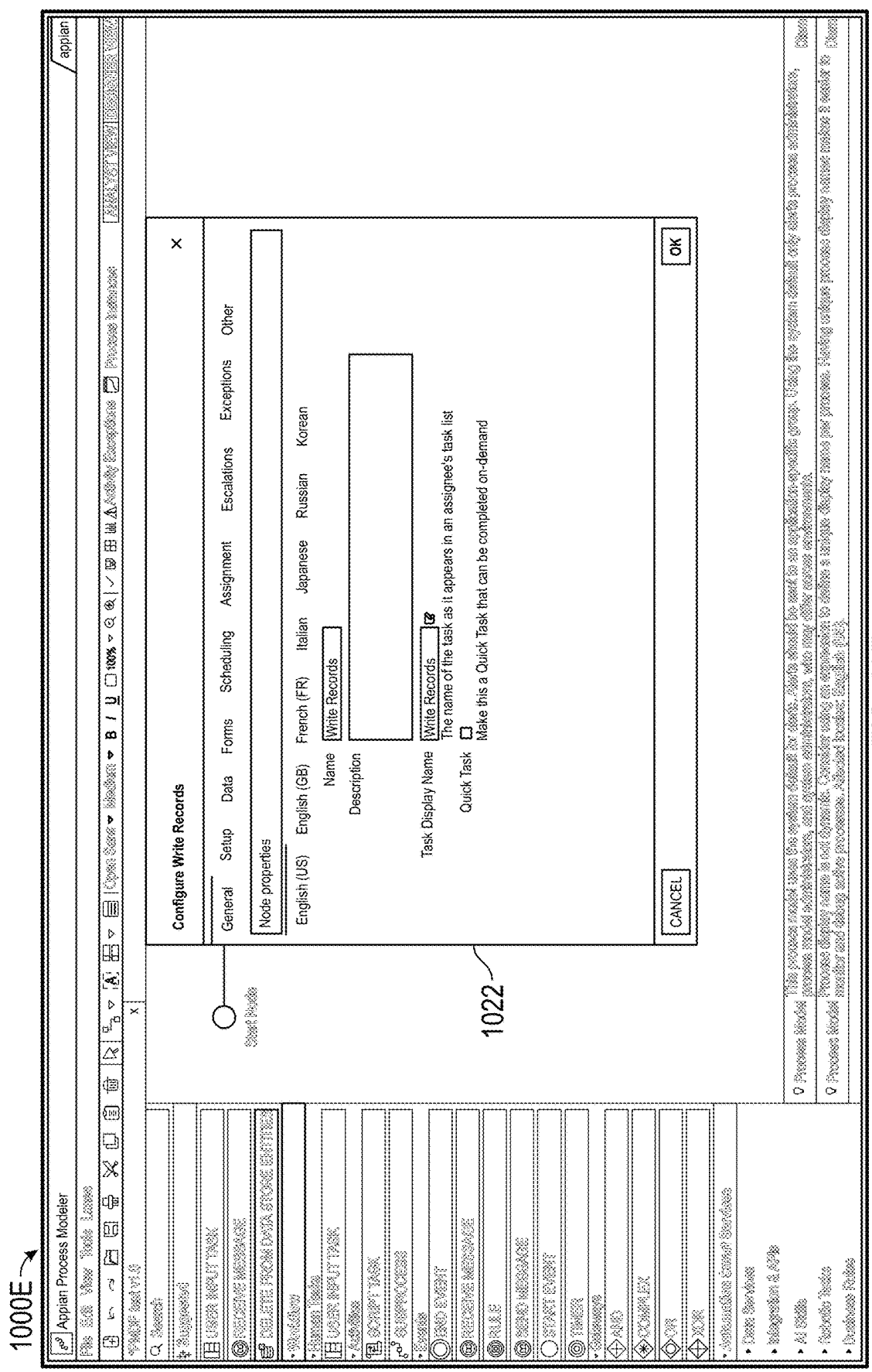
Figure 10F:
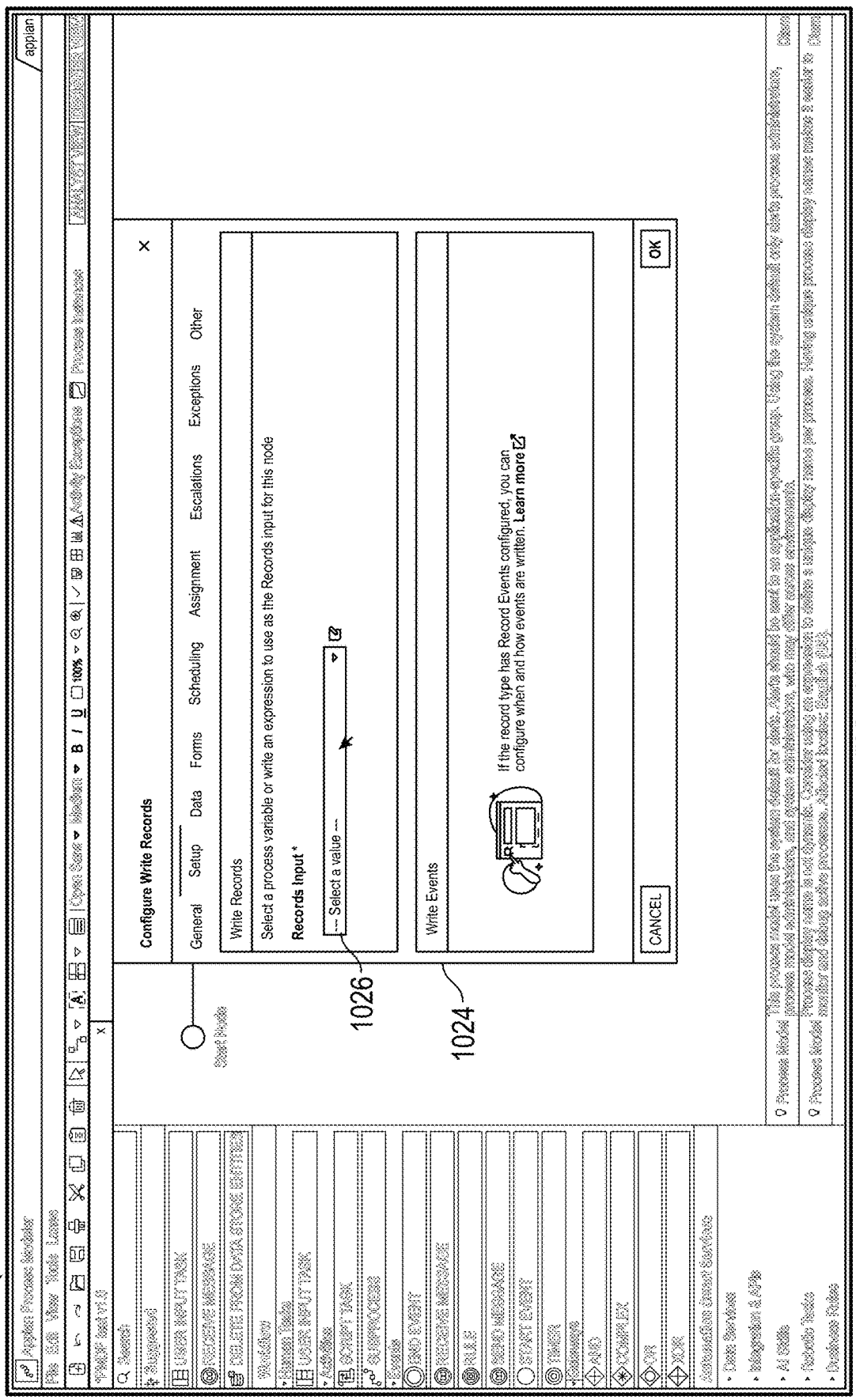
Figure 10G:
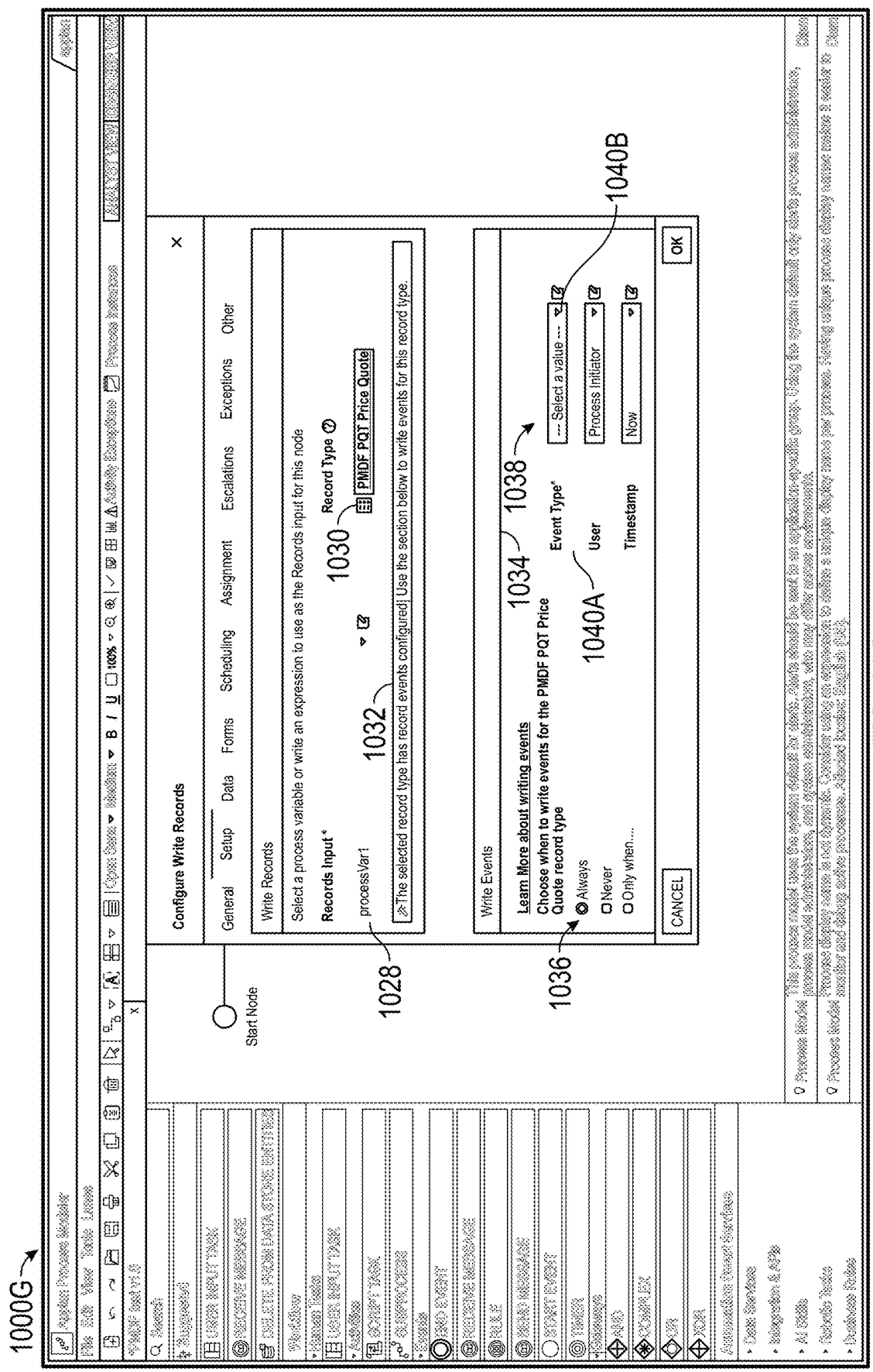
Figure 11:
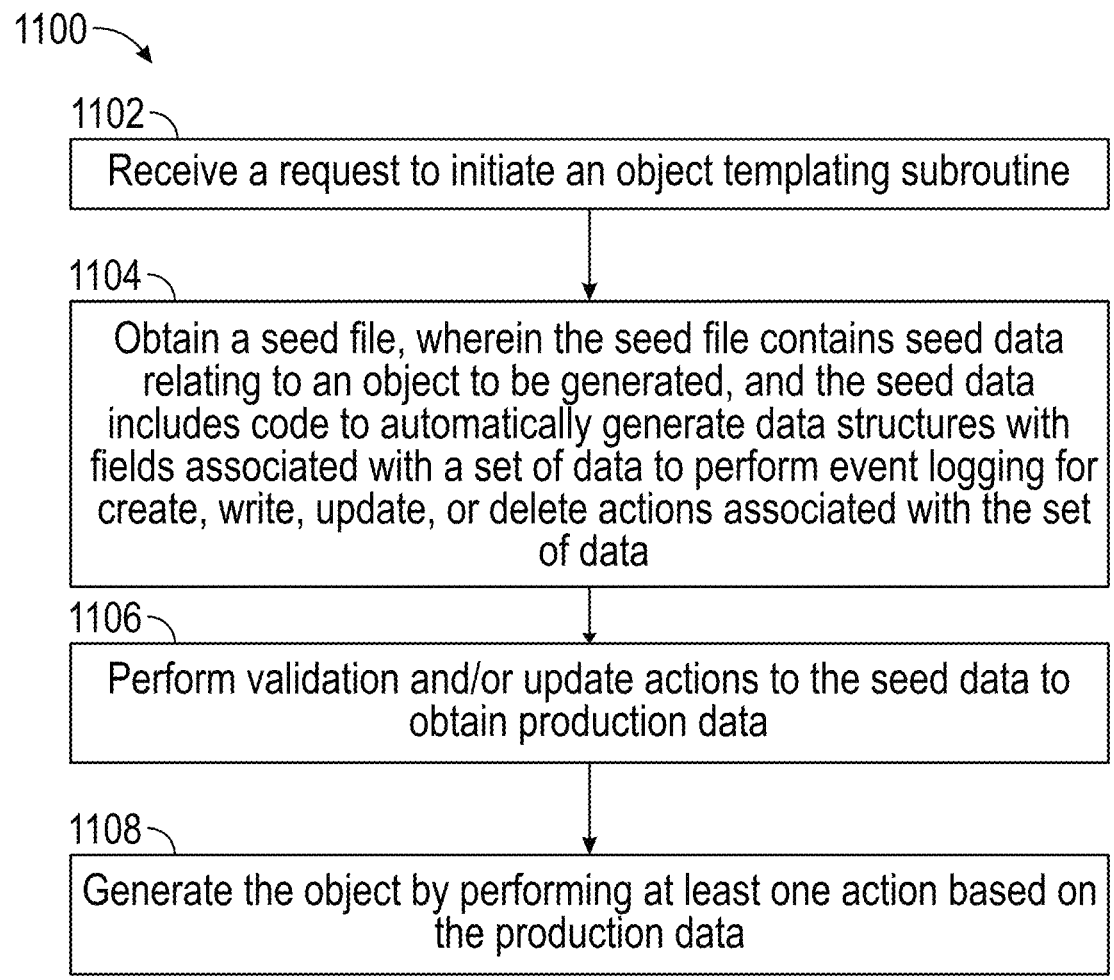
FIG. 11 depicts a flowchart for closed-loop mining using generated objects.

FIGS. 9A-9B, 10A-10G, and 11 depict features of closed loop mining. The features of FIGS. 9A-9B, 10A-10G, and 11 may apply to any of FIGS. 1, 2, 3, 4, 5, 6A-6B, 7, 8A-8B, 12A-12B, 13A-13M, 14, 15A-15C, 16A-16R, and 17. FIGS. 9A and 9B depict data flow diagrams for closed-loop mining using generated objects. FIGS. 10A-10G depict graphical user interfaces for closed-loop mining using generated objects. FIG. 11 depicts a flowchart for closed-loop mining using generated objects.

Turning to FIGS. 9A-9B, the data flow diagrams 900A and 900B may depict various components of the environment 100 interacting to generate objects, as discussed herein. The various components may perform operations O902 through O936 to generate the objects.

In operation O902, the user device 135 may receive user inputs via graphical user interface(s) to make selections/data inputs and to cause a request to be transmitted to initiate an object templating subroutine, as discussed herein. In operation O904, the user device 135 may transmit a request to initiate the object templating subroutine. The frontend 230 may receive the request to initiate the object templating subroutine. In operation O906, the frontend 230 may process the request (to confirm the format, user authorization, and the like) and determine to route the request to the template module 402. In operation O908, the frontend 230 may initiate the object templating subroutine by relaying the request to the template module 402. The template module 402 may receive the request.

In operation O910, the template module 402 may obtain a seed file by selecting a template (e.g., based on user indications in the user request) and populating data in the template based on user indications in the user request, the user account, or an account associated with the user (e.g., an organization account), as discussed herein. In operation O912, the template module 402 may transmit the seed file to the user environment 406. The user environment 406 may receive the seed file.

In operation O914, the user environment 406 may store and update the seed file based on instructions from the user device 135 and the update module 404, as discussed herein.

In operation O916, the user environment 406 may transmit a request to validate/update the seed data to the update module 404. The update module 404 may receive the request.

In operation O918, the update module 404 may perform validate/update actions on the seed data to obtain production data. For instance, the update module 404 may perform a data deconflict processes, automatically change certain data (e.g., based on triggering conditions), and generate recommendations, as discussed herein. In some cases, like in operation O920, the update module 404 may transmit graphical user interfaces to the user device 135. The graphical user interfaces may be displayed to the user to: (1) inform the user of progress, (2) recommendations, and (3) the option to proceed with object generation.

In operation O922, the user device 135 may receive user inputs indicating user selections, approval of recommendations in the graphical user interfaces, and/or user indication to proceed with object generation. In operation O924, the user device 135 may transit user inputs to the update module 402. The update module 402 may receive the user inputs.

In operation O926, the update module 404 may re-perform validate/update actions based on the user input. In the case that certain user inputs are not accepted by the update module 404, the update module 404 may transmit denials or recommended actions to resolve issues. In the case that the user inputs are acceptable, the update module 404 may determine to proceed with updating the seed data. In operation O928, the update module 404 may transmit updates to seed data in the seed file to the user environment 406. The user environment 406 may receive the updates to the seed data.

In operation O930, the user environment 406 may update seed data and determine to initiate the object generation subroutine. In some cases, the user environment 406 and/or the update module 404 may propagate changes based on triggering conditions between objects. In some cases, the user environment 406 may determine an instantiation condition is satisfied (e.g., a user input indicating to proceed, or the seed data is acceptable and no user input is needed for this object).

In operation O932, the user environment 406 may transmit a request to initiate the object generation subroutine to the object generator module 408. The object generator module 408 may receive the request to initiate the object generation subroutine.

In operation O934, the object generator module 408 may generate an object based on the seed data in the user environment 406, as discussed herein. In operation O936, the object generator module 408 may store and/or deploy the object. For instance, the object generator module 408 may transmit the object to the frontend 230, so that the object may be hosted, executed (if, and as, the object is invoked), referenced, and/or used as a container, or the object generator module 408 may transmit the object to the user device 135 (or a device association with the user device 135), so that the object can be hosted, executed (if, and as, the object is invoked), referenced, and/or used as a container on a user-managed system.

In some cases, the seed data of the seed file may include code to automatically generate a data structure with fields associated with a set of data and necessary event logging code to enable event logging for create, write, update, or delete actions associated with the set of data. In this manner, the seed file may include structures to enable the capture of data associated with events and code that ensures events are automatically logged during the execution of the software process.

For instance, an object (e.g., a production version of the software process as based on the template) may include automatically generated code and one or more data structures associated with a create, write, update, or delete action that automatically generates event logs when any executed create, write, update, or delete action occurs. Moreover, the event logs may be automatically stored in the data structure and processed in a process mining process associated with the object. In some cases, event logs may be entries in a record that log events. In some cases, event logs may be text files or other data structures that are used to log events. In this case, the platform 105 may transform or manage event log text files or other data structures for process mining.

In some cases, the event logs may include a timestamp indicating when the create, write, update, or delete actions occurred. In some cases, the event logs may include an identifier associated with the create, write, update, or delete actions. In some cases, the identifier is for a user who performed an action, wrote, updated, or deleted the data, or instantiated the object. In some cases, the event logs may include a description of the create, write, update, or delete actions performed. In some cases, the event logs are configured to record the state of the object before and after the create, write, update, or delete actions.

In some cases, the event logs may be configured to be written as a co-transaction with a respective create, write, update, or delete action. In some cases, the co-transaction may be configured to succeed if both the event log entry and the associated create, write, update, or delete action are successfully completed. In some cases, the co-transaction may be configured to fail if either the event log entry or the associated create, write, update, or delete action is not successfully completed.

In some cases, the updating of the seed data may include adding additional event types to the event logs. The additional event types may include categories of actions and/or categories of activity corresponding to actions taken in a software process and/or business process in the real world.

In some cases, the updating of the seed data may include receiving a text string or selection based on a user input. In these cases, the development system 130 may automatically modify the data structure to automatically capture the event logs for the create, write, update, or delete actions based on the text string or selection. In the case of a text string, the platform 105 may match the text string to one of a plurality of attributes of a software process; and, based on the matched attribute, modify the data structure to capture an attribute value for the matched attribute in the event logs. In the case of a selection, the platform 105 may provide a selection element for a plurality of attributes of a software process; and, based on the selection of an attribute, modify the data structure to capture an attribute value for the matched attribute in the event logs.

In some cases, generating the object includes receiving user selections via an interface. In these cases, the user selections may be guided by one or more fields that are required for a create, write, update, or delete action, to thereby cause generation of associated event logs. The interface may provide visual indicators for the one or more fields that are required to guide the user in completing the create, write, update, or delete action. The associated event logs may be based on user selections associated with the one or more fields which indicate actions related to those fields should be logged. The user selections may include choices from a set of predefined options presented within the interface. The one or more fields may be pre-populated with recommended data types. The pre-populated recommended data types may be determined by analyzing past event logs to identify common data types used in similar instances of the object.

For instance, based on data from the tracking engine 706F, the development system 130 may determine certain event record types, or data associated with certain event record types (collectively "common event records") are used above a threshold amount. In these cases, the pre-populated recommended data types may include the common event records (if omitted). The development system 130 may recommend the common event records that are omitted.

In some cases, the pre-population of recommended data types may be refined based on user role or permissions, ensuring that the data types are relevant to the user's context and authorization level. For instance, the development system 130 may reference the IAM engine 514 for a determination if a user is authorized to access certain data or store data to certain locations.

In some cases, the interface may be configured to allow the user to accept, modify, or reject the pre-populated recommended data types before completing a development of a create, write, update, or delete action. For instance, the user may make modifications to when or what is stored.

In some cases, the interface is configured to allow the user to create customized event fields for the create, write, update, or delete actions. For instance, the user may select different event log information from a set of possible event log information (e.g., a requesting user identifier versus a managing user identifier). In some cases, the customized event fields are associated with specific create, write, update, or delete actions, thereby enabling differentiated logging for process mining operations.

Turning to FIGS. 10A-10G, the graphical user interfaces 1000A-1000G depict sequences and interactions on the user devices 135 to automatically generate a data structure with fields associated with a set of data to perform event logging for create, write, update, or delete actions associated with the set of data. In some cases, certain graphical user interfaces may be omitted (e.g., if a user's interactions do invoke those graphical user interfaces). In some cases, the graphical user interfaces may be conditioned on previous graphical user interfaces. In some cases, the graphical user interfaces may be displayed in response to different user interactions (e.g., from different graphical user interfaces).

In FIG. 10A, GUI 1000A may depict an event management interface for a software process, such as related to the first schema GUI 600A. The event management interface may show an events tab 1002 of the navigation bar 604. The events tab 1002 may display a configuration element 1004. The configuration element 1004 may be user-selectable to configure event logs for the software process in event records. For instance, the configuration of event logs may cause a data structure (e.g., a first event record to track event types and a second event record to track event histories with user-definable fields), and code to be used to create and populate the first event record and the second event record to be generated.

In FIG. 10B, GUI 1000B may depict, in response to a user selection of the configuration element 1004, a configuration window. The configuration window may include various data and user-selectable elements, such as a common events selection 1008 and a custom events element 1010. The common events selection 1008 may be user-selectable to include event logs for common events. The common events may be default events, such as for create, write, update, or delete actions, or may be determined based on context of the software process. The custom events element 1010 may enable a user to input alphanumeric text for names, titles, activities, attributes and the like. The platform 105 enables a user to map custom events elements to any event action modeled in the software process or may automatically map entries to event actions.

In FIG. 10C, GUI 1000C may depict alphanumeric text 1014 in the custom events element 1010. The platform 105 may enforce writing to event records (e.g., event logs) to document and track corresponding data in the event records. In this manner, automated generation of objects, including event record types, may have best practices enforced on create, write, update, or delete actions for software process, thereby improving process mining insight and computational tractability.

In FIG. 10D, GUI 1000D may depict a process modeler interface for a software process. The process modeler interface may include a graphical model interface 1016 and a menu 1018 of software subroutines to be added by, e.g., drag and drop, into the graphical model interface 1016. For any write, update, or delete subroutine (e.g., write action node 1020) of the graphical model interface 1016, the platform 105 may enforce creation of event records as done by the exemplary configurations in GUIs 1000A-1000C.

In FIG. 10E, GUI 1000E may depict a write configuration 1022 to write data to a record for the write action node 1020. The write configuration 1022 may display fields for configuring various attributes that permit the specification or changing of node properties.

In FIG. 10F, GUI 1000F may depict a setup tab 1024 of the write action node 1020. The setup tab 1024 may include a record input field 1026 to specify the set of data to use as an input to write action node 1020. When the record input field 1026 is inactive, a write events section 1034 is inactive. When the record input field 1026 has been populated (and the record events have been configured for the software process) the write events section 1034 is activated.

In FIG. 10G, GUI 100G may depict the write events section 1034 is in an activated state. For instance, the record input field 1026 may include a value 1028, a record type 1030 for the value may be assigned, and an explanation of process mining/event tracking is displayed. The write events section 1034 may include configurations to specify when to write events for an associated record 1036 and configurations to specify what to write in events for an associated record 1038. The when configurations 1036 may be user selectable elements to determine when an event log may be generated based on an executed write action for the write action 1020 (for instance, always, never, or based on logical conditions associated with the write action). The what configurations 1038 may include a plurality of event types 1040A and, for each event type, a user-selectable set of one or more elements 1040B. The user-selectable elements 1040B may define types of data to store (e.g., time of event, user initiating the event, etc.). The what configurations 1038 may be programmatically mapped to include elements in a field that map to alphanumeric text (or selection) 1014 in the custom events element 1010. Thus, the platform 105 may enforce writing event records (e.g., event logs) to document and track corresponding data in the events logs. Certain when 1036 or what configurations 1038 may be required to be selected by a user to ensure compliance with event record configuration above.

In this manner, automated objects, including event record types, may be compliantly generated to ensure feature rich event logs for process mining. In particular, if event logs are configured, the platform 105 may automatically create code to create the necessary records and also write to event logging records for the software process. For instance, the platform 105 may create a first record that captures the types of events that will be logged, and a second record to capture a history of events of the types specified in the first record. The platform 105 may create (or use) event type code to write entries to the first record storing the types of actions that will be logged. The first record may include an identifier for each such entry to map to the second record.

The platform 105 may create event logging code to write an entry to the second record when an event of the type specified in the first record occurs. The second record may store the history of events that occurred (e.g., the log). In some cases, the event logging code may obtain at least timestamp; identifier associated with the create, write, update, or delete actions (e.g., user ID or process ID); identifier associated with the event (e.g., event ID); and any user-defined attributes intended by the user to be captured when an event of the type specified in the first record occurs (collectively "event log data"). The event logging code may then automatically store the event log data in the second record.

In this manner, the user (e.g., a low-code or no-code developer of software processes) does not have to write the code and the system automatically creates the records, the names, and the fields to ensure that event logging works. In this manner, bugs or errors that might be introduced by human coding may be avoided. Moreover, event logs may be enriched by user-defined attributes, thereby enriching process mining.

Turning to FIG. 11, the flowchart 1100 may depict operations to automatically generate a data structure with fields associated with a set of data to perform event logging for create, write, update, or delete actions associated with the set of data. The flowchart 1100 may be performed by one or more components described herein, such as the development system 130.

In block 1102, the development system 130 may receive a request to initiate an object templating subroutine, as discussed herein.

In block 1104, the development system 130 may obtain a seed file. The seed file may contain seed data relating to an object to be generated. The seed data may include code to automatically generate one or more data structures with fields associated with a set of data to perform event logging for create, write, update, or delete actions associated with the set of data, as discussed herein. In some cases, the seed data may also include code associated with create, write, update, or delete actions that automatically generate event logs when any of the create, write, update, or delete action occurs. In these cases, the event logs may be automatically stored in the data structure and processed in a process mining process associated with the object.

In block 1106, the development system 130 may perform validation and/or update actions to the seed data to obtain production data, as discussed herein.

In block 1108, the development system 130 may generate the object by performing at least one action based on the production data, as discussed herein.

Process Mining Using an Integrated Data Fabric

Figure 12A:
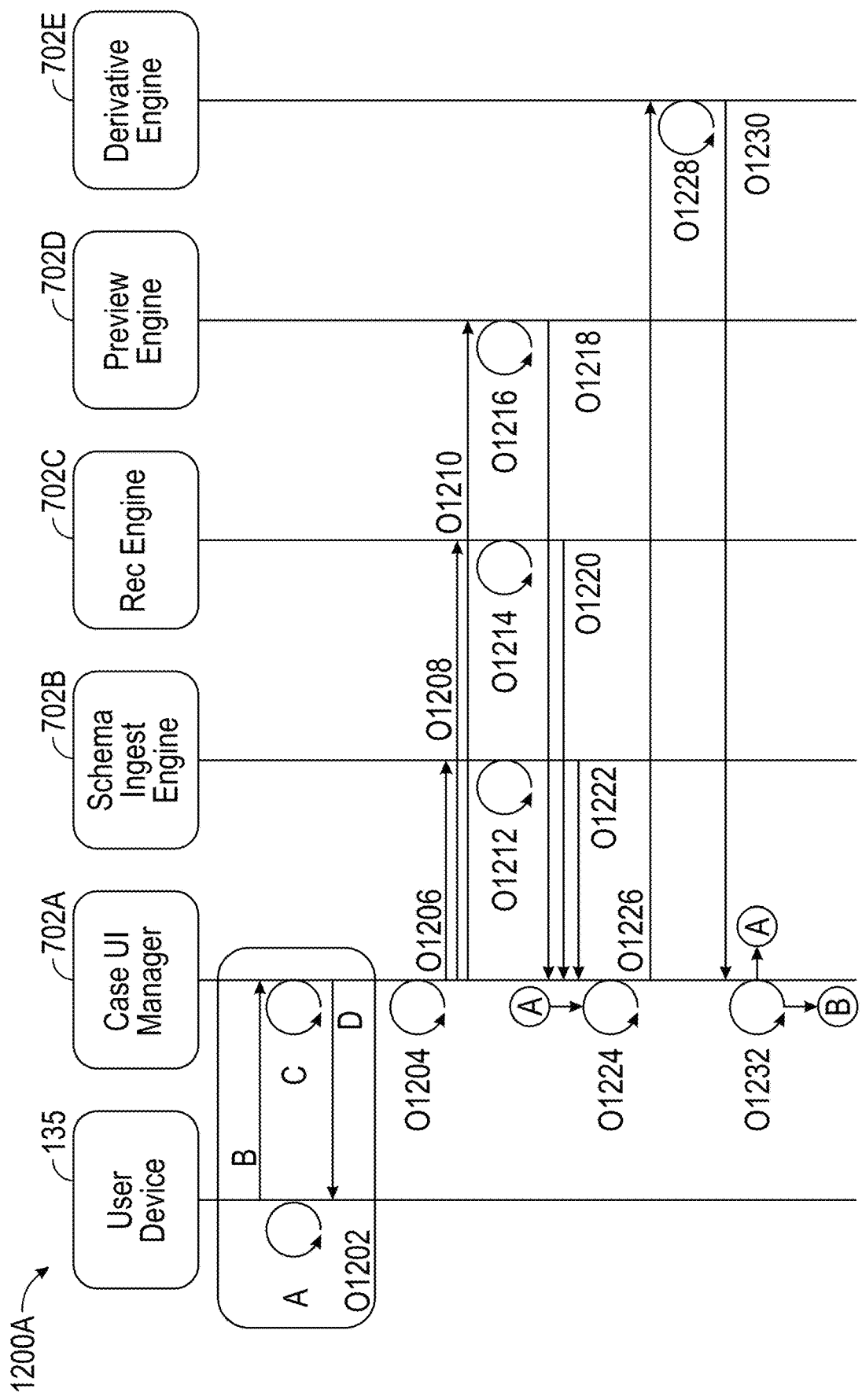
FIGS. 12A and 12B depict data flow diagrams for process mining using an integrated data fabric.
Figure 12B:
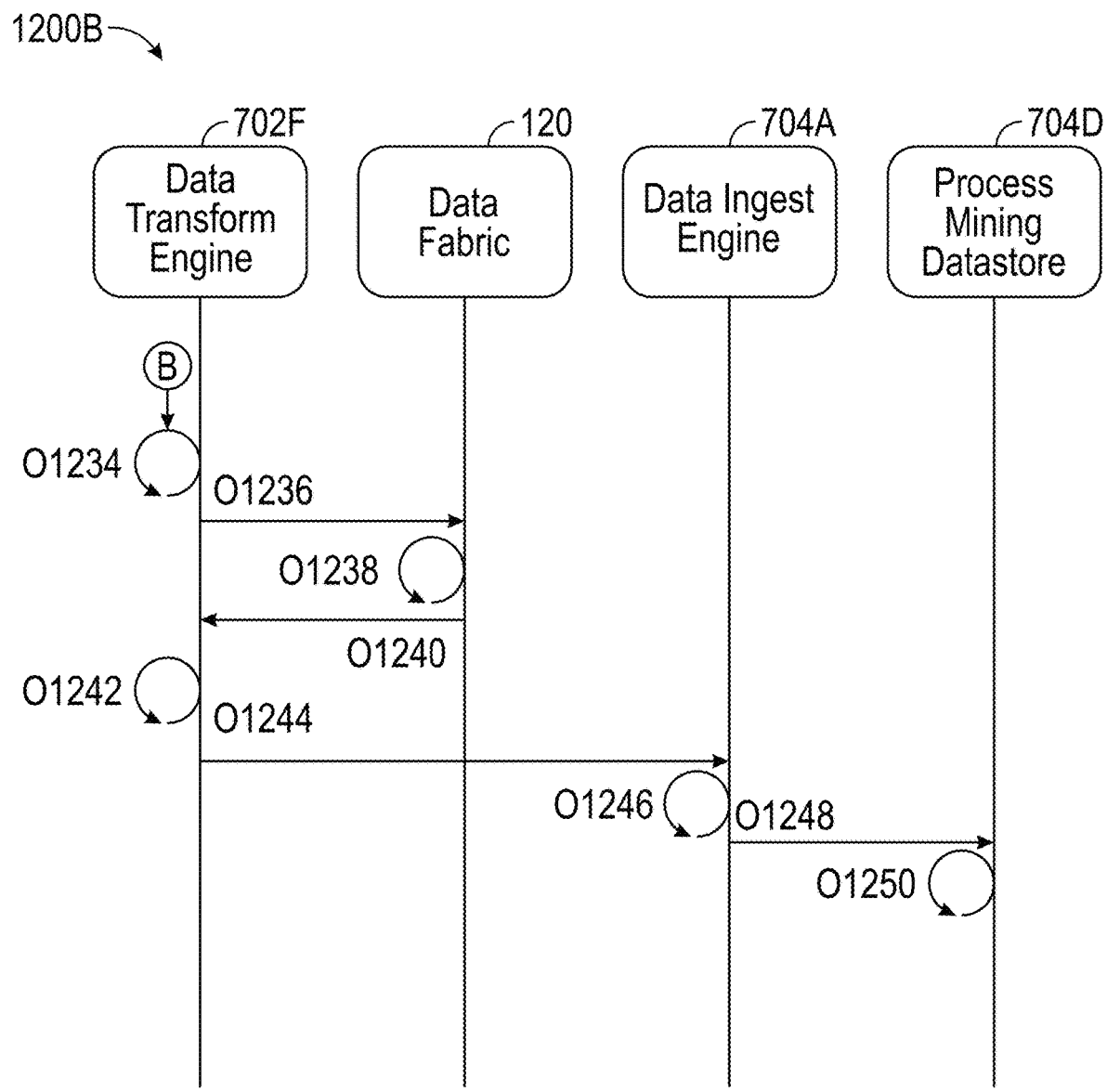

FIGS. 12A-12B, 13A-13M, and 14 depict features for process mining using an integrated data fabric. The features of FIGS. 12A-12B, 13A-13M, and 14 may apply to any of FIGS. 1, 2, 3, 4, 5, 6A-6B, 7, 8A-8B, 9A-9B, 10A-10G, 11, 15A-15C, 16A-16R, and 17. FIGS. 12A and 12B depict data flow diagrams for process mining using an integrated data fabric. FIGS. 13A-13M depict graphical user interfaces for process mining using an integrated data fabric. FIG. 14 depicts a flowchart for process mining using an integrated data fabric.

Turning to FIGS. 12A and 12B, the flow diagrams 1200A and 1200B may depict operations between various components of the process mining system 110 and interactions with user devices 135 to develop investigation pipelines for software processes. While one or more components of the process mining system 110 are depicted as separate components, the components of the process mining system 110 may be combined or separated to provide similar functionality, share resources, reduce data transmission and the like.

In operation O1202, the user device 135 and the case UI manager 702A may form a secure connection and exchange data, instructions, and the like using graphical, command line, or API interfaces. For instance, a user may navigate a web application (e.g., in a browser), a mobile application, and the like to (1) view certain data, (2) indicate decisions, and (3) provide instructions to the process mining system. See, e.g., FIGS. 13A-13M. For instance, at suboperation A, the user device 135 may detect and interpret user interactions with a user interface (e.g., web application or mobile application), and determine to send a request to the case UI manager 702A. At suboperation B, the user device 135 may transmit the request to the case UI manager 702A. At suboperation C, the case UI manager 702A may receive the request, process the request, and generate a response, as discussed herein. At suboperation D, the case UI manager 702A may transmit the response the user device 135. While the suboperations are depicted as originating from the user device 135, the case UI manager 702A may instead transmit updates/data asynchronously to requests from the user device.

In operation O1204, the case UI manager 702A may determine a development trigger condition is satisfied. For instance, a development trigger condition may be a user input (or command line call, API call, etc.) indicating a request to develop an investigation pipeline for a software process. For instance, a user (e.g., a data steward) may explore data regarding different software processes (e.g., analytics, graphics, and the like) and select a specific software process to develop an investigation pipeline for that specific software process.

In some cases, the case UI manager 702A may display record types associated with the software process, and event history record types associated with the software process. In some cases, the case UI manager 702A may display the record types and event history record types in response to the development trigger condition. In some cases, the case UI manager 702A may display the record types and event history record types before the development trigger condition (e.g., as part of exploring data regarding the software processes). Based on user selections of the record types and the event history record types, the case UI manager 702A may generate a recommended investigation pipeline and/or use the user selections to modify a default investigation pipeline.

In response to the development trigger condition and/or the user selections of record types and/or event history record types, the case UI manager 702A may also determine to transmit one or more of the following: a schema request to the schema ingest engine 702B, a recommendation request to the recommendation engine 702C, and/or a preview request to the preview engine 702D. The schema request may include a software process identifier and, optionally, a record type identifier and/or an event history record type identifier (collectively "investigation identifiers"). The schema request may request a virtualized schema (see FIGS. 5 and 6A-6B) for the software process. The recommendation request may include the investigation identifiers and a request to recommend one or more data fields of the virtualized schema for inclusion in the investigation pipeline. The preview request may include the investigation identifiers and a request to obtain data of one or more data fields of the virtualized schema.

In operation O1206, the case UI manager 702A may transmit the schema request to the schema ingest engine 702B. The schema ingest engine 702B may receive the schema request.

In operation O1208, the case UI manager 702A may transmit the recommendation request to the recommendation engine 702C. The recommendation engine 702C may receive the recommendation request.

In operation O1210, the case UI manager 702A may transmit the preview request to the preview engine 702C. The preview engine 702C may receive the preview request.

In operation O1212, the schema ingest engine 702B may process the schema request to generate an investigation schema of the virtualization schema of the software process. The schema ingest engine 702B may generate an investigation schema message based on the investigation schema and determine to transmit the investigation schema message to case UI manager 702A. For instance, the schema ingest engine 702B may extract the investigation identifiers, and request, from the schema engine 512, one or more virtualized schema corresponding to the software process identifier, the record type identifier and/or the event history record type identifier. In some cases, the virtualized schema corresponding to the software process identifier may include sub schema for the record type identifier and/or the event history record type identifier. In some cases, the virtualized schema corresponding to the software process identifier may omit the sub schema and include links to virtualized schema associated with the record type identifier and/or the event history record type identifier. In either case, the schema ingest engine 702B may process the one or more virtualized schema to generate the investigation schema.

The investigation schema may include an ordered data structure that includes a structure of data fields of the one or more virtualized schema. In some cases, the ordered data structure may include nested structure of data fields that correspond to nested connections of the one or more virtualized schema. See FIG. 13D. In some cases, the ordered data structure may order the structure based on the record type identifier and/or the event history record type identifier. For instance, structure that corresponds to data fields for the record type identifier and/or the event history record type identifier may be prioritized in the ordered data structure (e.g., be higher in the order). In some cases, the nested structure may include one or more nested layers, each corresponding to another connected relationship of the virtualized schema.

In this manner, the investigation schema may enable development of an investigation pipeline that gathers and correlates data fields from across the virtualized schema (e.g., from records, third party services, and other data sources). The gathered data fields may or may not be data fields that are referenced in or used by a software process of the platform 105, aside from the investigation pipeline. For instance, data that may be helpful to process mining that is not directly accessed or manipulated in the software process may be added to and thus become part of the investigation pipeline automatically because, even though the related data (including attributes, activities, and sequences of records, third party services, and other data sources) are not directly referenced or invoked in the software process, the inclusion of such related data may enrich the process mining insights.

However, the potential for an increase in the number of data fields and breadth of data may add computational challenges (e.g., for the mining layer 704) and/or comprehension challenges (e.g., for users of the system). For instance, an investigation pipeline for a small number (e.g., ten) data fields may be computationally tractable and understandable to a user, as combinations and permutations of a small number remain within reasonable computation time frames and user comprehension. For instance, at ten data fields, the pairwise combinations of data fields results in forty five unique pairs of data fields. In this case, each of the forty five unique pairs of data fields (each, as a factor) may be assessed for its impact on the software process. Whereas an investigation pipeline for a relatively modest number (e.g., one hundred) data fields may be computationally intractable and not understandable to a user. For instance, at one hundred data fields, the pairwise combinations of data fields results in nearly five thousand unique pairs of data fields. In this case, each of the nearly five thousand unique pairs of data fields (each, as a factor) may be assessed for its impact on the software process. This would be an exponential increase in computational resources to find factors affecting software processes. When considering combinations of more than two data fields at once or multiple layers of analysis in sequence, the computational complexity increases at a more significant rate as more factors are added. The present disclosure may address this challenge by adding factors one at a time to a thread, where each factor is selected by a user based on impact for a current subset of mining data. See FIGS. 15A-15C, 16A-16R, and 17.

In operation O1214, the recommendation engine 702C may process the recommendation request to generate a plurality of recommendations for the investigation pipeline of the software process. The recommendation engine 702C may generate a recommendation message based on the plurality of recommendations and determine to transmit the recommendation message to case UI manager 702A. For instance, the recommendation engine 702C may extract the investigation identifiers; request, from the schema ingest engine 702B, the investigation schema; request, from the data fabric 120, some or all data, or analytics thereof, associated with the software process; and request, from the process mining datastore 704D, historical use data (collectively, "recommendation data"). The recommendation engine 702C may process the recommendation data received from the data fabric and the historical use data to generate the plurality of recommendations. For instance, the recommendation engine 702C may recommend selecting data fields of the investigation schema based on: a data type of the data fields, a cardinality of underlying data or aggregations of data from the data fields, a frequency of use in previous investigation pipelines, data fields with a high impact or influence score, and/or trends in data, impact, or influence in previous investigation pipelines. The recommendation engine 702C may have logic and/or rules ("selection code") to recommend data fields.

In the case of data types, the selection code may recommend first data types always, and recommend second data types based on filters. The first data types may include identifier data types, such as software process identifier, case identifier, activity identifier, user identifier associated with activity, system identifier associated with activity, and the like. The first data types may also include event time data types and event logs data types. In some cases, the first data types may also include binary data types. In this manner, performance of process mining may be improved by selecting data fields that feed highly relevant factors for process mining—duration of an activity, time of occurrence, user taking an action, type of activity—and may reduce errors or delay in case a user omits such factors.

In some cases, the second data types may include category data types. The filters may select a category data type for recommendation if the category data type satisfies a category condition. In some cases, the category condition may be a threshold number items in the category. In some cases, the category condition may be based on a distance from the record type identifier and/or the event history record type identifier. For instance, the distance may be a count of connections between the data field and the data fields indicated by the record type identifier and/or the event history record type identifier, such as successive relationships needed to access the data field from the respective identifier. If the distance is less than a threshold distance, the selection code may recommend the data field corresponding to the category data type. In this manner, performance of process mining may be improved by selecting data fields that are nearly related (as indicated by distance) or with low cardinality (e.g., below threshold number of items).

In the case of cardinality of underlying data, the selection code may recommend data fields that have a cardinality below a threshold cardinality. For instance, the selection code may retrieve some or all of the data ("sample data") associated with the data field for the software process, and determine a count of unique values in the sample data. If the count is below the threshold cardinality, the selection code may recommend the data field. In this manner, performance of process mining may be improved by avoiding high cardinality data fields, which may not have large impacts on performance of the underlying software process.

In the case of frequency of use in previous investigation pipelines, the selection code may determine whether any data fields (e.g., fields not already recommended) of the investigation schema correspond to data fields in the historical use data and, if so, recommend the data field be included. In some cases, the historical use data may include a list of specific data fields that are used more than a threshold percent in investigation pipelines. The list of specific data fields may be managed by users of the platform 105 or dynamically generated (e.g., based on tracking across all investigation pipelines). For instance, the recommendation engine 702C may track how often a specific data field is used in investigation pipelines, how often a factor based on such data fields is in threads of investigations, and the like. The recommendation engine 702C may update the list over time based on changes in factors included in investigation pipelines, the development of new investigation pipelines, and the development and tracking of insights from new or existing investigations. In some cases, the recommendation engine 702C may determine a data field of the investigation schema is a same data type as one of the listed specific data fields.

In operation O1216, the preview engine 702D may process the preview request to generate a preview of underlying data of the software process. The preview engine 702D may generate a preview message based on the underlying data of the software process and determine to transmit the preview message to case UI manager 702A. For instance, the preview engine 702D may extract the investigation identifiers; request, from the schema ingest engine 702B, the investigation schema; and request, from the data fabric 120, some or all data associated with the software process. In some cases, the preview engine 702D may request a sample of data from the data fabric 120 in accordance with the investigation schema, so that examples of underlying data may be presented to users. In some cases, the preview engine 702D may request the samples based on data fields recommended by the recommendation engine 706C. In some cases, the preview engine 702D may request the samples as users make selections of data fields to be included. In some cases, the preview engine 702D may stage sample data or request the sample data as-needed. In this manner, by using the data fabric 120, the preview engine 702D may query and retrieve data hosted by the platform 105 or data fields of third party services for preview to the user.

In operation O1218, the preview engine 702D may transmit the preview message to the case UI manager 702A. The case UI manager 702A may receive the preview message.

In operation O1220, the recommendation engine 702C may transmit the recommendation message to the case UI manager 702A. The case UI manager 702A may receive the recommendation message.

In operation O1222, the schema ingest engine 702B may transmit the investigation schema message to the case UI manager 702A. The case UI manager 702A may receive the investigation schema message.

In operation O1224, the case UI manager 702A may process the recommendation message, the investigation schema message, and the preview message (and, if from point A from operation O1232, custom data field data); generate pipeline GUI data; and transmit the pipeline prompt GUI data to the user device 135. In the case of a web application or mobile application, the user device 135 may display a pipeline GUI with the pipeline GUI data populated in a defined format associated with the pipeline GUI. In this manner, the ordered data structure, recommendations, and preview may be displayed to a user for their consideration.

The user device 135 and the case UI manager 702A may communicate back and forth based on user interactions with the pipeline GUI. In some cases, when updated preview data is requested or determined to be likely to be needed, the case UI manager 702A may transmit a request to the preview engine 702D, receive responsive new preview data from the preview engine 702D, and transmit the new preview data to the user device 135. Generally, the user interactions may explore the ordered data structure, the recommendations, and the preview; make selections to add or remove data fields; save progress; proceed to development of custom data fields (see O1226 through O1232); and approve the investigation pipeline to investigate a software process.

In the case a user interaction requests development of custom data fields, the case UI manager 702A may proceed to generate a custom data field request. The custom data field request may be generated based on user interactions on a custom field GUI. The custom field GUI may include templates for different functions to perform defined operations on one or more data fields. In some cases, the one or more data fields may include existing data fields of the investigation schema. In some cases, the one or more data fields include existing data fields and custom data fields. Moreover, as custom data fields are developed, the case UI manager 702A may transmit updates to the investigation schema to the various components, such as the schema ingest engine 702B (e.g., to update the ordered data structure) and the preview engine 702D (e.g., to populate preview data for the custom data field). The templates may include one or combinations of: groups based on aggregations of data in data fields, groups based on ranges of data in data fields, and groups based on date differences in data in data fields or associated with events.

In the case of groups based on aggregations, the custom field GUI may include selectable elements that configure an aggregation function to aggregate a data field from a one-to-many relationship. For instance, the aggregation function may calculate a sum, an average, a count, a maximum, a minimum, or a distinct count. The aggregation function may then group the data based on the results. For instance, the custom field GUI may provide a first selection element, a second selection element, a grouping selection interface, and a filter interface. The first selection element may be configured to select a data field to operate on. The second selection element may be configured to select a type of aggregation function.

The grouping selection interface may provide elements to indicate a number of groups and elements to define how to separate aggregations into the groups. For instance, the elements to define how to separate aggregations may enable a user to indicate low and/or high threshold that enable separation of data in a data field into numerous groups.

The filter interface may provide filter elements for user interaction. The filter elements may enable a user to select related fields and one or more operators, and specify one or more values, corresponding to the number of operators, and apply the filter to identify data satisfying the specific condition or conditions imposed by the operators. For example, the filter interface may be used to filter data for inclusion in an investigation pipeline associated with records in which the value in a particular field exceeds a certain value, is equal to a particular value, or includes a certain string, and the like.

In some cases, the custom field GUI may include a derived value preview field. The custom field GUI may provide a test element that is user-selectable to transmit a request to run a current configuration of the custom data field request, so that a user may view outputs of the configuration to ensure the configuration operates in the way that the user expects.

In the case of groups based on ranges, the custom field GUI may include selectable elements that configure a range function to group values of a data field from a one-to-many relationship into groups based on defined ranges. The range function may include user-entered threshold values that split the data into at least two groups. Like with the aggregation function, the custom field GUI may provide the first selection element, elements to indicate a number of groups, and elements to define how to separate values into the groups.

In the case of groups based on date differences, the custom field GUI may include selectable elements that configure a date function to group values of a data field or values associated with an event based on time. For instance, the date function may calculate the difference between two date or date and time fields and organize the difference into groups. The date function may include user-entered values that configure how to retrieve data from data fields, set a date or date and time, and split the data into at least two groups. Like with the aggregation function, the custom field GUI may provide the first selection element (in this case, limited to date or data and time fields), elements to indicate a number of groups, and elements to define how to separate values into the groups.

In operation O1226, the case UI manager 702A may transmit the custom data field request to the derivative engine 702E. The derivative engine 702E may receive the custom data field request.

In operation O1228, the derivative engine 702E may process the custom data field request and generate logic and/or rules ("custom data field code") based on the custom data field request. The custom data field code may be configured to obtain data from one or more existing data fields ("base data") and transform the base data into a derived value to be stored in a custom data field. The custom data field code may be a parameterized function that takes values ("custom data field parameters") from the custom data field request, and instantiates executable code to perform defined functions (e.g., the aggregation function, the range function, the date function).

The derivative engine 702E may generate a derived value preview based on sample data (e.g., from the preview engine 702D). For instance, the custom data field code may process the sample data to generate derived values, and generate the derived value preview based on the sample data and the derived values.

In operation O1230, the derivative engine 702E may transmit the derived value preview to the case UI manager 702A. The case UI manager 702A may receive derived value preview.

In operation O1232, the case UI manager 702A may transmit the derived value preview to the user device 135, so that the user may view the derived values. If the user interactions indicate adjustments to the custom data field request, the case UI manager 702A may proceed to point A and return to operation O1224. If the user interactions indicate an approval of the investigation pipeline to production, the case UI manager 702A may: (1) generate a production version of the investigation pipeline, and (2) proceed to point B, to ingest data using the investigation pipeline and populate data for process mining.

To generate a production version of the investigation pipeline, the case UI manager 702A may obtain event data configurations, a production schema, and, if any, custom data field parameters ("pipeline production data"). The case UI manager 702A may then generate a data ingest software process based on the pipeline production data, for example using a templated object. See FIG. 4. For instance, the development system 130 may generate a logical unit that is a software executable version of the data ingest software process. The logical unit may include a plurality of software units to perform defined functions (e.g., data retrieval, data manipulation, and data storage) to obtain data for process mining, transform the data into process mining data, and store the process mining data in the process mining data store 704D.

To obtain the event data configurations, the case UI manager 702A may provide an event data configuration GUI for event data fields. The event data configuration GUI may include selection elements to select or deselect event data fields. In some cases, the event data configuration GUI includes recommendations (e.g., pre-selected event data fields). Based on user interactions, the event data configuration GUI may determine which event data event fields should be included in the investigation pipeline.

To obtain the production schema, the case UI manager 702A may obtain a current version of selected data fields and a current version of the selected event data fields. The case UI manager 702A may generate the production schema based on the current version of selected data fields and the current version of the selected event data fields. The production schema may indicate that the data fields and event data fields are to be accessed and data retrieved for data ingest to process mining.

In operation O1234, the data transform engine 702F may host the production version of the investigation pipeline, and, based on a data ingest trigger condition, initiate data ingest using the investigation pipeline. The data ingest trigger condition may be a user request to perform an investigation using the investigation pipeline (e.g., to reduce data ingest without investigations being performed unnecessarily). The data ingest trigger condition may be periodic (e.g., every day, every week etc.) (e.g., update tracking data and/or pre-stage data for investigation). To initiate the data ingestion, the data transform engine 702F may obtain the production schema, and, if any, custom data field parameters for the production version of the investigation pipeline. Based on the production schema, the data transform engine 702F may generate a process mining data request. The process mining data request may indicate the data fields and the event data fields.

In operation O1236, the data transform engine 702F may transmit the process mining data request to the data fabric 120. The data fabric 120 may receive the process mining data request.

In operation O1238, the data fabric 120 may, based on the data fields and event data fields, retrieve data ("raw data") from the data fields and event data fields using the virtualization layer 506, as authorized by the IAM engine 514. In this manner, the process mining data may include data from any data stores of the platform 105 and any third party services or other data sources.

In operation O1240, the data fabric 120 may transmit the raw data to the data transform engine 702F. The data transform engine 702F may receive the raw data.

In operation O1242, the data transform engine 702F may process the raw data to generate process mining data. To process the raw data to generate process mining data, the data transform engine 702F may filter the raw data and apply, if any, custom data field functions to generate derived values for custom data fields.

In some cases, the filtering includes removing data that does not satisfy a selection criteria. In some cases, the selection criteria may be specified by the user through the GUI, or by the process mining system. For instance, null values may be removed. In some cases, data of cases with null values may be removed entirely from the raw data. In some cases, only the null values may be removed, so that even irregular cases may be analyzed for impacts on software processes.

In operation O1244, the data transform engine 702F may transmit the process mining data to the data ingest engine 704A. The data ingest engine 704A may receive the process mining data.

In operation O1246, the data ingest engine 704A may process the process mining data by managing versions of the process mining data (e.g., from one data ingest trigger condition to a next ingest trigger condition). For instance, the data ingest engine 704A may associate the new process mining data with a data ingest identifier, so as to track changes in the process mining data. In some cases, the data ingest engine 704A may also invoke the analytics engine 704B to pre-stage factors and/or analytics based on the process mining data (e.g., using a default parameter, or for each type of parameter). The data ingest engine 704A may package the process mining data, the data ingest identifier, and, optionally the pre-staged factors and/or analytics ("packaged mining data") for storage in the processing mining data store 704D.

In operation O1248, the data ingest engine 704A may transmit the packaged mining data to the process mining data store 704D. The process mining data store 704D may receive the packaged mining data.

In operation O1250, the process mining data store 704D may store the packaged mining data. If a user requests an investigation before the next data ingest trigger condition, the process mining datastore 704D may serve the packaged mining data. In some cases, the process mining datastore 704D may determine which packaged mining data may be used to serve in response to a request (e.g., based on time periods of an investigation).

Turning to FIGS. 13A-13M, the graphical user interfaces 1300A-1300M depict sequences and interactions on the user devices 135 to develop investigation pipelines for software processes. Generally, the user device 135 may have data stored but not depicted in graphical user interfaces until, or in response to, user interactions that are processed by a client-side application to present new data or graphical user interfaces. In some cases, the user device 135 may transmit requests to or receive updates from the case UI manager 702A to display additional data, or to transmit user selections and/or interactions. In some cases, certain graphical user interfaces may be omitted (e.g., if user interactions do invoke those graphical user interfaces). In some cases, the graphical user interfaces may be conditioned on previous graphical user interfaces. In some cases, the graphical user interfaces may be displayed in response to different user interactions (e.g., from different graphical user interfaces).

Figure 13A:
Figure 14:
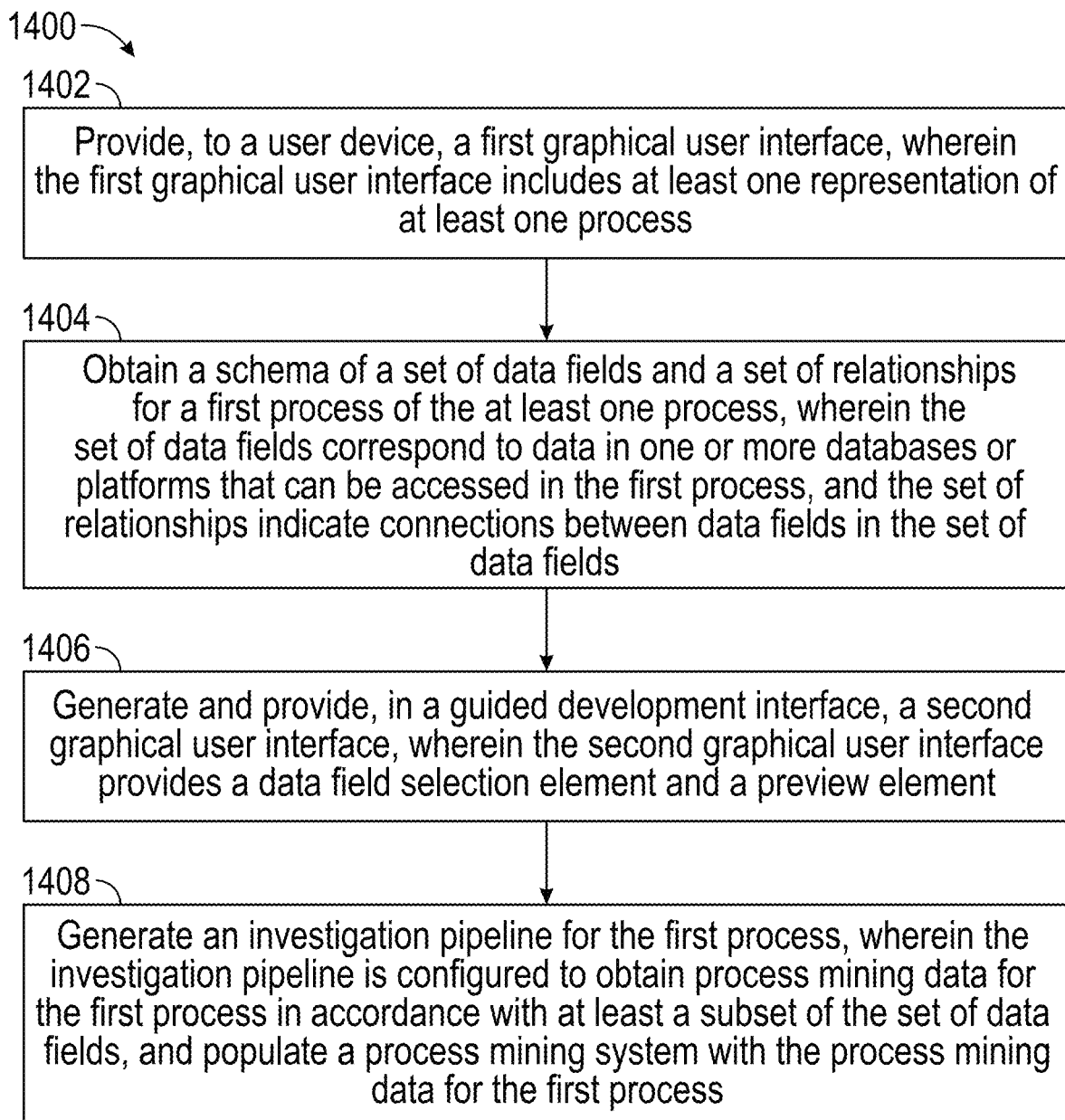
FIG. 14 depicts a flowchart for process mining using an integrated data fabric.

In FIG. 13A, GUI 1300A may depict a first stage 1300A-1 after launching a guided development interface for a software process. The GUI 1300A may display links to other stages, such as a second stage 1300A-2, a third stage 1300A-3, a fourth stage 1300A-4, and a fifth stage 1300A-5. Each stage may have a different structure to display different data and options to a user. The first stage 1300A-1 may enable user selection of a primary record type for the software process. The second stage 1300A-2 may enable user selection of a primary event history record type. The third stage 1300A-3 may enable user selection of data fields for the investigation pipeline. The fourth stage 1300A-4 may enable user configuration of event data. The fifth stage 1300A-5 may enable user selection of process properties.

The GUI 1300A may also display a filter element 1300A-6 and a results section 1300A-7. The filter element 1300A-6 may enable users to make selections and/or inputs to filter the record types of the software process. The results section 1300A-7 may display all, or filtered, subsets of record types of the software process.

In FIG. 13B, GUI 1300B may depict record types 1300B-1, or a filtered subset of such record types, of the software process. The record types 1300B-1 displayed may be based on a set of filters 1300B-2 (e.g., based on user interactions with the filter element 1300A-6).

The user may make a selection of a record type 1300B-1 of the software process and proceed to the second stage 1300A-2. For instance, the user may select the link to the second stage 1300A-2, or click a next button. For stages 1300A-1 to 1300A-5, the links or next button may not be enabled until a user selection is made.

Figure 13C:
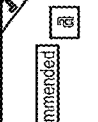

In FIG. 13C, GUI 1300C may depict the second stage 1300A-2 to enable user selection of a primary event history record type. The GUI 1300C may depict a recommended event record 1300C-1, a filter element 1300C-2 to enable searching for event records and other records, and a results section 1300C-3. The recommended event record 1300C-1 may be an event record that satisfies an event record condition. For instance, the event record condition may determine whether the event record includes all of the following: identifier, timestamp, event category identifier, and initiator. As discussed herein, automated objects to create event records that satisfy this condition may be used to enhance and improve process mining. Software processes that have this functionality enforced (and remain compliant) may be recommended as the recommended event record 1300C-1.

The filter element 1300C-2 may enable users to make selections and/or inputs to filter the event record types and other record types of the software process. The results section 1300C-3 may display all, or filtered, subsets of event record types and record types of the software process.

The user may make a selection of an event record type (or accept the recommended event record) of the software process and proceed to the third stage 1300A-3. For instance, the user may select the link to the third stage 1300A-3, or click a next button. In some cases, the links or next button may not be enabled until a user selection is made.

Figure 13D:
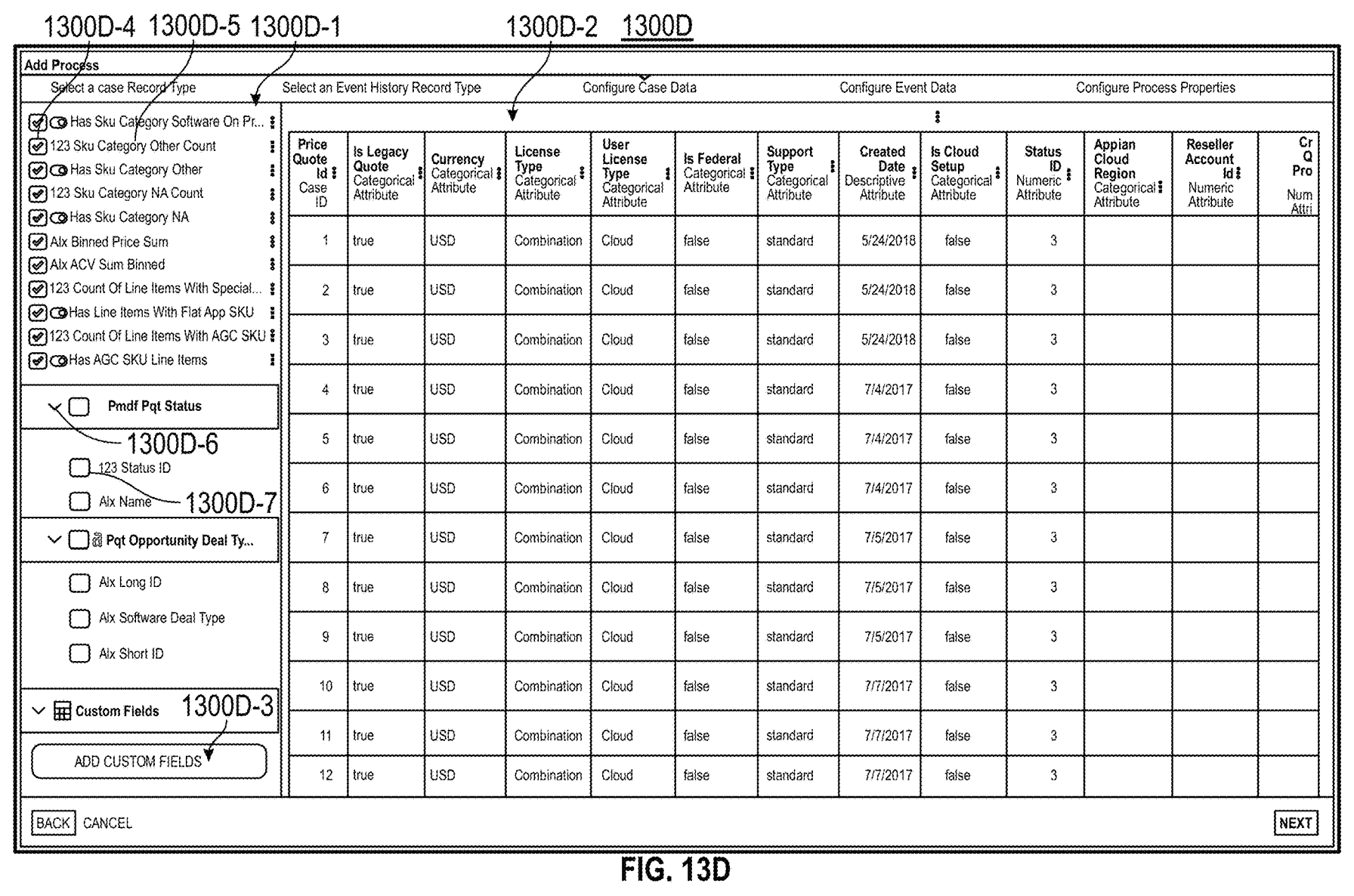

In FIG. 13D, GUI 1300D may depict the third stage 1300A-3 to enable user selection of data fields for the investigation pipeline. The GUI 1300D may depict a first graphical representation 1300D-1, a second graphical representation 1300D-2, and a custom field development request element 1300D-3.

The first graphical representation 1300D-1 may depict a graphical representation of the ordered data structure for the software process. The graphical representation may correspond to the ordered data structure. For instance, including representations of the data fields directly related to a primary record type on a first layer, and nested representations for nested connections to other data fields. While only two layers are shown in first graphical representation 1300D-1, an arbitrary number of deeper nested connections may be depicted to accurately reflect a connection relationship between data fields.

The first graphical representation 1300D-1 may include a selection element 1300D-4 for each data field 1300D-5. As discussed herein, a selection element for a data field may be pre-selected for data fields recommended by the recommendation engine 702C. In the case of nested connections, the first graphical representation 1300D-1 may include a nested connection indicator 1300D-6 and any nested data fields 1300D-7 in accordance with the nested connection indicator 1300D-6. In some cases, the nested connection indicator 1300D-6 may be an indent in a structure of the first graphical representation 1300D-1. In some cases, the nested connection indicator 1300D-6 may take other forms, such as menus, links, graphs, and the like.

The second graphical representation 1300D-2 may depict a graphical representation of the preview of underlying data of the software process. The second graphical representation 1300D-2 may depict a tabular view of data, such as data field title or name in columns and data of the data field in rows.

The second graphical representation 1300D-2 may show all data fields of the investigation schema, or only selected data fields. In the case that all data fields extend beyond an edge of the GUI 1300D, the GUI 1300D may be user navigable to view portions beyond the edge.

The custom field development request element 1300D-3 may be user-selectable to launch a user interface to define custom data fields.

In FIG. 13E, GUI 1300E may depict a first custom fields interface 1300E-1. The GUI 1300E may display links to other custom fields interfaces, such as a second custom fields interface 1300E-2, and a third custom fields interface 1300E-3. Each stage may have a different structure to display different data and options to a user. The first custom fields interface 1300E-1 may enable user selection of custom field parameters for the aggregation function. The second custom fields interface 1300E-2 may enable user selection of custom field parameters for a range function. The third custom fields interface 1300E-3 may enable user selection of custom field parameters for a data function. The GUI 1300E may also display aggregation context information 1300E-4 for an aggregation function.

Figure 13F:
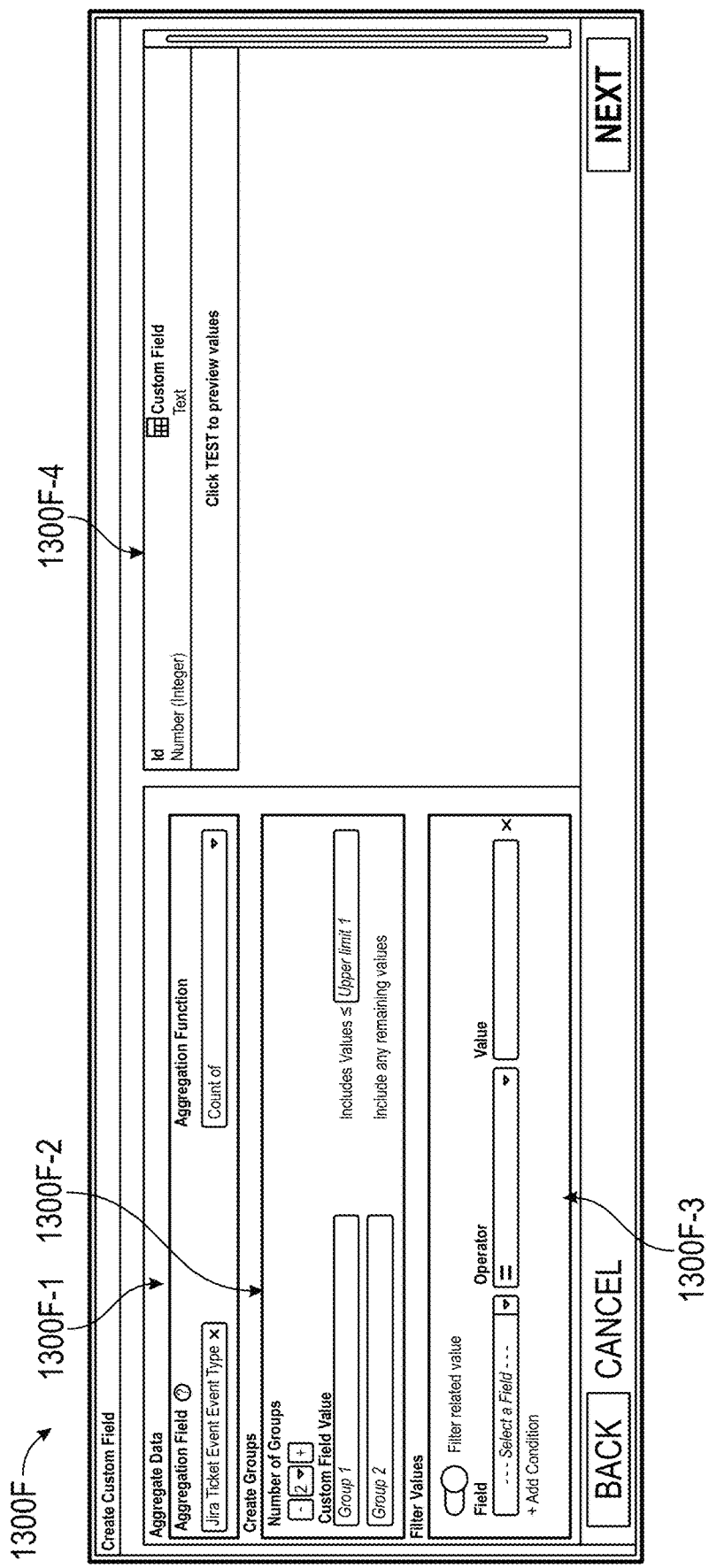

In FIG. 13F, GUI 1300F may depict the first custom fields interface 1300E-1 to enable user selection of custom field parameters for the aggregation function. The GUI 1300F may depict data field selection and aggregation function type selection elements 1300F-1, grouping selection elements 1300F-2, filtering selection elements 1300F-3, and a data preview 1300F-4 of derived values. Based on user interactions of the elements 1300F-1 through 1300F-3, a custom data field for an aggregation function may be developed.

In FIG. 13G, GUI 1300G may depict nested connections 1300G-1 for data field selection. For example, the nested connections 1300G-1 may be displayed in response to a user interaction with the data field selection and aggregation function type selection elements 1300F-1.

Figure 13H:
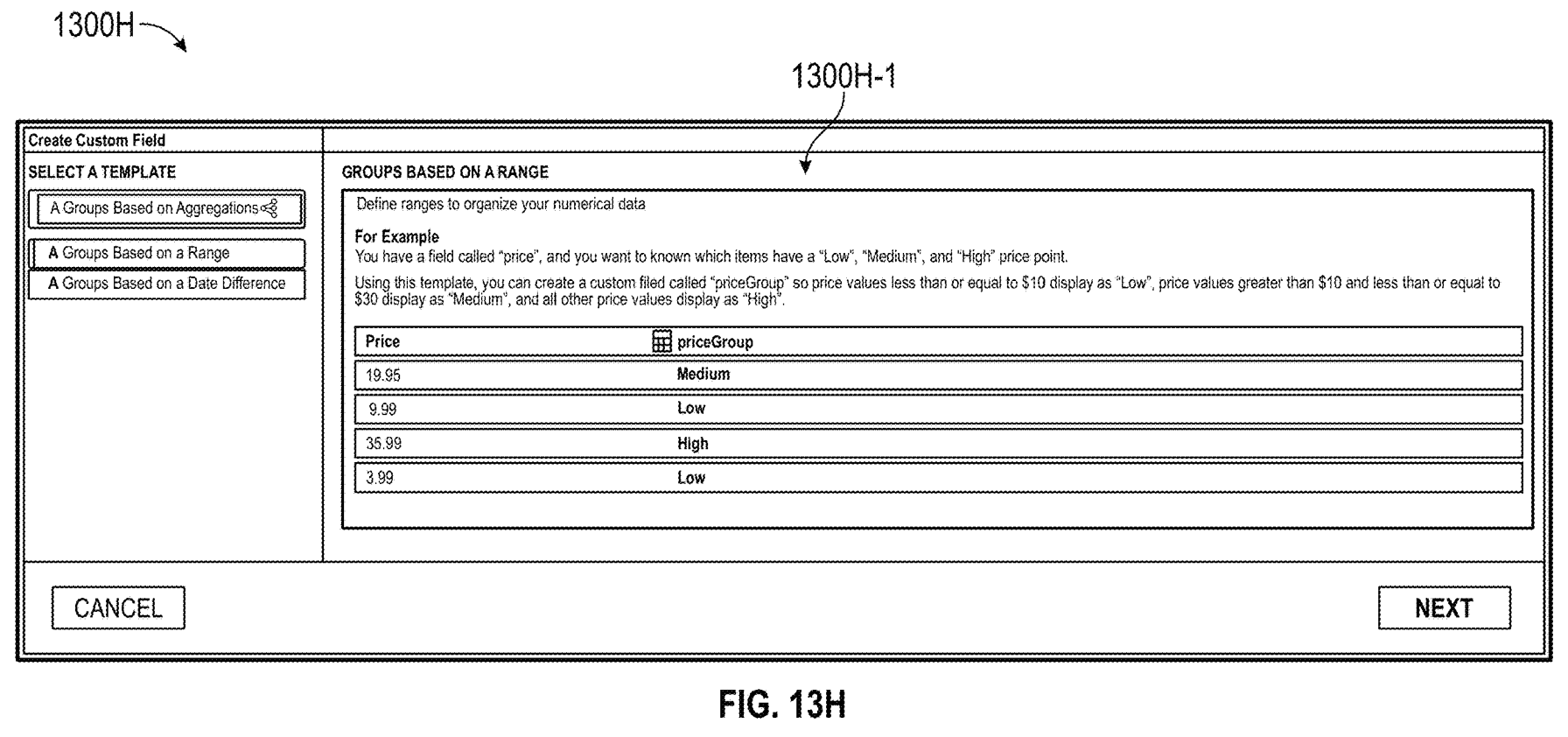

In FIG. 13H, GUI 1300H may display range context information 1300H-1 for a range function for the second custom fields interface 1300E-2 to enable user selection of custom field parameters for a range function.

Figure 13I:
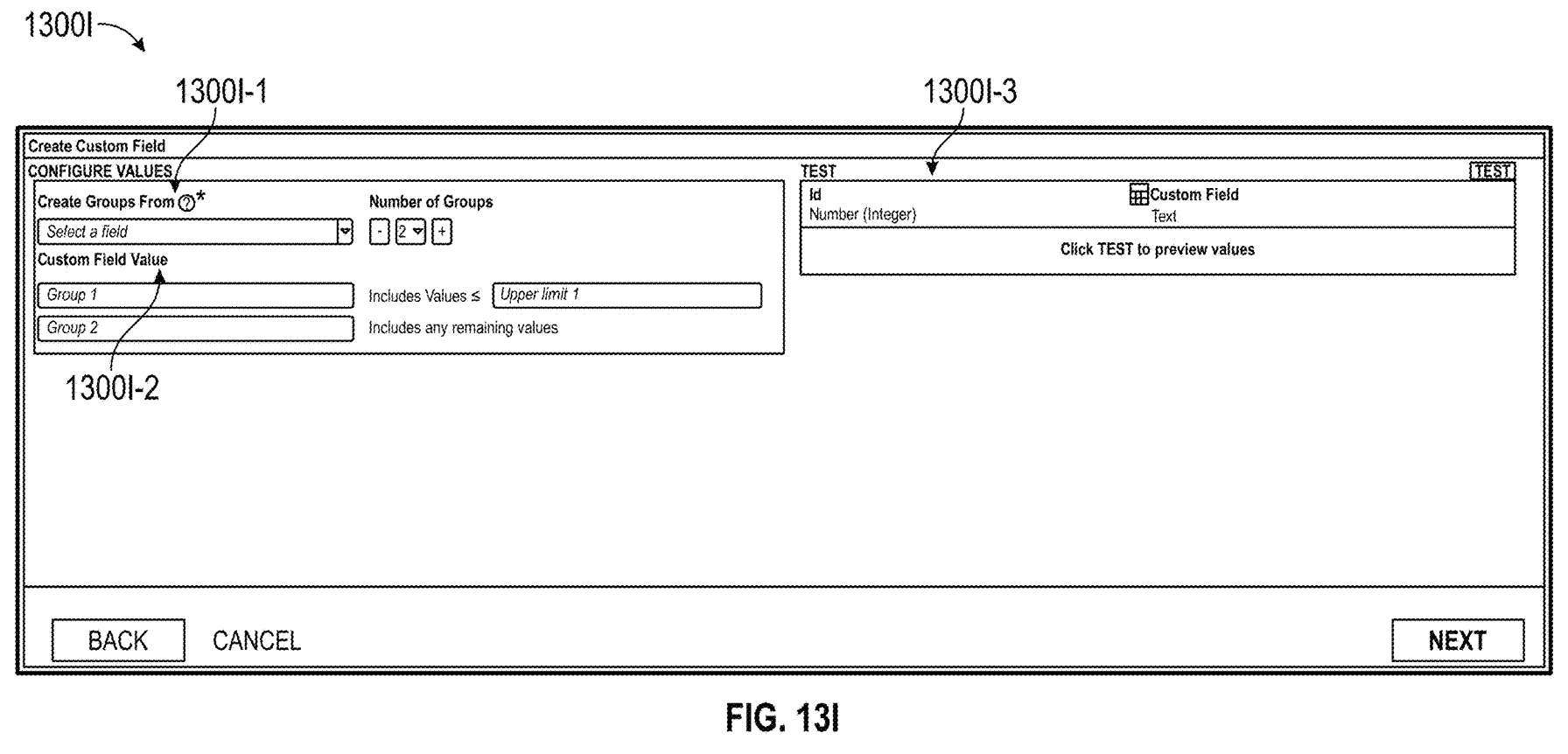

In FIG. 13I, GUI 1300I may depict the second custom fields interface 1300E-2 to enable user selection of custom field parameters for a range function. The GUI 1300I may depict a data field selection element 1300I-1, grouping selection elements 1300I-2, and a data preview 1300I-3 of derived values. Based on user interactions with data field selection element 1300I-1, a field of the investigation schema may be selected and used to create a specified number of groups of records in the investigation. Grouping selection elements 1300I-2 may accept as inputs the names of each group, as well as values representing threshold values for the field selected in data field selection element 1300-1 which determine whether any given record of the records in the investigation are within that group. To facilitate preview of the records in each group and the number of records in each group, data preview 1300I-3 may display investigation records within the groups specified within the group selection elements 1300I-2 upon a user clicking a test button. Based on user interactions of the elements 1300I-1 through 1300I-2, a custom data field for a range function may be developed.

In FIG. 13J, GUI 1300J may display date context information 1300J-1 for a date function for the third custom fields interface 1300E-3 to enable user selection of custom field parameters for a date function.

Figure 13K:
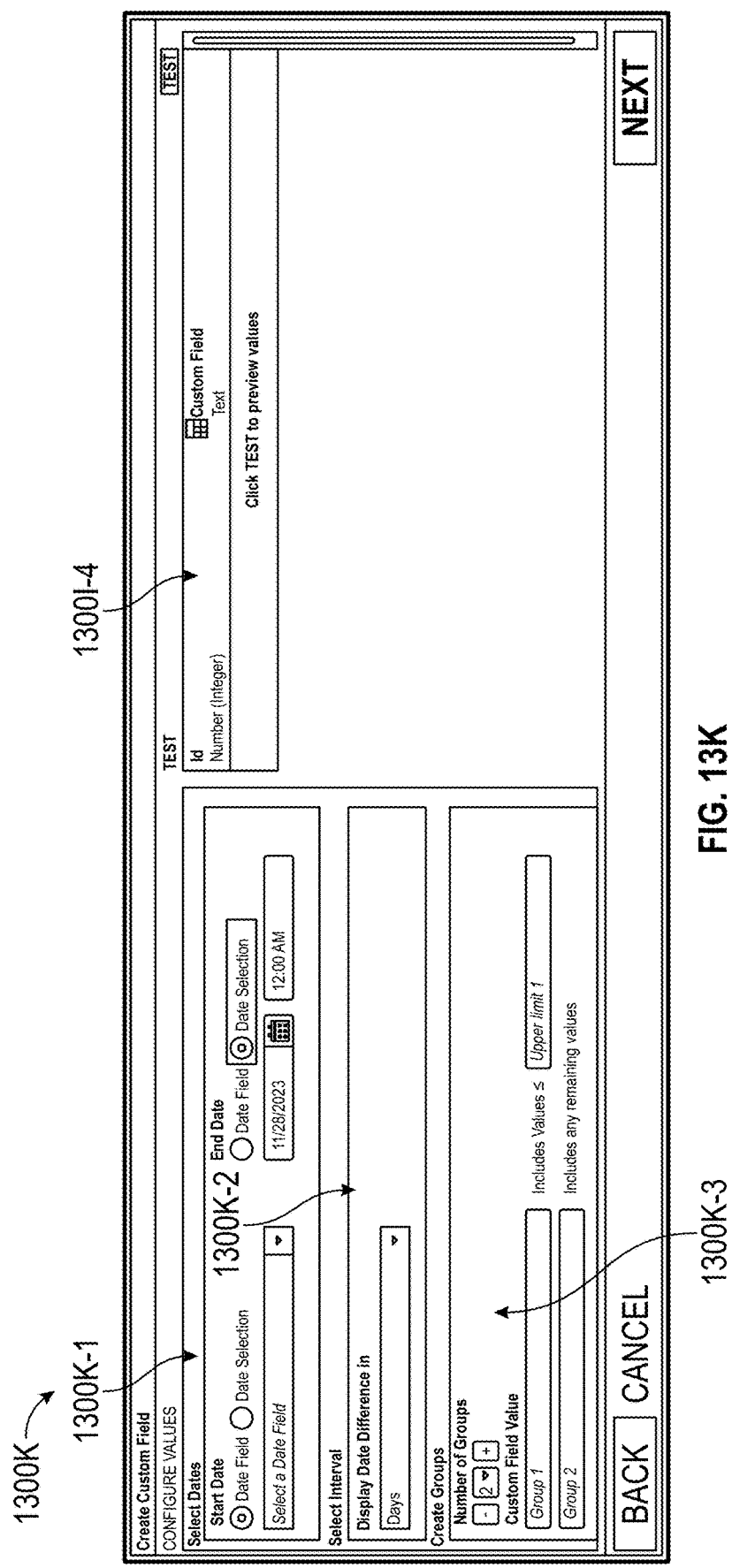

In FIG. 13K, GUI 1300K may depict the third custom fields interface 1300E-3 to enable user selection of custom field parameters for a data function. The GUI 1300K may depict date field selection or date input selection elements 1300K-1, data format selection elements 1300K-2, grouping selection elements 1300K-3, and a data preview 1300K-4 of derived values. Based on user interactions with date input selection element 1300K-1, a start date field of the investigation schema may be selected, or a start date (and time) may be selected by a user interaction with one or more input interface elements, and an end date field of the investigation schema may be selected, or an end date (and time) may be selected by a user interaction with one or more input interface elements, and such start date and end date used to identify records in the investigation and used to create a specified number of groups of records in the investigation. Data format selection elements 1300K-2 may be used to specify the display of time periods between the start and end dates determined by the date input selection element 1300K-1. Grouping selection elements 1300K-3 may accept as inputs the names of each group, as well as values representing threshold values for the period specified in the data selection elements 1300K-2 for the records identified by date input selection element 1300K-1. To facilitate preview of the records in each group and the number of records in each group, data preview 1300K-4 may display investigation records within the groups specified within the group selection elements 1300K-3 upon a user clicking a test button. Based on user interactions of the elements 1300K-1 through 1300K-3, a custom data field for a date function may be developed.

The user may make a selections of selection elements 1300D-4 and/or the custom field development request element 1300D-3 (or accept the recommended set of data fields), and proceed to the fourth stage 1300A-4. For instance, the user may select the link to the fourth stage 1300A-4, or click a next button. In some cases, the links or next button may not be enabled until a user selection is made.

In FIG. 13L, GUI 1300L may depict the fourth stage 1300A-4 to enable user configuration of event data. The GUI 1300L may include a search field 1300L-1, a first graphical representation 1300L-2, a custom field development request element 1300L-3, a second graphical representation 1300L-4, and a filters interface 1300L-5. The search field 1300L-1 may enable user selections and/or inputs to search event record data fields.

The first graphical representation 1300L-2 may depict a graphical representation of the ordered data structure for the software process, filtered to event records. The graphical representation may correspond to the ordered data structure. For instance, including representations of the data fields directly related to a primary event record type on a first layer, and (if any) nested representations for nested connections to other event record data fields. While only one layer is shown in first graphical representation 1300L-1, an arbitrary number of deeper nested connections may be depicted to accurately reflect a connection relationship between data fields.

The first graphical representation 1300L-1 may include a selection element 1300L-6 for each event data field 1300L-7. As discussed herein, a selection element for an event data field may be pre-selected for event data fields recommended by the recommendation engine 702C. In the case of nested connections, the first graphical representation 1300L-1 may include a nested connection indicator and any nested data fields in accordance with the nested connection indicator. In some cases, the nested connection indicator may be an indent in a structure of the first graphical representation. In some cases, the nested connection indicator may take other forms, such as menus, links, graphs, and the like.

The custom field development request element 1300L-3 may be user-selectable to launch a user interface to define custom event data fields.

The second graphical representation 1300L-4 may depict a graphical representation of the preview of underlying data of the software process. The second graphical representation 1300L-4 may depict a tabular view of event data, such as data field title or name of event records in columns and data of the event data field in rows. The second graphical representation 1300L-4 may show all event data fields of the investigation schema, or only selected event data fields. In the case that all event data fields extend beyond an edge of the GUI 1300L, the GUI 1300L may be user navigable to view portions beyond the edge.

The filters interface 1300L-5 may be user-selectable to launch a user interface to define custom filters to be applied to event data.

The user may make selections to configure the event records of the software process for the investigation pipeline, and proceed to the fifth stage 1300A-5. For instance, the user may select the link to the fifth stage 1300A-5, or click a next button. In some cases, the links or next button may not be enabled until a user selection is made.

In FIG. 13M, GUI 1300M may depict the fifth stage 1300A-5 to enable user selection of process properties. The GUI 1300M may depict descriptive properties fields 1300M-1 and security fields 1300M-2. The descriptive properties fields 1300M-1 may include elements to receive user interactions and/or inputs to name and/or describe the investigation pipeline. The security fields 1300M-2 may include elements to receive user interactions and/or inputs to indicate users, groups of users, and the like which may modify or view the investigation pipeline, and perform investigations using the investigation pipeline and the like.

The user may make selections to configure the descriptive data and/or security of the investigation pipeline, and proceed to approve the investigation pipeline for production. For instance, the user may click a save or finish button. In some cases, the save or finish button may not be enabled until a user selection is made.

Turning to FIG. 14, the flowchart 1400 may depict operations to develop investigation pipelines for software processes. The flowchart 1400 may be performed by one or more components described herein, such the process mining system 110.

In block 1402, the process mining system 110 may provide, to a user device, a first graphical user interface, as discussed herein. The first graphical user interface may include at least one representation of at least one process.

In block 1404, the process mining system 110 may obtain a schema of a set of data fields and a set of relationships for a first process of the of at least one process, as discussed herein. The set of data fields may correspond to data in one or more databases or platforms that can be accessed in the first process. The set of relationships may indicate connections between data fields in the set of data fields.

In block 1406, the process mining system 110 may generate and provide, in a guided development interface, a second graphical user interface. The second graphical user interface may provide a data field selection element and a preview element, as discussed herein.

In block 1408, the process mining system 110 may generate an investigation pipeline for the first process, as discussed herein. The investigation pipeline is configured to obtain process mining data for the first process in accordance with at least a subset of the set of data fields, and populate a process mining system with the process mining data for the first process.

Process Mining Using Ordered Insights

Figure 15A:
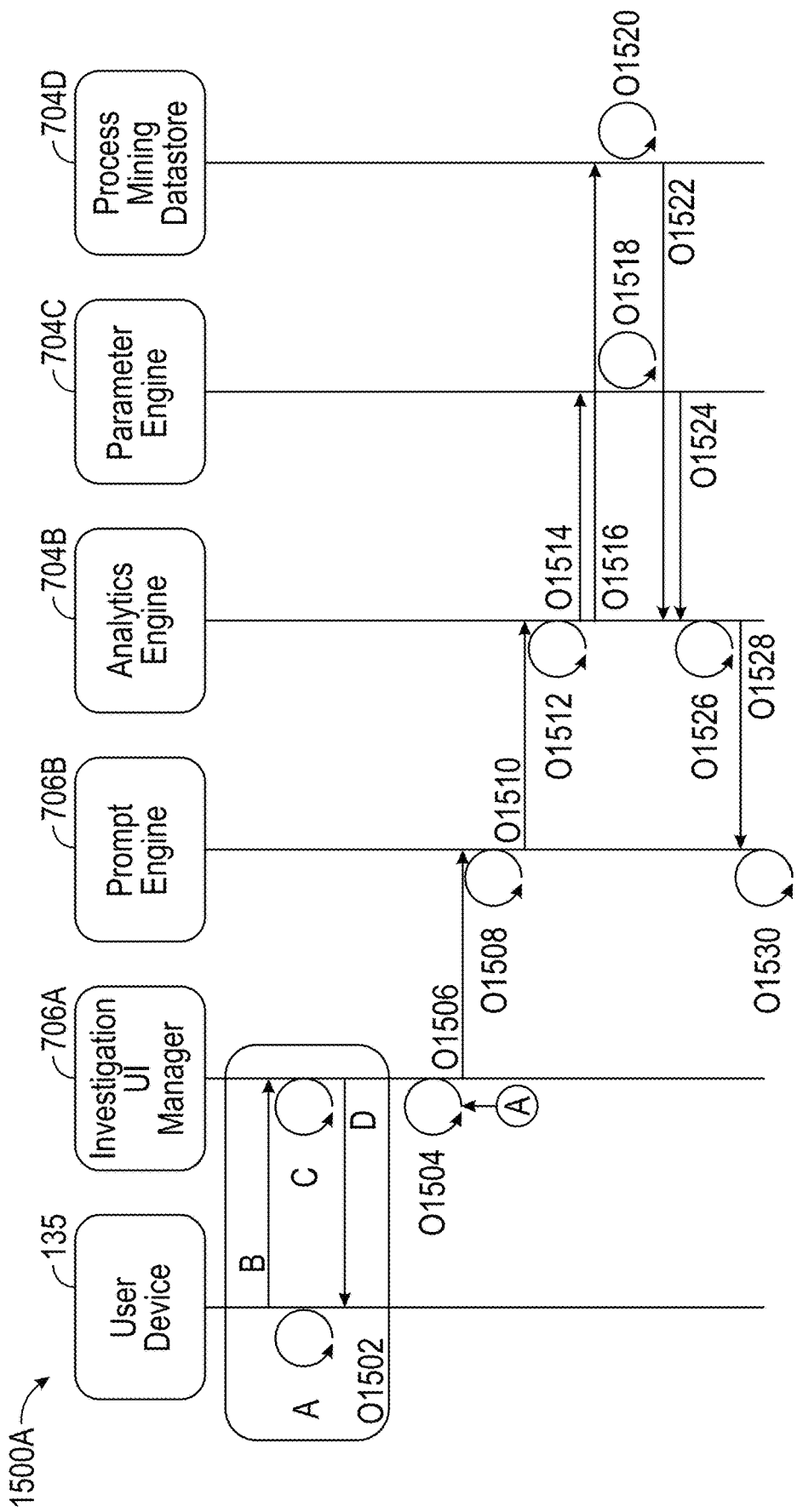
FIGS. 15A-15C depict data flow diagrams for process mining using ordered insights.
Figure 15B:
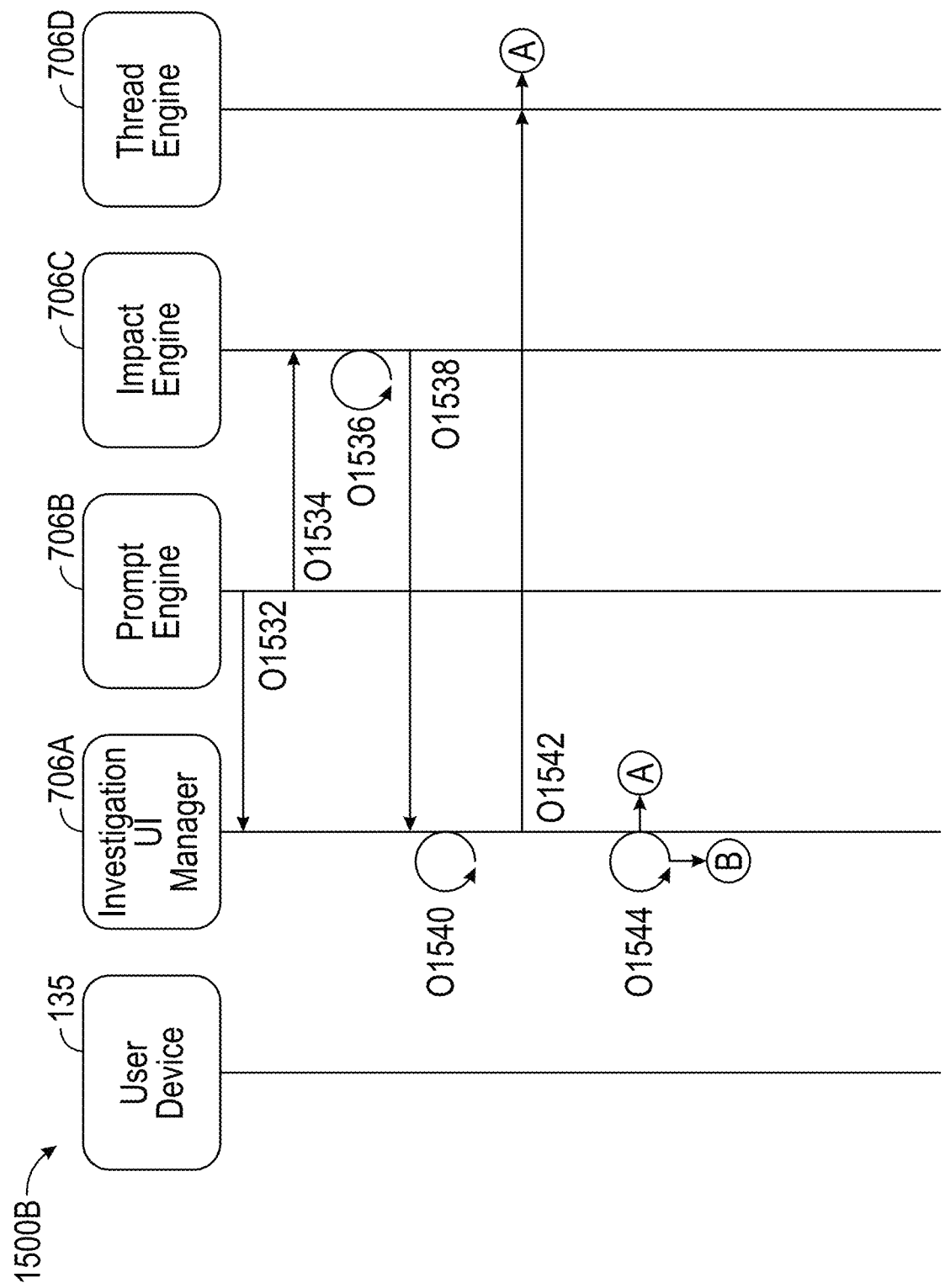
Figure 15C:
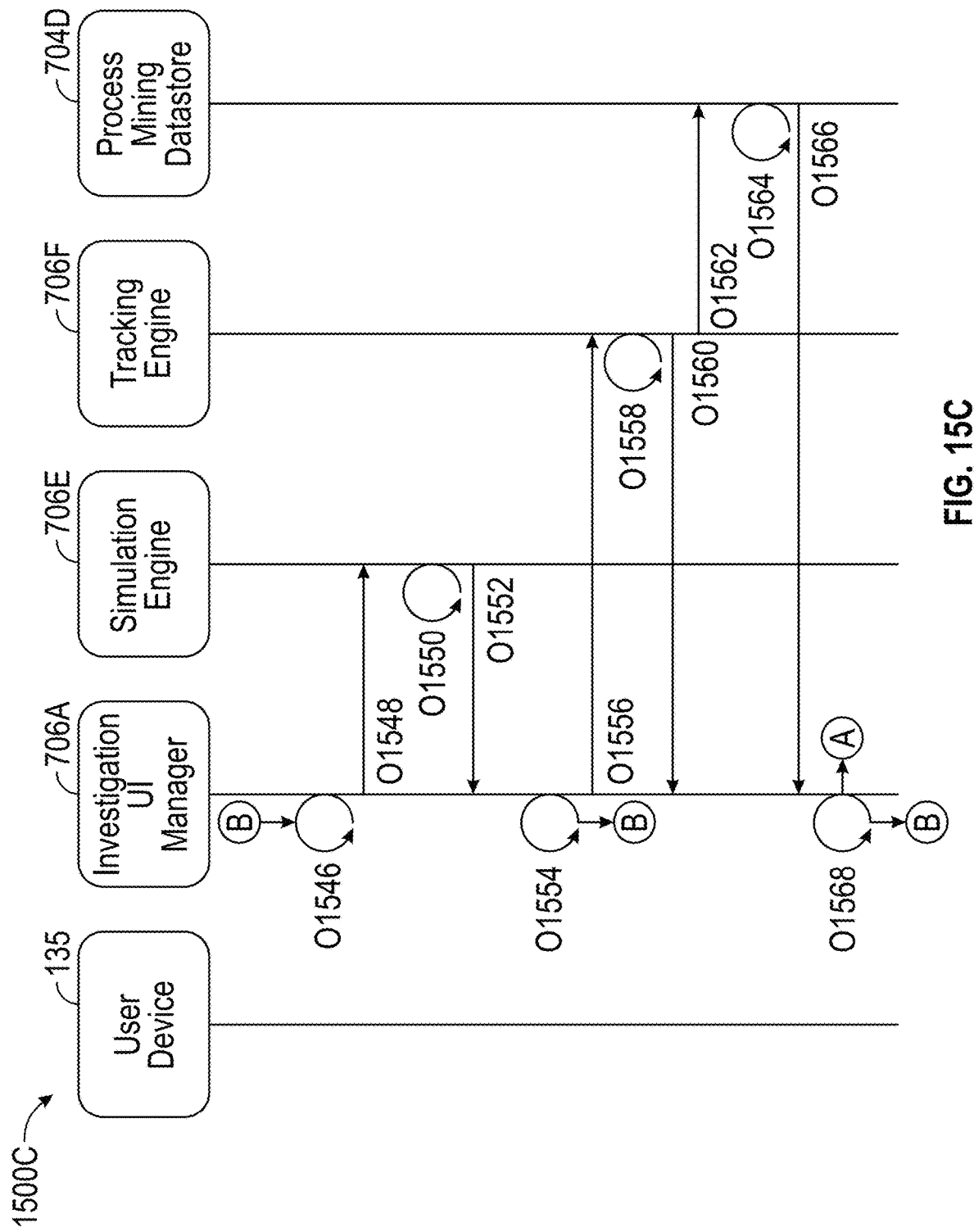
Figure 16A:
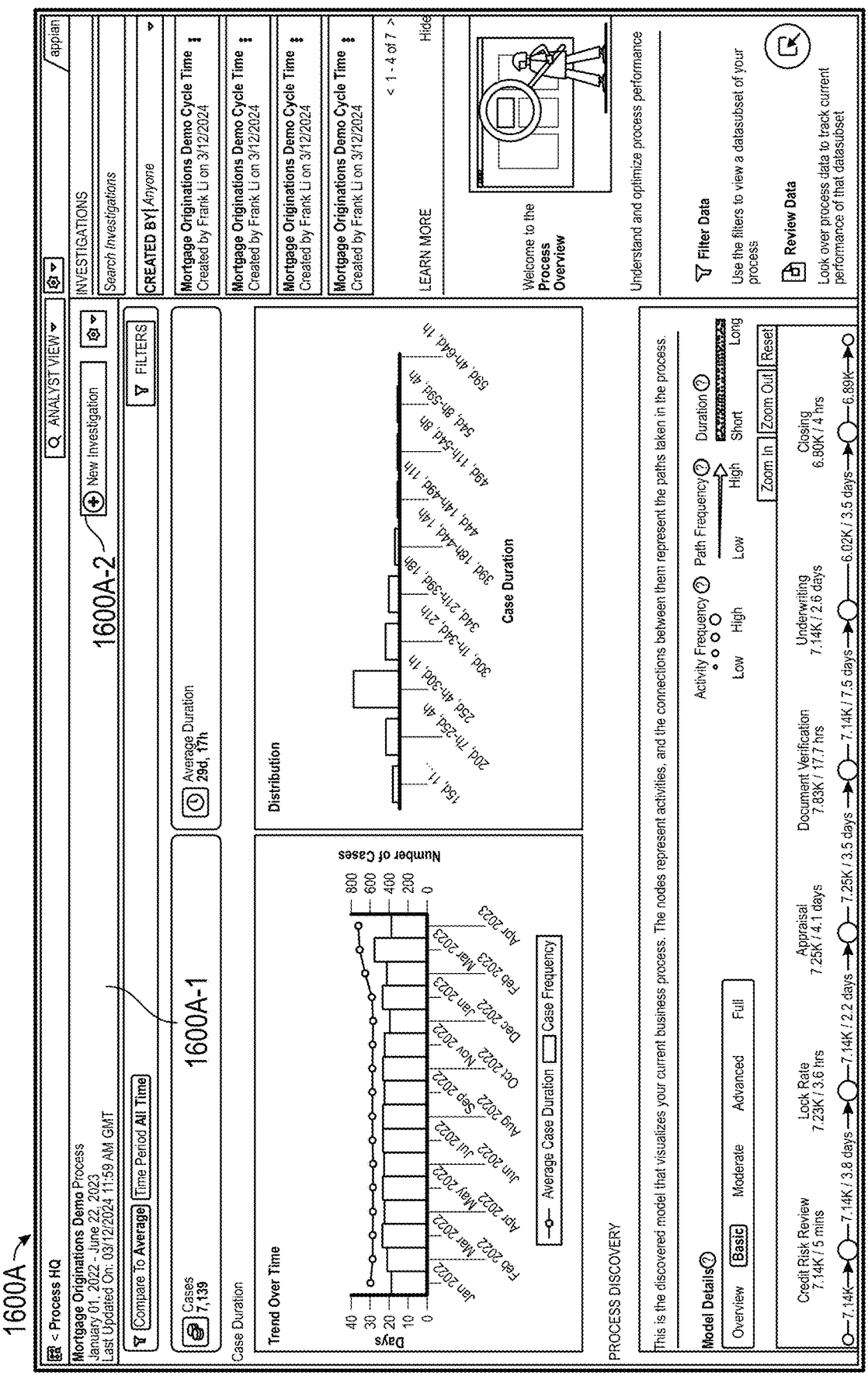
FIGS. 16A-16R depict graphical user interfaces for process mining using ordered insights.
Figure 16B:
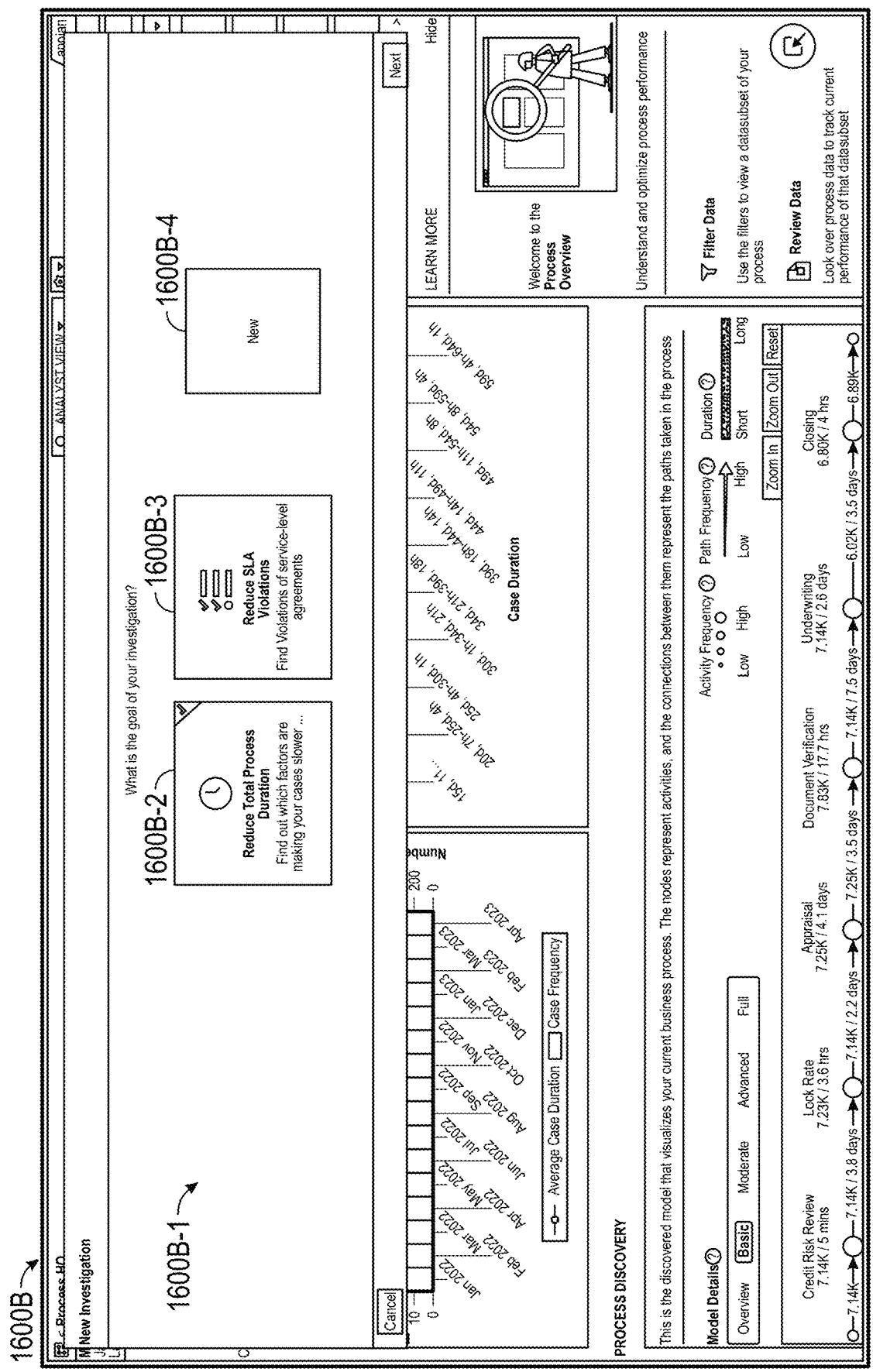
Figure 16C:
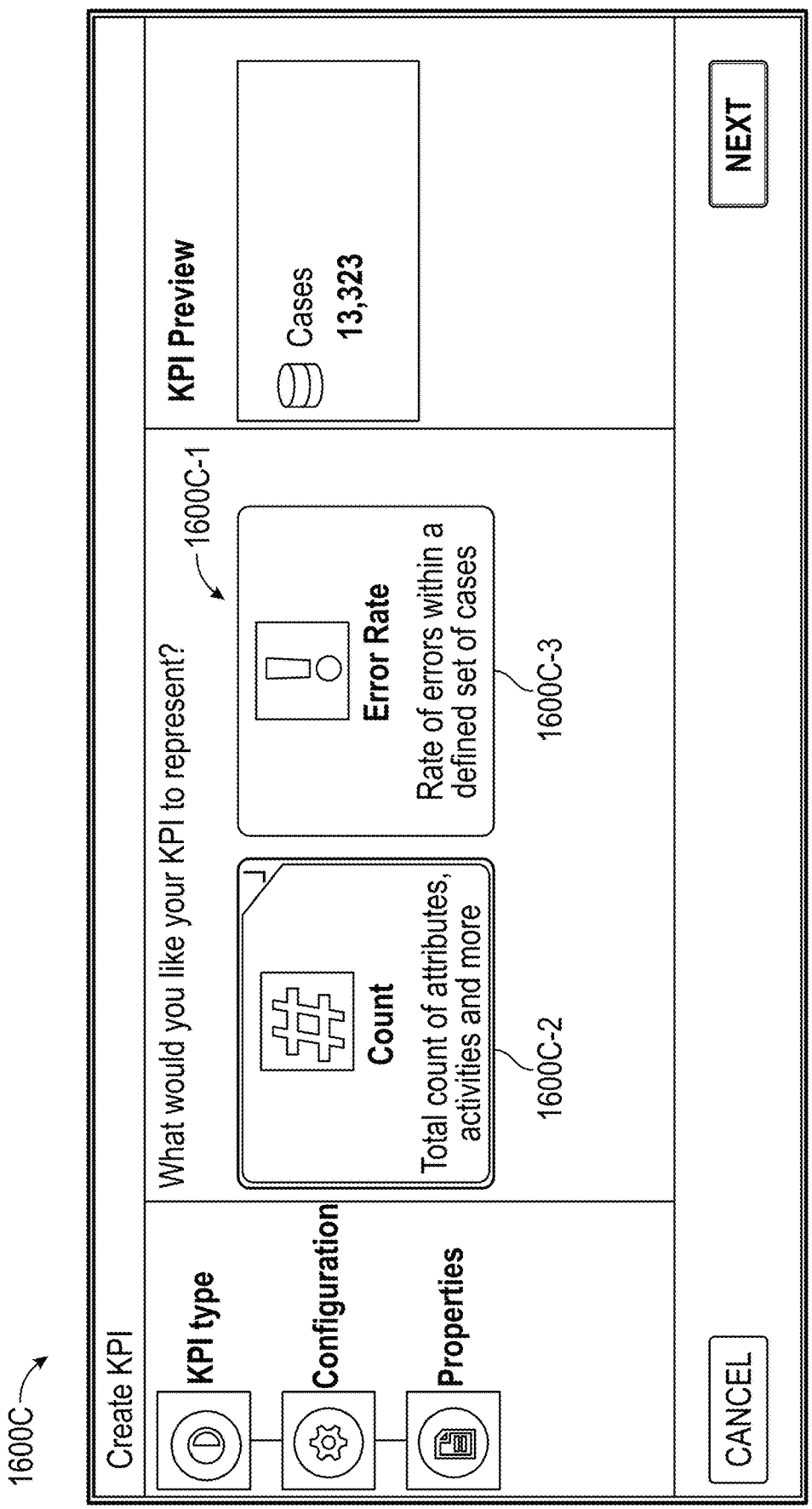
Figure 16F:
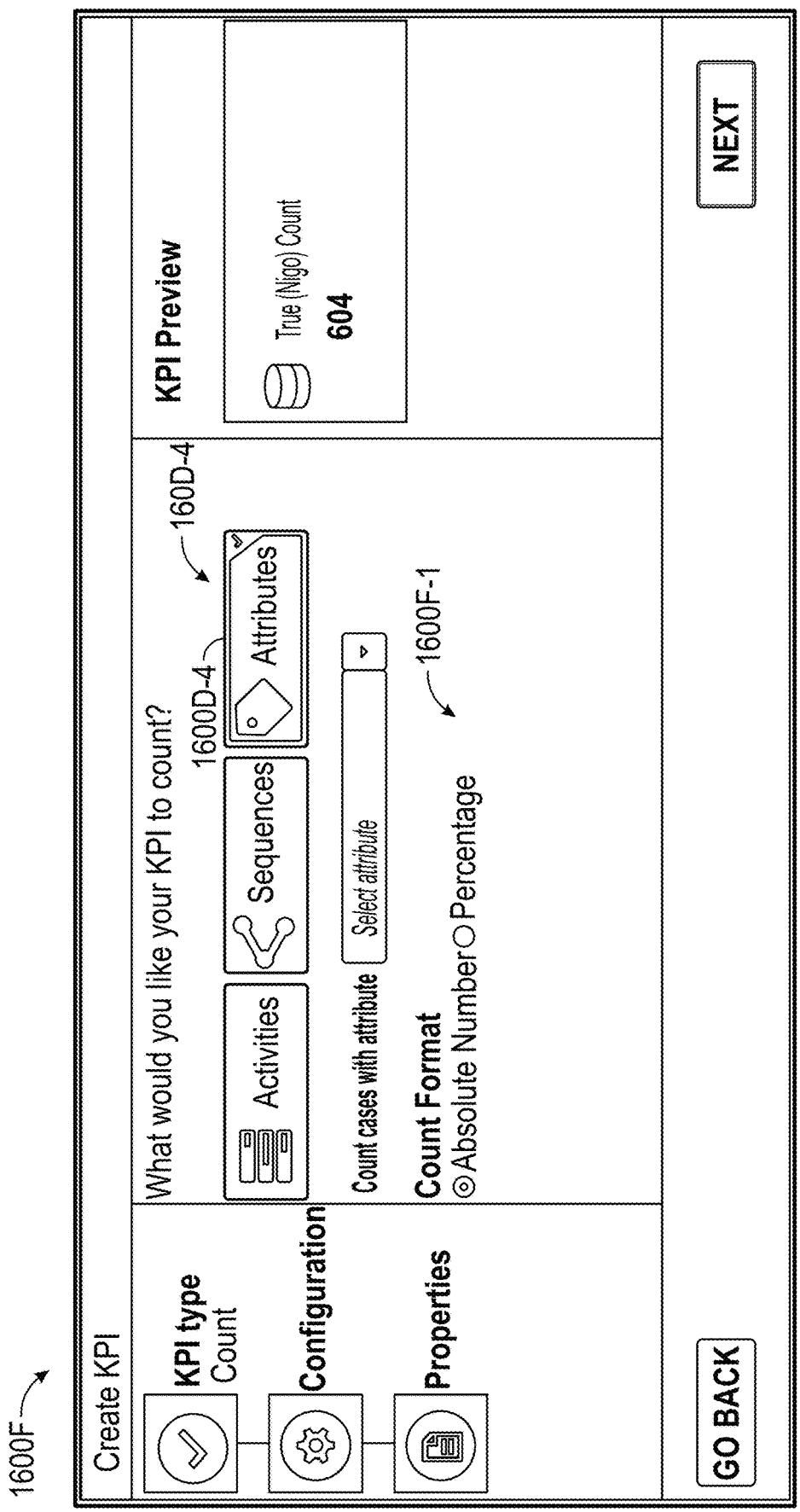
Figure 16H:
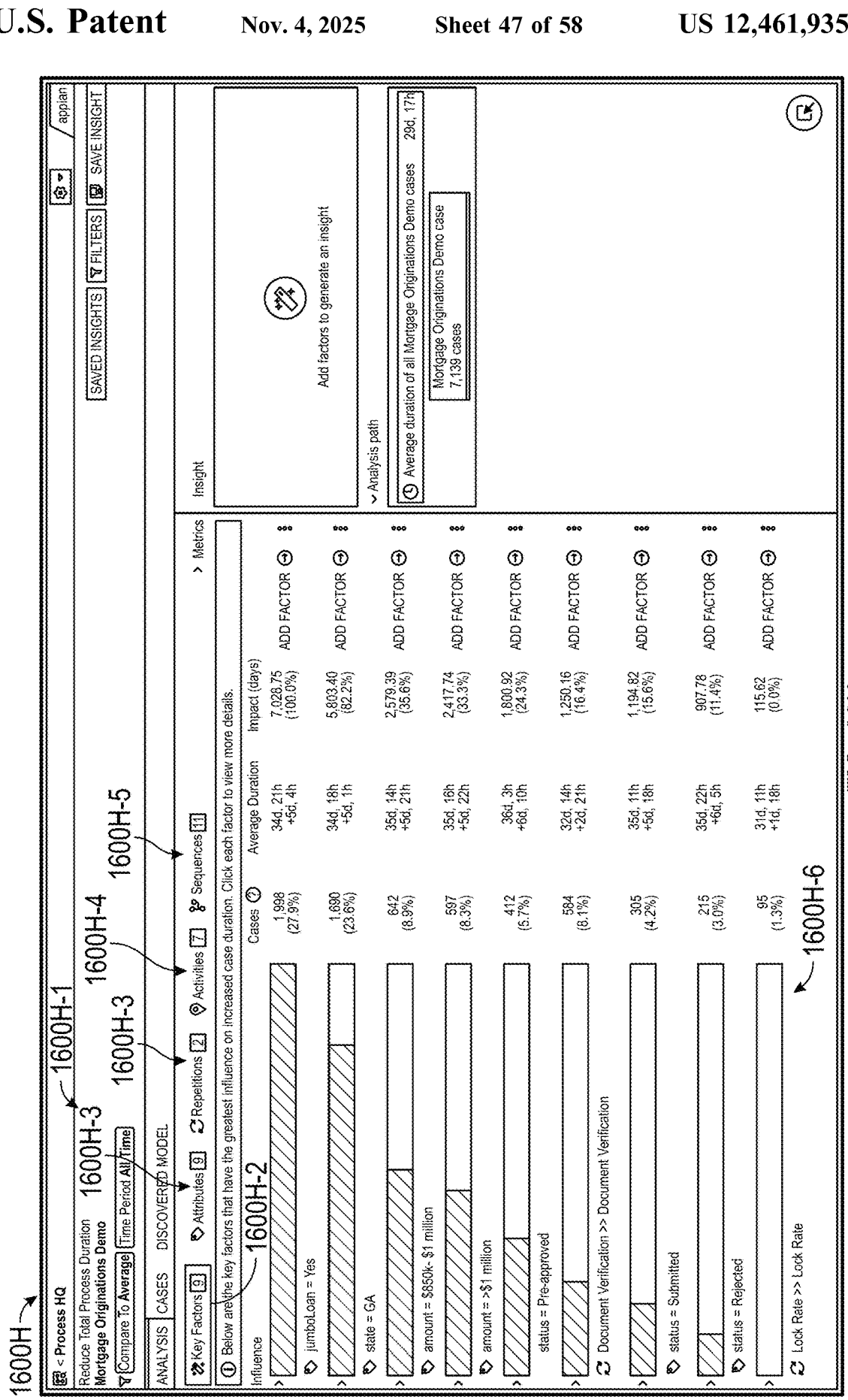
Figure 16I:
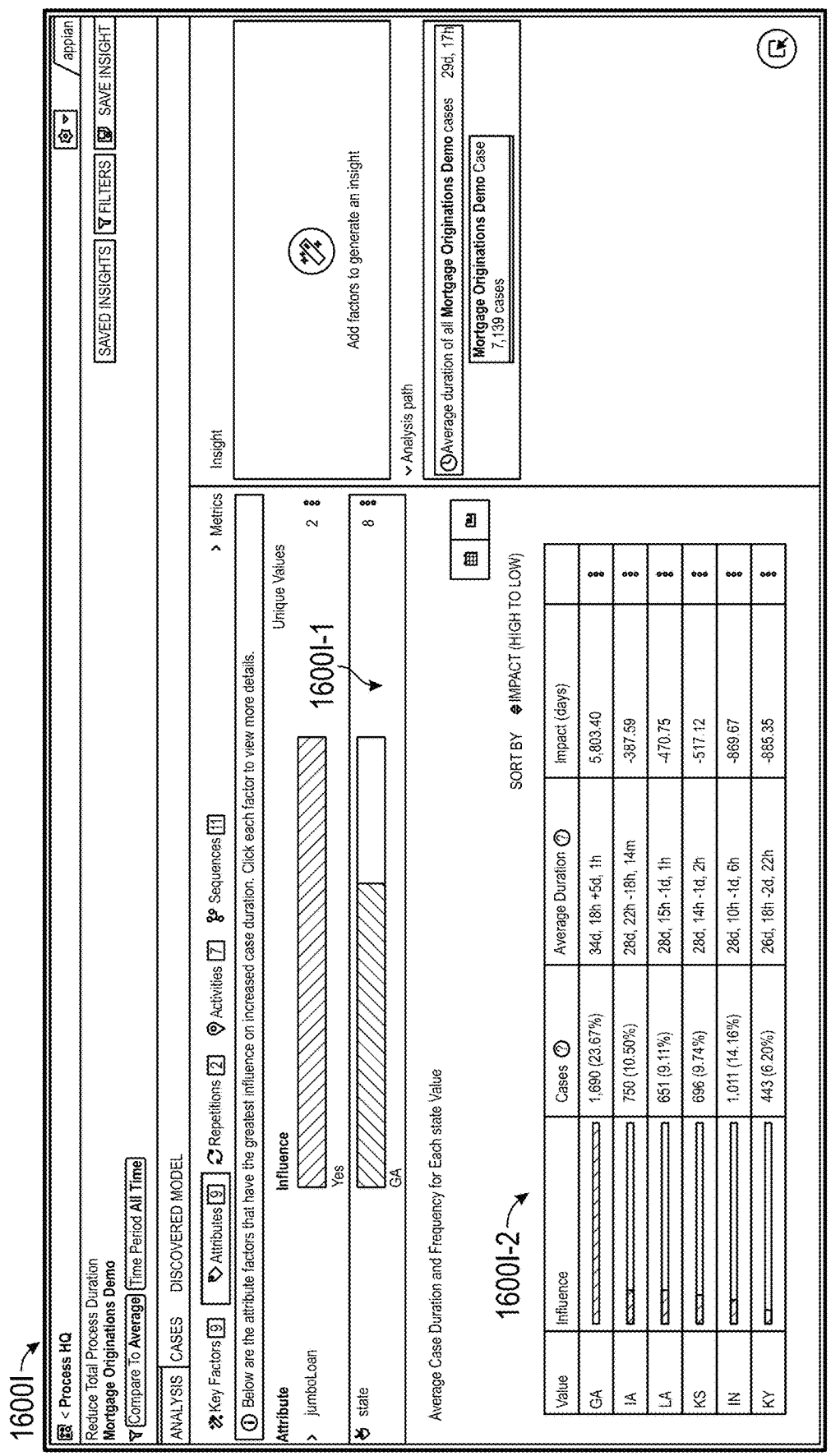
Figure 16K:
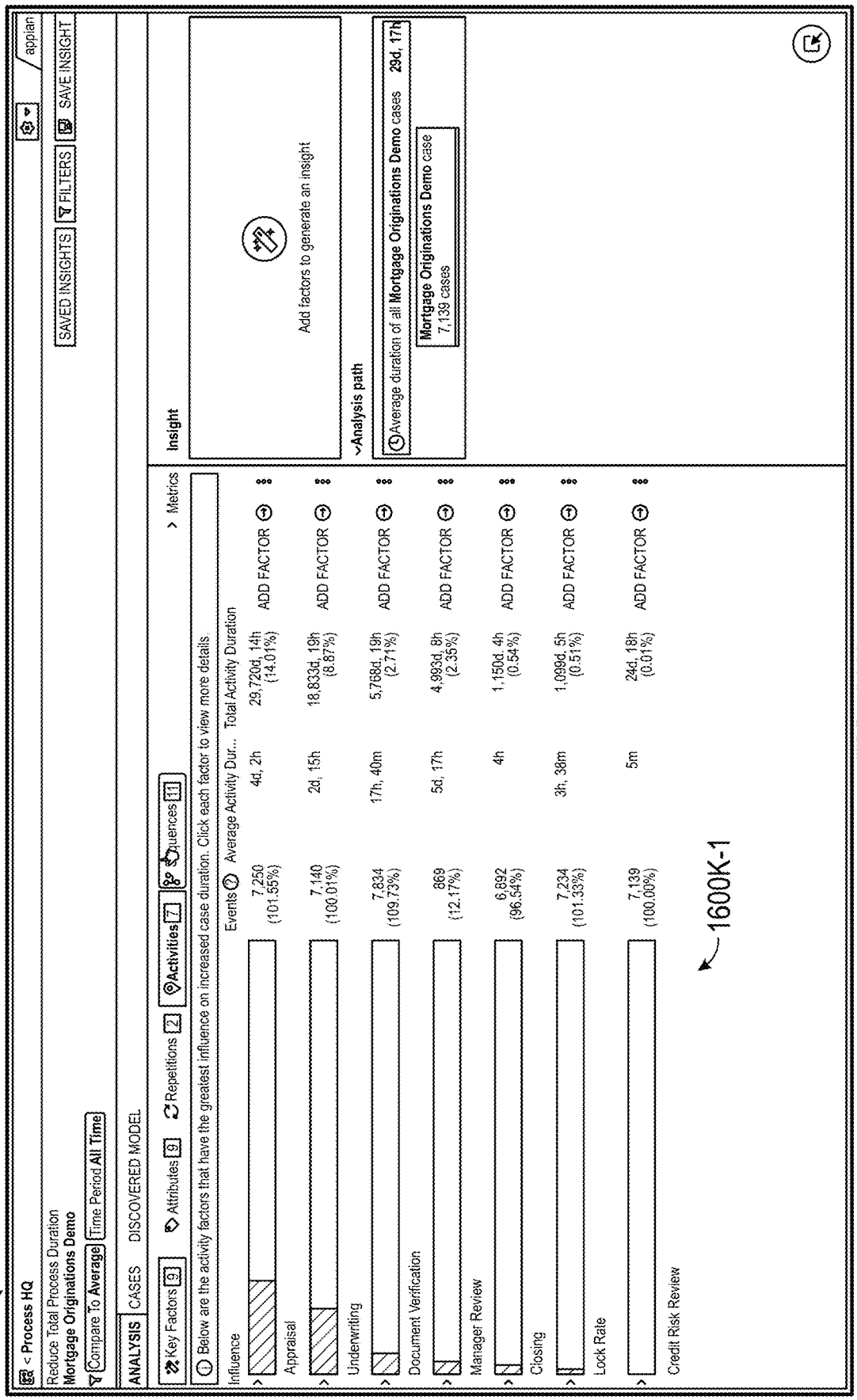
Figure 16L:
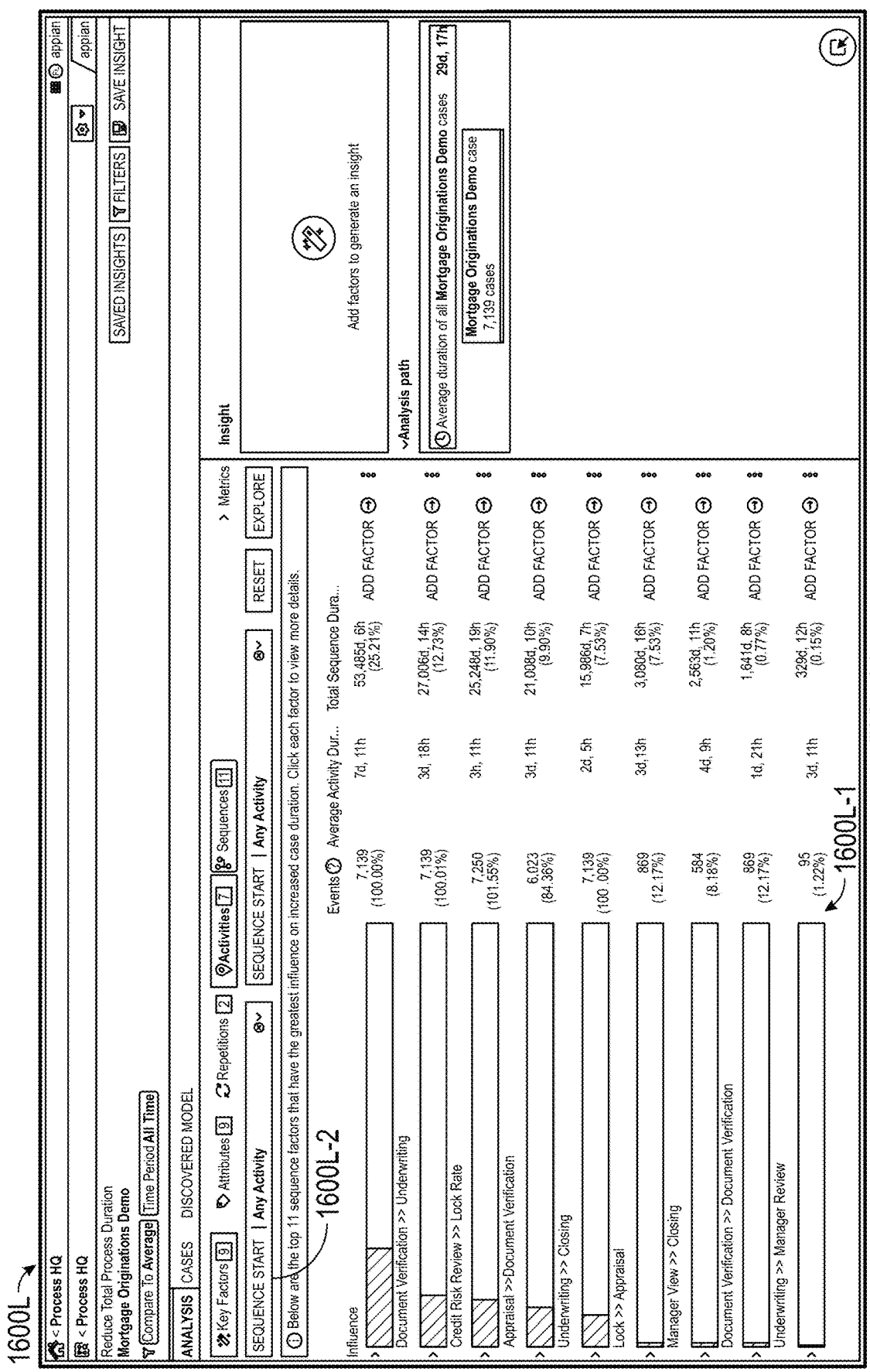
Figure 16M:
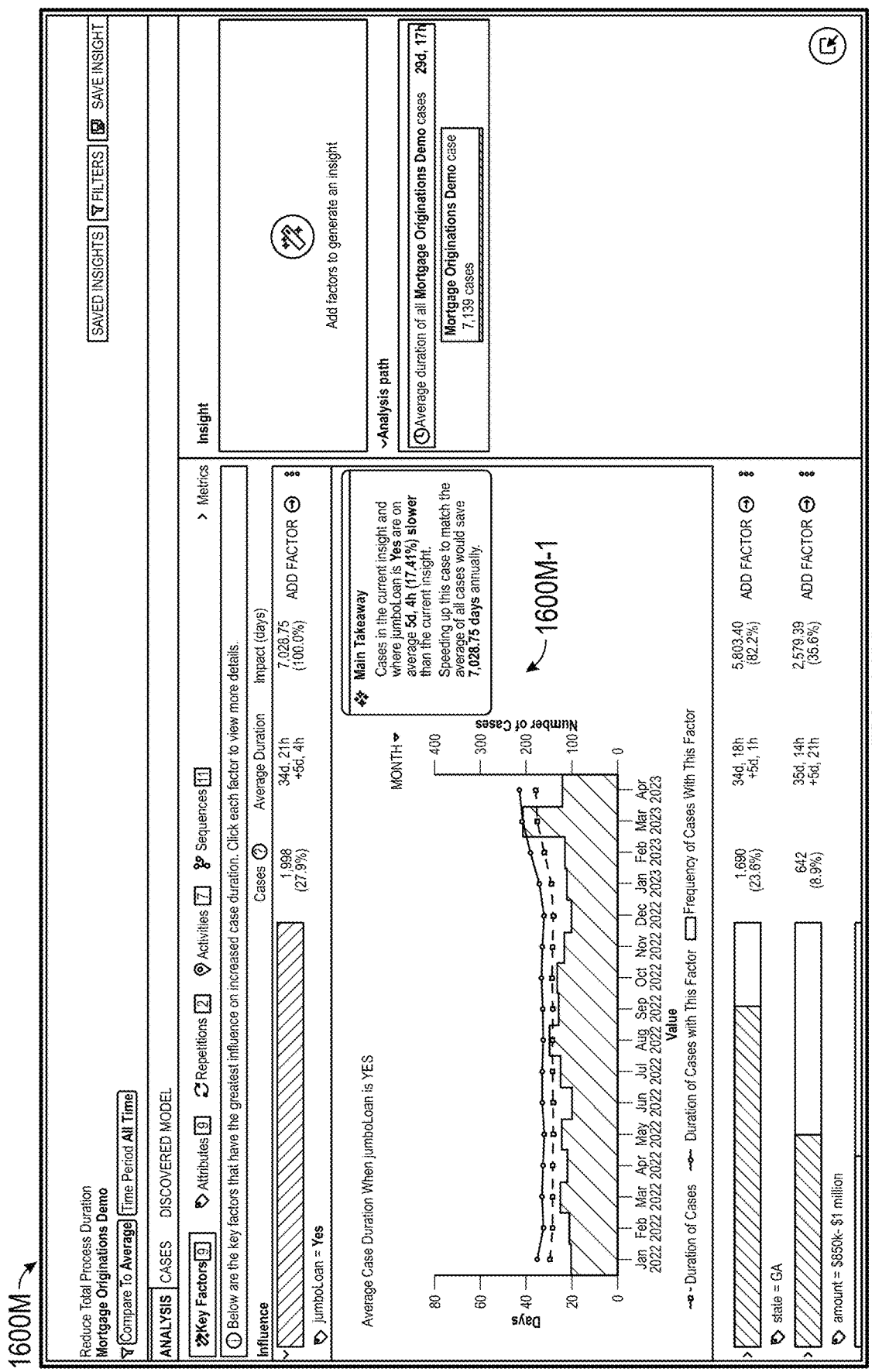
Figure 16N:
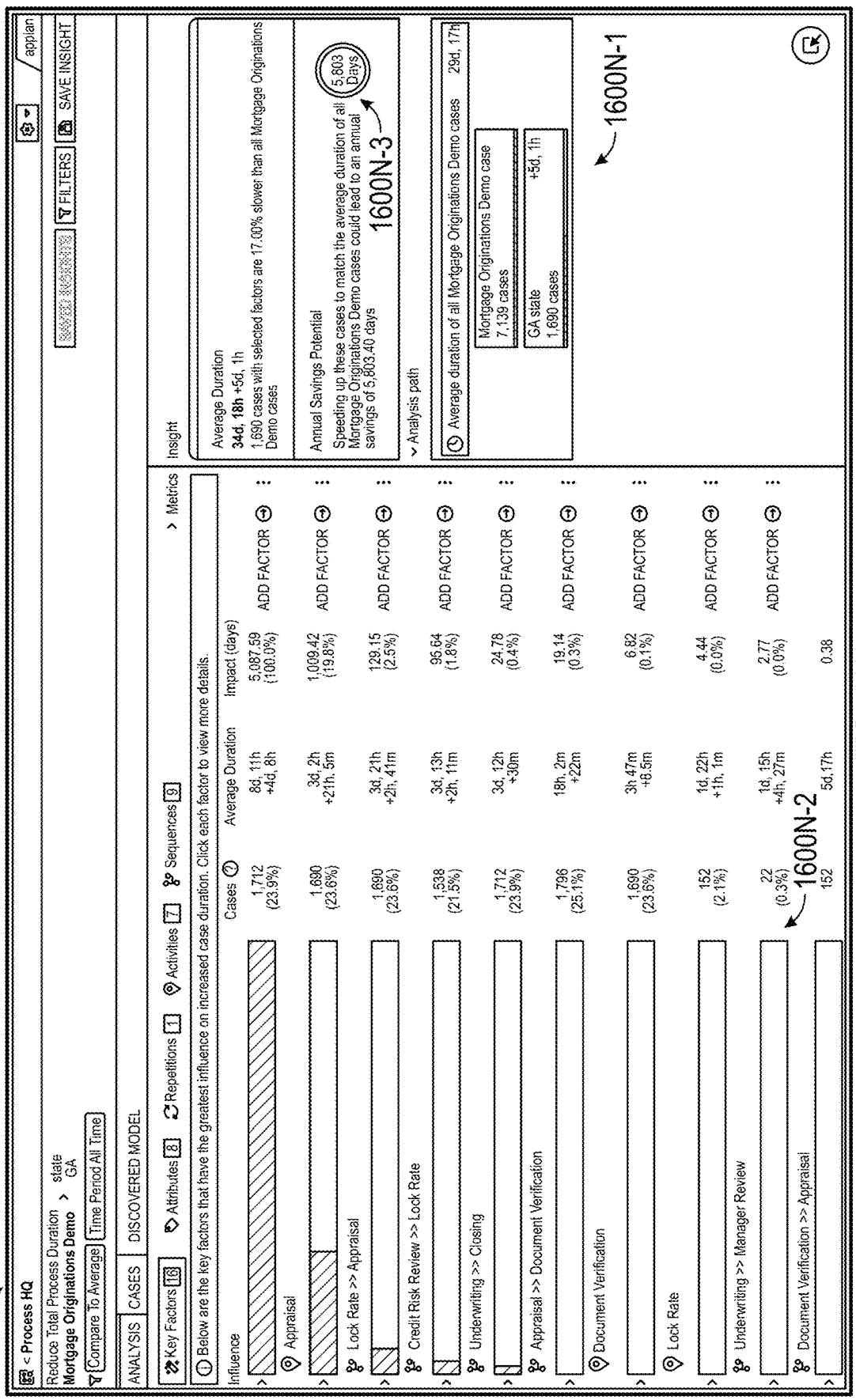
Figure 16Q:
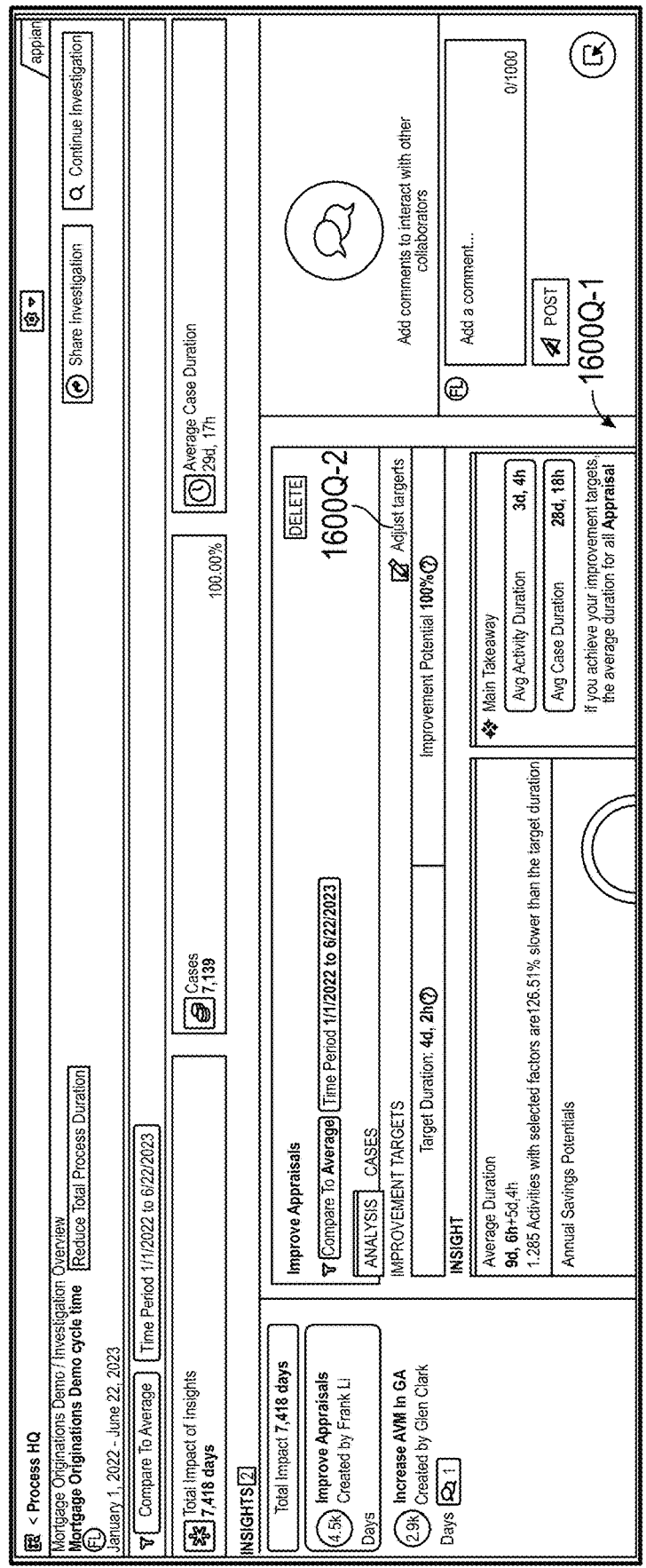
Figure 16R:
Figure 17:
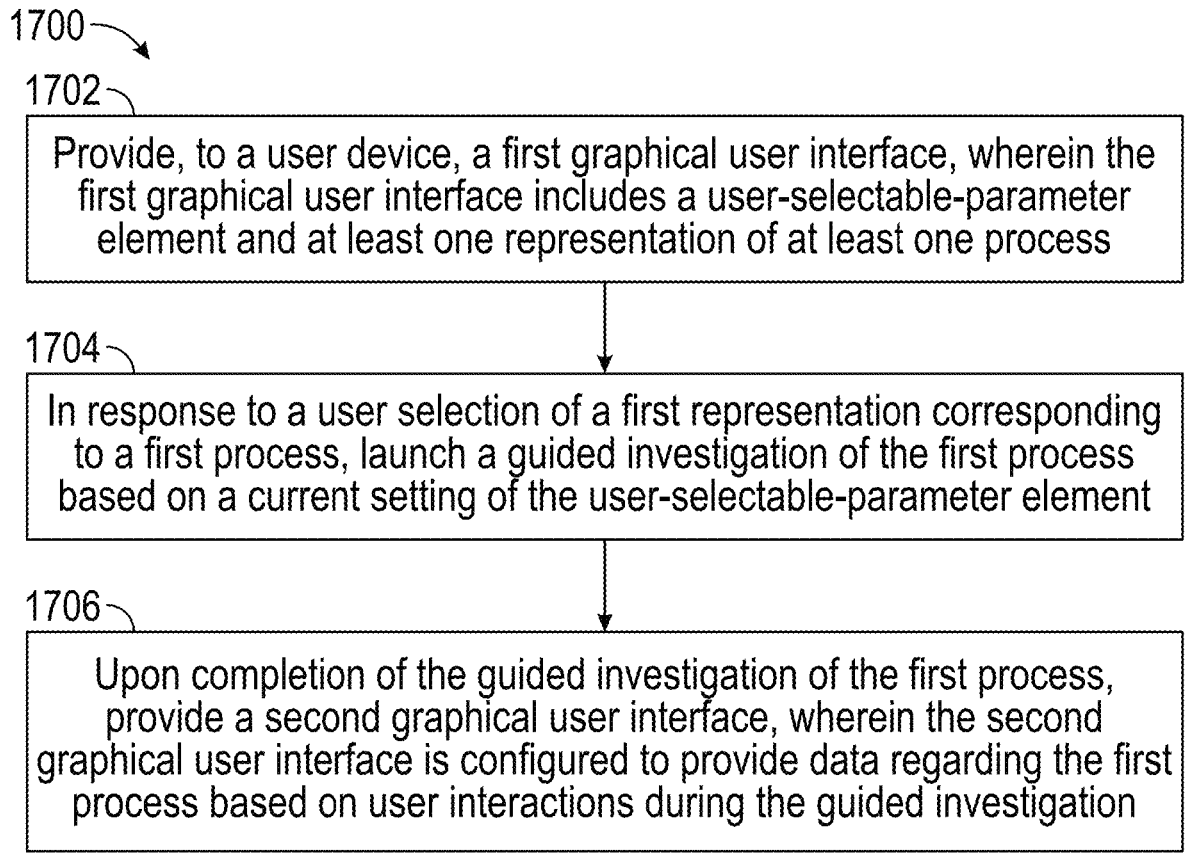
FIG. 17 depicts a flowchart for process mining using ordered insights.

FIGS. 15A-15C, 16A-16R, and 17 depict features for process mining using ordered insights. The features of FIGS. 15A-15C, 16A-16R, and 17 may apply to any of FIGS. 1, 2, 3, 4, 5, 6A-6B, 7, 8A-8B, 9A-9B, 10A-10G, 11, 12A-12B, 13A-13M, and 14. FIGS. 15A-15C depict data flow diagrams for process mining using ordered insights. FIGS. 16A-16R depict graphical user interfaces for process mining using ordered insights. FIG. 17 depicts a flowchart for process mining using ordered insights.

Turning to FIGS. 15A-15C, the data flow diagrams 1500A-1500C may depict operations between various components of the process mining system 110 and interactions with user devices 135 to find factors affecting performance of software processes in investigation pipelines. While one or more components of the process mining system 110 are depicted as separate components, the components of the process mining system 110 may be combined or separated to provide similar functionality, share resources, reduce data transmission and the like.

In operation O1502, the user device 135 and the investigation UI manager 706A may form a secure connection and exchange data, instructions, and the like using graphical, command line, or API interfaces. For instance, a user may navigate a web application (e.g., in a browser), a mobile application, and the like to (1) view certain data, (2) indicate decisions, and (3) provide instructions to the process mining system. See, e.g., FIGS. 16A-16R. For instance, at suboperation A, the user device 135 may detect and interpret user interactions with a user interface (e.g., web application or mobile application), and determine to send a request to the investigation UI manager 706A. At suboperation B, the user device 135 may transmit the request to the investigation UI manager 706A. At suboperation C, the investigation UI manager 706A may receive the request, process the request, and generate a response, as discussed herein. At suboperation D, the investigation UI manager 706A may transmit the response to the user device 135. While the suboperations are depicted as originating from the user device 135, the investigation UI manager 706A may instead transmit updates/data asynchronously to requests from the user device.

In operation O1504, the investigation UI manager 706A may determine an investigation trigger condition is satisfied. For instance, an investigation trigger condition may be a user input (or command line call, API call, etc.) indicating a request to start an investigation, or, from point A, in response to a user selecting a factor to be added to a thread (see FIG. 15B, O1544).

In operation O1506, the investigation UI manager 706A may transmit a prompt request to the prompt engine 706B, e.g., in response to the investigation trigger condition. For instance, the prompt request may be configured to ask the prompt engine 706B to provide a list of factors relevant to the software process under investigation, along with statistics for each factor. The factors may include various attributes or metrics that are pertinent to understanding and analyzing the software process, such as frequency of occurrence, average duration of tasks, error rates, or any other quantifiable measure that can provide insight into the software process performance. The statistics for each factor may serve to quantify the impact or relevance of the factor within the context of the software process, thereby enabling a more data-driven approach to software process mining.

In some cases, the prompt request may include a current thread for the investigation, a parameter, an investigation identifier, and a time period. The current thread for the investigation may indicate factors (if any) selected to guide investigation. The parameter may set how process mining determines impact and relevance of factors. The investigation identifier may identify the software process under investigation, so that appropriate schema, event logs, metadata, data of data fields or from services, and the like may be collected from relevant sources. The time period may set a period of time (e.g., from a start date to an end date) for investigation of the software process. The prompt engine 706B may receive the prompt request from the investigation UI manager 706A.

In operations from operation O1508 to operation O1528, the prompt engine 706B may orchestrate data collection from the analytics engine 704B and the impact engine 706C to provide a prompt to the investigation UI manager 706A. In operation O1508, the prompt engine 706B may determine to transmit an analytics request (O1510) and an impact request (O1534). The prompt engine 706B may then manage data received from the analytics engine 704B and data received from the impact engine 706C. For instance, the prompt engine 706B may receive data from the analytics engine 704B in one or more messages, receive data from the impact engine 706C in one or more messages, and package and transmit data to the investigation UI manager 706A. In this manner, the prompt engine 706B provides responsive data to user interactions without waiting for all data from the various components.

In operation O1510, the prompt engine 706B may transmit the analytics request to the analytics engine 704B. For instance, the analytics request may request the list of factors, and provide the current thread for the investigation, the parameter, the investigation identifier, and the time period. The analytics engine 704B may receive the analytics request from the prompt engine 706B.

In operation O1512, the analytics engine 704B may process the analytics request and generate a parameter request and data request. For instance, the analytics engine 704B may extract the current thread for the investigation, the parameter, the investigation identifier, and the time period from the analytics request. Based on the parameter, the analytics engine may generate the parameter request and determine to transmit the parameter request to the parameter engine 704C. Based on the investigation identifier and the time period, the analytics engine may generate the data request and determine to transmit the data request to the process mining datastore 704D.

In operation O1514, the analytics engine 704B may transmit the parameter request to the parameter engine 704C. The parameter request may indicate the parameter and request corresponding logic and/or rules (collectively, "parameter code") for the parameter. The parameter engine 704C may receive the parameter request from the analytics engine 704B.

In operation O1516, the analytics engine 704B may transmit the data request to the process mining datastore 704D. The data request may, based on the investigation identifier, request schema, event logs, metadata, and data of data fields or from services for the software process for the time period. The process mining datastore 704D may receive the data request from the analytics engine 704B.

In operation O1518, the parameter engine 704C may process the parameter request and determine and/or retrieve the parameter code for the parameter and software process associated data (e.g., costs, organization standards, thresholds, human factors, or automation replacements, etc.). In some cases, the parameter may be pre-defined by a data manager (typically an individual overseeing a data steward and having appropriate authorization for the data associated with a given software process), or the parameter may be user-selectable. For instance, the user may select a type of parameter from among: end-to-end duration, errors, cost, revenue, compliance with service level agreements, and the like. For instance, when the parameter is a time based parameter (e.g., end-to-end duration), the parameter may indicate that factors that impact duration are under investigation; when the parameter is a cost/revenue based parameter, the parameter may indicate that factors that impact cost/revenue are under investigation.

In operation O1520, the process mining datastore 704D may process the data request and retrieve and/or process data based on the data request from the analytics engine 704B. For the schema of the software process, the process mining datastore 704D may retrieve one or more schemas for the software process. For instance, the schemas may graphically depict different levels of complexity of the software process. See FIG. 8A. For the event logs, the process mining datastore 704D may retrieve event logs for the software process for the time period. For the metadata, the process mining datastore 704D may retrieve metadata for the software process for the time period. For the data of data fields or from services, the process mining datastore 704D may retrieve data for the software process for the time period. In some cases, the process mining datastore 704D may dynamically determine derived metadata (or derived analytics) based on metadata and/or data. Generally, the schemas, event logs, metadata, and data may be referred to as "mining data."

In operation O1522, the process mining datastore 704D may transmit the mining data to the analytics engine 704B. The analytics engine 704B may receive the mining data.

In operation O1524, the parameter engine 704C may transmit the parameter code for the parameter and software process associated data to the analytics engine 704B. The analytics engine 704B may receive the parameter code for the parameter and the software process associated data.

In operation O1526, the analytics engine 704B may mine the mining data based on (1) the parameter code for the parameter and (2) the current thread, to thereby determine one or more factors that impact the software process. For instance, the analytics engine 704B may determine an impact score of each factor, and order the factors based on the impact scores. In some cases, the analytics engine 704B may filter the factors based on the parameter code. For instance, the parameter code may filter out factors that satisfy a filter condition. The filter condition, based on the parameter code, may filter out factors with positive impact scores (e.g., for parameters useful for investigating negative factors), factors below a threshold, factors above a threshold, factors with negative impact scores (e.g., for parameters useful for investigating positive factors), and the like.

The order of the list of factors may be determined based on a cost function. The cost function may be defined based on a type of the parameter. In some cases, the parameter may be a user-selectable parameter. The user-selectable parameter may be one of a plurality of predefined parameters. Each parameter of the plurality of predefined parameters may correspond to a different aspect of process optimization. The predefined parameters may include one or more (or combinations) of the following types of parameters: cost reduction, decreased time for part or all of a process, resource optimization, quality improvement, or compliance adherence.

The user-selectable parameter may correspond to one parameter in a set of parameters. In some cases, the set of parameters may include one or more (or combinations) of: an end-to-end duration parameter, an activity duration at a node, a node-to-node duration parameter, a cost parameter, a revenue parameter, an error parameter, a compliance parameter, a user-defined parameter, and a factor-based parameter.

In some cases, the cost function is a parameterized function algorithm. The parametrized function algorithm may use a parameterized function to determine impact values for each factor, and order the factors based on the impact values. The parameterized function algorithm may receive a set of arguments. The set of arguments may include a factor type as a first argument (e.g., that indicates an attribute factor, an activity factor, a sequence factor, or a repetition factor). The first argument may determine the use of specific calculations or operations within the algorithm of the parameterized function. In some cases, the specific calculations or operations may be provided by the parameter code (i.e., rules, based on parameter type, to determine the impact of the factor). For instance, duration parameters may use different calculations or algorithm operations than cost parameters, and so on. The set of arguments may include a set of mining data as a second argument (e.g., a data structure that stores the mining data). In some cases, the set of mining data may be a filtered set of mining data based on the current thread. In some cases, the parameterized function may determine impact values based on deviations and/or counts of particular factors.

For instance, in the case of an attribute factor and a duration parameter (e.g., end-to-end duration), before any factor is added to the thread ("base calculation"), the parameterized function may determine an impact value for the attribute factor in accordance with Equation 1.

Impact for Attribute Factor=((average cycle time for cases with a particular attribute value)−(average cycle time of all cases in a baseline set))*(count of cases with a particular attribute value).   Equation 1:

The average cycle time for a cases with a particular attribute value may be an analytic that: (1) determines the time for each case (i.e., record) that has the attribute value; and (2) determines an average of the times for the cases. The average cycle time of all records in a baseline set may be an analytic that: (1) determines the time for each case (record) in the baseline set; and (2) determines an average of the times for all cases in the baseline set. In some cases, the baseline set may be all cases in the set of data associated with an investigation, a user-defined baseline (e.g., a subset of cases in the investigation), or all cases associated with the software process (e.g., outside the time period of the investigation). The count of cases with a particular attribute value may be a count of cases that have the attribute value. The attribute value may be a unique value for a data field. The attribute value may be ordered as an attribute factor and displayed as an attribute factor in the user interface. For example, for a state data field in a software process (e.g., where a state of the United States may be stored in association with a case in a record), an attribute value may be one of states of the United States. For each unique attribute value (e.g., Georgia), the analytics engine 704B may determine the average of duration of cases with the unique attribute value (e.g., Georgia); the difference of that average to the average baseline duration; the count of cases with the unique attribute value (e.g., Georgia); and the product of the difference and the count.

In some cases, the parameterized function may use an annualized version of Equation 1, as shown in Equation 2.

Annualized Impact for Attribute Factor=(((average cycle time of cases with a particular attribute value)−(average cycle time of all cases in a baseline set))*(count of cases with a particular attribute value))/(number of months in dataset/12).     Equation 2:

The number of months in dataset may be a count of months from a start point to an end point in the set of data. In some cases, this may be inferred from the time period of the investigation. In some cases, this may be determined by looking for an earliest event record for cases in the set of data and a latest event record for the cases in the set of data; determining a difference from the earliest event to the latest event; and converting the difference into months.

In the case of a repetition factor and a duration parameter (e.g., end-to-end duration) before any factor is added to the thread ("base calculation"), the parameterized function may determine an impact value for a repetition value of the repetition factor in accordance with Equation 3. The repetition value may be a defined path through the software process that returns to a same node ("loop path"). In software processes that have more than one loop path, there may be more than one repetition factor, and each repetition value corresponds to a different loop path.

Impact for Repetition Factor=((average activity duration)+(average loop path duration))*(number of repetitions)     Equation 3:

The average activity duration may be an analytic that: (1) determines durations of cases for all cases in the dataset; and (2) determines an average of the durations. The average loop path duration may be an analytic that: (1) determines durations of cases that loop through the defined path in the loop path of the repetition value; and (2) determines an average of the durations. The number of repetitions may be a count of the cases that loop through the loop path.

In some cases, such as after one or more factors are added to a thread, the parameterized function may use Equations 4, 5, or 6 to determine impacts for attribute factors, activity and sequences factors, and repetitions, respectively.

Impact for Attribute Factors=((average cycle time of cases with the factor in thread)−(average cycle time of a baseline set))*(volume of cases with the factor in thread)     Equation 4:

Impact for Activity and Sequences Factors=((average cycle time of cases with an activity with the factors)−(average cycle time of activity of a baseline set))*(volume of cases with an activity with the factors)     Equation 5:

Impact for Repetition Factors=((average activity duration of cases with the factors)+(average path duration of cases with the factors))*(number of repetitions in cases with the factors)     Equation 6:

In some cases, the order of the list of factors may be determined by a gradient ascent algorithm. For instance, for non-duration based parameters, such as cost, revenue, compliance (e.g., service level agreement), counts, or errors, the analytics engine 704B may use the gradient ascent algorithm to determine impact values for factors in accordance with defined key performance indicators (KPIs) defined for the type of non-duration based parameter. In some cases, the gradient ascent algorithm may determine impact values for attribute values but not for other types of factors (e.g., activities, sequences, repetition).

With no factors added, the gradient ascent algorithm may determine an impact value for an attribute value in accordance with the following: ((average KPI of cases with attribute value)−(average KPI of all cases))*(count of cases with attribute value).

With one or more factors added, the gradient ascent algorithm may determine an impact value for an attribute value in accordance with the following: ((average KPI of cases with attribute value and all added factors)−(average KPI of all cases))*(count of cases with attribute value and all added factors).

For instance, a KPI measuring SLA violations, the gradient ascent algorithm may determine an impact value for an attribute value in accordance with the following:

with no factors added: Impact=((SLA violation rate for cases with attribute value)−(SLA violation rate for all cases))*(count of cases with attribute value); and with one or more factors added: Impact=((SLA violation rate for cases with attribute value and all added factors)−(SLA violation rate for all cases))*(count of cases with attribute value and all added factors). In the foregoing examples of impact values for KPIs, the assumption is that a higher average KPI for cases with the attribute is better. Alternatively, in the case that a lower average KPI for such cases is better, the gradient ascent algorithm may determine an inverse calculation (e.g., ((average/count of all cases)−(average/count of cases with attribute value and all added factors)).

In operation O1528, the analytics engine 704B may transmit the one or more factors to the prompt engine 706B. The prompt engine 706B may receive the one or more factors.

In operation O1530, the prompt engine 706B may generate prompt GUI data based on the one or more factors and any other data received (e.g., schemas, graphics, mining data, and/or impact data).

In operation O1532, the prompt engine 706B may transmit the prompt GUI data to the investigation UI manager 706A. The investigation UI manager 706A may receive the prompt GUI data and transmit the prompt GUI data to the user device 135. In the case of a web application or mobile application, the user device 135 may display a prompt GUI with the prompt GUI data populated in a defined format associated with the prompt GUI. In this manner, the one or more factors may be displayed to a user for their consideration, along with any other relevant data (as orchestrated from the prompt engine 706B and the investigation UI manager 706A).

In operation O1534, the prompt engine 706B may transmit the impact request to the impact engine 706C. The prompt engine 706B may transmit the impact request after receiving the one or more factors or in parallel to transmitting the analytics request. In the case of transmitting the impact request after receiving the one or more factors, the impact request may request impact data for the one or more factors, so as to reduce processing load, increase responsiveness of a prompt GUI, and improve a user experience. In some cases, the impact data may include statistics or metrics (collectively, "analytics") for the one or more factors (e.g., if sent after) and/or all factors (e.g., if sent in parallel). In some cases, the analytics may be one or combinations of: aggregates, rollups, averages, means, medians, modes, standard deviation, range, variability, and the like; differences or scaled versions of the foregoing, and the like; composite metrics (e.g., that are based on one or more base analytics of the foregoing); and generally user-defined metrics, such as derived analytics, as discussed herein.

In operation O1536, the impact engine 706C may obtain the analytics based on the impact request. In some cases, the impact engine 706C may obtain stored analytics (e.g., from derived analytics). In some cases, the impact engine 706C may dynamically determine some or all of the analytics (e.g., in view of the current thread). In these cases, the impact engine 706C may obtain the mining data from the analytics engine 704B, extract relevant data for the analytics (e.g., based on the thread), and determine the analytics (e.g., in accordance with functions defined by the parameter code). In cases where the parameter code utilizes the same analytics to determine the one or more factors, the impact engine 706C and the analytics engine 704B may share data, data processing, and/or the analytics to reduce re-determining the same analytics or saving transmission latency, bandwidth, and storage.

The analytics, for a factor associated with the software process, may include one or combinations of: a count of cases that have the factor, a percentage of the cases that have the factor, a metric that corresponds to the parameter, an impact metric of the factor, and an influence metric. In some cases, the analytics, for a first factor, may also include analytics for any associated factor. For instance, for attributes, a first attribute (e.g., the state where a part of the business process that corresponds to the software process take place, e.g., the performance of an appraisal in a real estate transaction) may have analytics for the first attribute (e.g., the number of days to obtain the appraisal), and be packaged with analytics for a plurality of other attributes that correspond to other factors (e.g., values for other states) of a data field associated with the first attribute.

The metrics that correspond to the parameter, including the impact metric of the factor, and the influence metric may be defined by the logic and/or the rules associated with the parameter. For instance, in the case of duration, the metric that corresponds to the parameter may be a duration metric, and the impact metric of the factor may be a difference of the duration metric from an average or baseline duration. The influence metric may scale the impact metric on a uniform scale (e.g., from zero to 1), so users may understand relative impact graphically in addition to viewing values of the impact metric.

In operation O1538, the impact engine 706C may transmit the analytics to the investigation UI manager 706A, e.g., via a relay by the prompt engine 706B. In some cases, the operation O1538 may be omitted if the analytics were transmitted to the analytics engine 704B and/or the prompt engine 706B before the GUI prompt data was transmitted to the investigation UI manager 706A. In some cases, for responsiveness and user experience, data may be transmitted to the investigation UI manager 706A as it is available. In some cases, the prompt GUI may layer data to allow asynchronous transmission of data to the user device 135. In some cases, certain analytics may be transmitted first, while other analytics are transmitted later or as-needed, or even generated on an as-needed basis (e.g., if a user navigates to a certain view). In this manner, the platform 105 may reduce computation resources, storage resources, and transmission resources, while still enabling a user to explore data in a relatively responsive environment.

In operation O1540, the investigation UI manager 706A may update the prompt GUI data on the user device 135 as data is received and/or in response to user inputs selecting different layers and/or views of factors. Moreover, the investigation UI manager 706A may also determine if a user input selects a new factor to be added to the thread of an investigation. Generally, an investigation may start with zero (a value for an exemplary default start) or one factor added to the thread (e.g., if launched from a data exploration view of a factor of a software process) for an investigation. Each factor added to the thread may narrow a scope of the investigation. A thread may be an ordered list of factors, the ordering based on the sequence of when the factors were added. An analysis path may be displayed to a user in the prompt GUI that tracks the thread, as it is updated by user interactions. The order of the sequence of factors may change the data subject to process mining, as each factor added may be used to recursively filter the mining data to a subset that has the new factor (thereby leaving any mining data that had factors up thread but not the new factor out of the subset). As each new factor is added and the amount of data is reduced, the analytics engine 704B may re-determine the one or more factors that impact the software process based on the new subset of mining data. Moreover, the analytics may be re-determined based on the new subset of mining data.

In operation O1542, the investigation UI manager 706A may, in response to a user input selecting a new factor to be added to the thread of the investigation, transmit a new factor request to the thread manager 706D. The new factor request may indicate the factor selected. The thread manager 706D may update the thread and request (in the background) the analytics engine and/or the impact engine to re-determine the one or more factors and analytics, respectively, with the updated thread. The thread manager 706D may then lead to point A, which re-starts the operations from operation O1506 to operation O1544, to thereby update the prompt GUI data in view of the updated thread.

In some cases, after at least one factor has been added to the thread, the investigation UI manager 706A and/or the prompt engine 706B may transmit a simulation request for simulation data to the simulation engine 706E. See FIG. 15C. The simulation engine 706E may provide the simulation data to the investigation UI manager 706A, and the investigation UI manager 706A may update the prompt GUI with the simulation data, so that the user may understand a simulated change to the software process (or underlying real-world process).

In operation O1544, the investigation UI manager 706A may, based on user inputs, determine whether to continue to point A (to continue exploration of factors and analytics) or to proceed to point B (to proceed to simulation).

In loops through these operations, starting from operation O1506 to operation O1544, some operations may be omitted or trigger-based. For instance, certain operations may be performed each time (e.g., mine the data for ordered list of factors), certain operations may be performed only once (e.g., collecting the parameter code or data from process mining datastore 704D), and certain operations may be performed based on user interactions (e.g., adjusting or displaying certain types of impact data, adding a new factor, etc.). In this manner, a user may explore mining data, add factors to the thread, and the like.

In operation O1546, the investigation UI manager 706A may, from point B, determine to proceed to simulation, e.g., based on a user save, user input to save the investigation, or the user indicating a change to the simulation. The investigation UI manager 706A may update or replace the prompt GUI with a simulation GUI. As the investigation UI manager 706A receives simulation data, the investigation UI manager 706A may update the simulation GUI with (new) simulation data.

In operation O1548, the investigation UI manager 706A may transmit the simulation request for simulation data to the simulation engine 706E. The simulation request may include the current thread and any modifications to simulation (e.g., from user interactions during the prompt GUI). The simulation engine 706E may receive the simulation request.

In operation O1550, the simulation engine 706E may determine a simulation based on the current thread and the (as-filtered to a subset of mining data). The simulation may determine an estimate of an impact ("potential savings") from a change to the software process (or underlying real-world process associated with the software process, e.g., by assuming use the average amount of time a different user, who performed the same action, performed the actions in the mining data). The simulation data may include the potential savings. In some cases, the simulation may use the parameter code and, optionally, the software process associated data (e.g., for costs, organization standards, thresholds, human factors, or automation replacements). For example, for a duration parameter, the simulation may estimate a time savings based on comparing an average of the subset of mining data defined by the thread with an average duration of the software process. Generally, the parameter code (and software process associated data) may provide a simulation function that estimates the potential savings of a change to the software process (or underlying real-world process associated with the process).

The simulation function may perform different calculations or operations based on the factors of the thread and user-selections of realization rates and baseline. In some cases, the user may adjust the realization rate (RR) used by the simulation function. In some cases, the user may adjust the baseline used by the simulation function.

In the case of only one attribute in the thread, the simulation function may determine a potential savings in accordance with Equation 7.

$$\text{Potential Savings}=((((\text{average cycle time with particular attribute value})-(\text{average cycle time of baseline}))*(\text{count of cases with particular attribute value})/\text{insight factor})*RR \quad \text{Equation 7:}$$

The insight factor may scale the savings based on time. For instance, the insight factor may be the duration of investigation divided by a normalization period. The normalized period may be set to a month, year, or other period. The user may select the normalization period.

In the case of only two attributes in the thread, the simulation function may determine a potential savings in accordance with Equation 8.

$$\text{Potential Savings}=((((\text{average cycle time with first attribute value and second attribute value})-(\text{average cycle time of first case attribute value}))*(\text{count of cases with first case attribute value and second case attribute value})/\text{insight factor})*RR \quad \text{Equation 8:}$$

In the case of an attribute and a sequence in the thread, the simulation function may determine a potential savings in accordance with Equation 9.

$$\text{Potential Savings}=((((\text{average sequence time with factors})-(\text{average sequence time of baseline}))*(\text{sequence volume with factors}))/\text{insight length})*RR \quad \text{Equation 9:}$$

In the case of an attribute and a repetition in the thread, the simulation function may determine a potential savings in accordance with Equation 9.

$$\text{Potential Savings}=((\text{average repetition time with attribute factors}*\text{count of repetitions with attribute factors})/\text{insight factor})*RR \quad \text{Equation 9:}$$

In the case of only a sequence in the thread, the simulation function may determine a potential savings in accordance with Equation 10.

$$\text{Potential Savings}=((\text{average sequence time of baseline}*\text{count of sequence})/\text{insight factor})*RR \quad \text{Equation 10:}$$

In the case of a sequence and an attribute in the thread, the simulation function may determine a potential savings in accordance with Equation 11.

$$\text{Potential Savings}=((((\text{average sequence time with factors})-(\text{average sequence time of baseline}))*(\text{count of sequence with factors}))/\text{insight factor})*RR \quad \text{Equation 11:}$$

In the case of only a repetition in the thread, the simulation function may determine a potential savings in accordance with Equation 12.

$$\text{Potential Savings}=((\text{average repetition time of baseline}*\text{count of repetitions})/\text{insight factor})*RR \quad \text{Equation 12:}$$

In the case of a repetition and an attribute in the thread, the simulation function may determine a potential savings in accordance with Equation 13.

$$\text{Potential Savings}=((\text{average repetition time with attribute factors}*\text{count of repetitions with attribute factors})/\text{insight factor})*RR \quad \text{Equation 13:}$$

In the case of a sequence and an activity in the thread, the simulation function may determine a potential savings in accordance with Equation 13.

$$\text{Potential Savings}=((((\text{average sequence time with activity attribute value})-(\text{average sequence time of baseline}))*(\text{count of activity with activity attribute}))/\text{insight factor})*RR \quad \text{Equation 13:}$$

In the case of an activity and an attribute in the thread, the simulation function may determine a potential savings in accordance with Equation 14.

$$\text{Potential Savings}=((\text{average activity time with activity attribute})-(\text{average activity time of baseline}))*(\text{count of activity with activity attribute})/\text{insight factor})*RR \quad \text{Equation 14:}$$

In operation O1552, the simulation engine 706E may transmit the simulation data to the investigation UI manager 706A. The investigation UI manager 706A may receive the simulation data and update the simulation GUI.

In operation O1554, the investigation UI manager 706A may, based on user inputs, determine whether to continue to point B to proceed to the simulation (e.g., user inputs making changes to the simulation), or to proceed to save the investigation (e.g., to operation O1556).

In operation O1556, the investigation UI manager 706A may transmit a save request to the tracking engine 706F. The save request may indicate the current thread, filters (e.g., time period), investigation identifier, analytics, and simulation data (as modified by user adjustments), and request the investigation be saved. The tracking engine 706F may receive the save request. In some cases, the save request may indicate one or more user identifiers, e.g., to alert if the investigation is updated (more than a threshold amount, e.g., 5% or one standard deviation) based on updates to the mining data.

In operation O1558, the tracking engine 706F may process the save request and periodically update the mining data, analytics, and simulation data. In some cases, the tracking engine 706F may compare the saved investigation against a different time period (e.g., after the time period of the investigation). In these cases, the tracking engine 706F may track some or all analytics, user-flagged analytics, the metric that corresponds to the parameter, or the impact metric ("tracking value(s)"), and determine if tracking value(s) satisfy the target value condition(s). The tracking engine 706F may report tracking value(s), trends of tracking value(s), and/or successful (or not) target value condition(s) ("investigation results data"). The tracking engine 706F may report the investigation results data to the users identified in the save request (e.g., as updated over time).

In operation O1560, the tracking engine 706F may transmit the investigation results data to users on a periodic basis (e.g., as data is updated, every week, or as set by a user) or based on flagging conditions. For instance, the investigation UI manager 706A may cause notifications to appear in a web application or mobile application, or send communications (e.g., email or text messages) based on changes to the investigation results data.

In operation O1562, the tracking engine 706F may transmit the tracking value(s) and the investigation results data ("tracking data") to process mining datastore 704D for storage. The process mining datastore 704D may receive the tracking data.

In operation O1564, the process mining datastore 704D may store the tracking data and provide the tracking data to various systems, such as the tracking engine 706F as needed.

In operation O1566, the process mining datastore 704D may transmit the tracking data (as updated) to the investigation UI manager 706A. For instance, the investigation UI manager 706A may receive a user input indicating a request to view the tracking data (as updated).

In operation O1568, the investigation UI manager 706A may, after the investigation was saved, determine whether a user request (1) indicated to reopen the investigation (e.g., to view or change the thread) or (2) indicated to reopen the simulation (e.g., to view or change the simulation). In the case of reopening the investigation, the investigation UI manager 706A may proceed to point A and the operations from operation O1506 to operation O1544. In the case of reopening the simulation, the investigation UI manager 706A may proceed to point B and the operations from operation O1546 to operation O1554.

Turning to FIGS. 16A-16R, the graphical user interfaces 1600A-1600R may depict sequences and interactions on the user devices 135 to find factors affecting performance of software processes in investigation pipelines and, in some cases, simulate changes to software processes to estimate impacts. Generally, the user device 135 may have data stored but not depicted in graphical user interfaces until, or in response to, user interactions that are processed by a client-side application to present new data or graphical user interfaces. In some cases, the user device 135 may transmit requests or receive updates from the investigation UI manager 706A to display additional data, or to transmit user selections and/or interactions. In some cases, certain graphical user interfaces may be omitted (e.g., if user interactions do invoke those graphical user interfaces). In some cases, the graphical user interfaces may be conditioned on previous graphical user interfaces. In some cases, the graphical user interfaces may be displayed in response to different user interactions (e.g., from different graphical user interfaces).

In FIG. 16A, GUI 1600A may depict data 1600A-1 for a software process, and a start investigation element 1600A-2. The data 1600A-1 for the software process may be analytics, graphics, metadata, and the like. The start investigation element 1600A-2 may be user-selectable to start an investigation of the software process.

In FIG. 16B, GUI 1600B may depict user-selectable goals of the investigation 1600B-1 which are associated with parameters available through the parameter engine 704C to be used in an investigation, including default goals that may be made available by the platform 105, such as a first goal 1600B-2, a second goal 1600B-3, and a new (user defined) goal 1600B-4. The user may make selections of a goal. The first goal 1600B-2 may, for example, correspond to a process duration parameter, the second goal 1600B-3 may, for example, correspond to a compliance parameter, and the new goal 1600B-4 may launch a user interface to create new, user-defined or system-defined parameters.

In FIG. 16C, GUI 1600C may depict types of new user-defined or system-defined parameters 1600C-1 that can be used to define a new goal. The types of new parameters 1600C-1 may include, for example, a count parameter 1600C-2 and an error parameter 1600C-3. The user may make a selection of the type of parameter and make further selections to define the features of the parameter.

In FIG. 16D, GUI 1600D may depict a new count parameter 1600D-1. The user may select between, for example, counts of activities 1600D-2, sequences 1600D-3, and attributes 1600D-4. In GUI 1600D, the activities 1600D-2 may be selected and display user input elements 1600D-5 to adjust features of the parameter. For example, the user may specify a parameter that counts the number of activities performed by a certain type of user of the process, obtains a percentage of activities on a per-user-type basis, or counts the number of cases with activities by particular types of users. The GUI 1600C may depict a preview showing a numerical figure corresponding to the selections in the user input elements, e.g., a count of all activities by a certain type of user.

In FIG. 16E, GUI 1600E may depict the sequences 1600D-3 as a selected parameter type and display elements 1600E-1 to adjust features of the parameter. For example, the user may specify a parameter that counts the number of direct progressions (sequences) in a software process from an activity performed by one type of user to an activity performed by another type of user. The parameter may include a count of the absolute number of such progressions, a percentage of such progressions out of all progressions, or a count of the number of cases with such progressions. The GUI 1600E may depict a preview showing a numerical figure corresponding to the selections in the user input elements, e.g., a count of all progressions in a software process from an activity performed by one type of user to an activity performed by another type of user.

In FIG. 16F, GUI 1600F may depict the attributes 1600D-4 as a selected parameter type and display elements 1600F-1 to adjust features of the parameter. For example, the user may specify a parameter that counts the number of cases with a particular attribute, the count being an absolute number of cases or a percentage of cases with that attribute out of all cases. The GUI 1600F may depict a preview showing a numerical figure corresponding to the absolute number of all cases having that attribute.

In FIG. 16G, GUI 1600G may depict process filters 1600G-1 after selecting a parameter. The process filters 1600G-1 may include time period element 1600G-2 and reference element 1600G-3. The time period element 1600G-2 may select start and end times (or specify all the time the software process has been running), and the reference element 1600G-3 may be a user-selectable category, such as average, mean, mode, median for different populations. The user may select a number of additional attributes for the investigation, including duration of the process and inclusions or exclusion of particular activities within the process. Users may also specify custom attributes associated with the software process to further refine the processes in which to run the investigation.

In FIG. 16H, GUI 1600H may depict a set of factors 1600G-6 determined by process mining performed by the analytics engine 704B and/or the impact engine 706C and based on the selected parameter and filters selected in GUI 1600G. The GUI 1600H may default to a list of key factors 1600H-2 (currently depicted) but the user may navigate via links to other lists, such as filtered lists. For instance, the links may include a link to a list of attribute factors 1600H-3, a list of repetition factors 1600H-4, a list of activity factors 1600H-5, and a list of sequence factors 1600H-6. The first set of factors 1600G-6 may display factors ordered in decreasing impact on the software process, along with certain analytics and an option to add the factor to a thread.

In some cases, the GUI 1600H may depict various sets of factors, based on the current state of the thread. For instance, the GUI 1600H may depict:
a. With no factors added: attribute factors and repetition factors;
b. With only an attribute value factor added: attribute factors, repetition factors, activity factors, sequences factors;
c. With an activity/sequence factor added: attribute factors;
d. with only a repetition factor added: attribute factors, activity factors, and sequence factors.

In some cases, the set of factors (e.g., the first set of factors 1600G-6) may display a user-selectable element to suppress a factor from the set of factors. In response to a user selection of the user-selectable element to suppress ("user suppression"), the platform 105 may exclude the suppressed factor from the investigation, thereby enabling the user to disregard factors deemed not relevant to the analysis of the software process. The suppressed factor may not alter the set of data (e.g., remove cases with the suppressed factor from the set of data). Instead, the suppressed factor may be removed from the user interface, as the user.

In FIG. 16I, GUI 1600I may depict the attribute factors 1600H-3 in an attribute view 1600I-1. The attribute view 1600I-1 may filter from all factors to only factors related to attributes (data fields in records included in the investigation). In some cases, values for one attribute (i.e., factor) may be displayed adjacent to data for other values of that attribute to show, for instance, relative impact and/or influence of the one attribute (i.e., factor). For example, for a mortgage origination process, one state in which the mortgage is being originated may have an overly large impact on the average duration of all mortgage originations. GUI 1600I-2 may depict the average duration of the mortgage origination processes in that state, the influence and the impact of the mortgage originations in that state, and provide similar data for mortgage originations in other states, to provide insight into the factors influencing the efficiency of the mortgage origination process. GUI 1600I-2 may depict the influence, number of cases, average process duration, and impact associated with the various values for the attribute. The data for various values for a particular attribute may be displayed by various methods, including as bar graphs, tables, line graphs, and the like.

In some cases, the GUI 1600I may depict attribute factors grouped based on data field. The GUI 1600I may depict categorical case attributes and event attributes that are present for a software process. For instance, the GUI 1600I may depict, for each attribute value, one or combinations of:
a. A number of cases that contain the attribute value;
b. A percentage defined as follows: (number of cases with attribute value)/(overall case count);
c. Mean or median duration of cases that contain the attribute value; and
d. A ratio defined as follows: (mean/median duration of cases with attribute value)/(overall mean/median duration of cases).

In some cases, the platform 105 may calculate impacts for each attribute value, normalized annually, in accordance with Equation 15.

Impact Value of Attribute Factor=((mean/median cycle time of cases that include the value−mean/median cycle time of all cases with investigation filters ("baseline data"))*count of cases with attribute value)/(number of months in baseline data/12)  Equation 15:

In some cases, the platform 105 may sort the grouped attribute factors based on an influence metric for the data field. For instance, the platform 105 may determine the impact of all attribute values of a data field (e.g., attribute factors), and determine the influence metric based on the impact values. In some cases, the platform 105 may calculate the influence metric in accordance with Equation 16.

Influence Metric of Attribute Data Field=sum of all positive impact values of attribute values for data field.  Equation 16:

In some cases, the influence metric may be calculated based on a variance of the attribute values.

In some cases, the GUI 1600I may depict, e.g., in a non-collapsed section, one or combinations of:
a. Attribute: attribute name of data field;
b. Influence metric: Sum of all positive impact elements of an attribute. In some cases, the influence metric may be displayed as a progress bar that scales by the attribute that has the largest influence metric; and
c. A count of unique attribute values for the data field.

In some cases, the GUI 1600I may depict, in a grid section for a data field, a list of attribute values sorted by descending impact values, including one or combinations of:
a. A value: attribute value name;
b. An influence element: a scaled progress bar of the impact value of the individual attribute value. The progress bar may be scaled to show the influence of the attribute relative to the influence of the attribute with the highest influence;
c. Cases: a count and percentage of cases that include the attribute value;
d. Mean/Median Duration: mean/median duration of cases that include the attribute value;
e. A ratio of the mean/median duration to the overall duration; and
f. An impact (days): a numerical representation of the number of days by which a particular attribute value has lengthened all instances of the process.

In FIG. 16J, GUI 1600J may depict the repetition factors 1600H-4 in a repetition view 1600J-1. The repetition view 1600J-1 may filter from all factors to only factors related to repetitions, i.e., an activity that occurs more than one time in a row in a process, with no intervening activities. GUI 1600J may depict the number of cases, average process duration, and impact associated with the displayed repetition factors.

In some cases, the GUI 1600J may depict, for each repetition value (e.g., each such direct loop of the software process), one or combinations of:
a. A number of cases that contain the loop;
b. A percentage as defined by: (number of cases that contain the repetition)/(overall case count);
c. An mean/median duration of cases that contain the attribute;
d. A ratio as defined by: (average duration of cases that contain the repetition)/(overall case count);
e. An Impact Value as defined by Equation 16, below; and
f. An impact percentage as defined by: (impact value of repetition)/(maximum value of a highest repetition impact).

Impact Value of Repetition Factor=((mean/median cycle time of cases that include the repetition−mean/median cycle time of all cases of baseline data)*count of cases with repetition)/(a number of months in baseline data/12)  Equation 16:

In FIG. 16K, GUI 1600K may depict activity factors 1600H-5 in an activity view 1600K-1. The activity view 1600K-1 may filter from all factors to only factors for activities. GUI 1600K may depict the number of events, average activity duration, and total activity duration for the displayed activity factors.

In some cases, the GUI 1600K may depict, for each activity, one or combinations of:
a. A count of activity executions;
b. A percentage as defined by: (count of activity executions)/(overall case count in baseline data);
c. A mean/median of activity duration for activity factor;
d. A total activity duration as defined by: (mean/median of activity duration*the count of activity executions); and
e. A percentage as defined by: (total activity duration)/(total case duration).

In FIG. 16L, GUI 1600L may depict sequence factors 1600H-6 in a sequence view 1600KL1. The sequence view 1600KL1 may filter out all factors other than sequence factors. GUI 1600L may depict the number of events, average sequence duration, and total sequence duration for the displayed sequence factors.

In some cases, the GUI 1600L may depict, for each sequence (branches between nodes of a software process that do not loop back), one or combinations of:
a. A count of sequence executions;
b. A percentage as defined by: (count of sequence executions)/(overall case count);
c. An mean/median sequence duration;
d. Total sequence duration as defined by: (mean/median sequence duration*count of sequence executions); and
e. A percentage as defined by: (total sequence duration)/(total case duration).

In FIG. 16M, GUI 1600M may depict more data for related factors 1600M-1 in context of the first set of factors 1600G-6. In this case, the data for related factors 1600M-1 may include an impact summary of a factor which, for example, may provide an insight about how to make a software process more efficient, such as how many days would be saved if the cases with the factor were to match the duration of the average case.

In FIG. 16N, GUI 1600N may depict an updated state reflecting that a factor has been added to a thread 1600N-1. In this case, the set of factors 1600G-6 have been updated to a first new set of factors 1600N-2, as the process mining data has been filtered (based on the thread set of factors 1600N-1) and the one or more factors have been re-determined, as discussed herein. The GUI 1600N may also depict an insight panel 1600N-3. The insight panel 1600N-3 may display analytics of cases based on the thread 1600N-1 and a simulation based on the thread 1600N-1. The simulation may determine an estimate of an impact from a change to the software process if the factors of the thread 1600N-1 were improved.

In FIG. 16O, GUI 1600O may depict an updated state reflecting that a factor has been added to the thread, thereby updating the thread 1600N-1 to new thread 1600O-1. In this case, the set of factors 1600N-2 have been updated to a second new set of factors 1600O-2, as the process mining data has been filtered (based on the new thread 1600O-1) and the one or more factors have been re-determined, as discussed herein. The GUI 1600O may also depict an insight panel 1600O-3. The insight panel 1600O-3 may display analytics of cases based on the new thread 1600O-1 and a simulation based on the new thread 1600O-1. The simulation may determine an estimate of an impact from a change to the software process if the factors of the new thread 1600O-1 were improved.

In some cases, the thread (e.g., thread 1600N-1 or new thread 1600O-1) may depict factors added to the thread, analytics of the factors added to the thread, and a simulated impact (e.g., in insight panel 1600N-3 and insight panel 1600O-3). The analytics and simulated impact may be updated as new factors are added or removed from the thread.

In some cases, the impact factors, the influence factors, the analytics, and the types of factors may be adjusted based on what factors have been added to the thread.

In the case of adding an attribute value as a factor to the thread, the platform 105 may determine and depict various data in accordance with metrics and values related to the attribute value (e.g., process time, number or percentage related cases, number or percentage of related activities, number or percentage of related sequences, differences from baseline, etc.). For instance, the platform 105 may determine and depict at least various data in accordance with the following:
a. Metrics for cases that include the attribute value;
b. Calculations for the overall cycle process time;
c. Attributes, repetitions, activities, and sequences as available options;
d. Impact calculations for attribute values and repetitions as defined by: ((mean/median cycle time of cases that contain the attribute value/repetition, including all attribute values that have been added as a factor)−(mean/median cycle time of all cases with investigation filters)*(count of case with attribute value or repetition plus including all attribute values tht have been added as a factor))/number months in data/12);
e. Impact calculation for activities and sequences: ((mean/median cycle time of activity/sequence duration including all attribute values that have been added as a factor)−(mean/median cycle time of activity/sequence duration without factors and only including the investigation filters)*(count of activity/sequences including factors))/(number of months in data/12).

In the case of adding a repetition value as a factor to the thread, the platform 105 may determine and depict various data in accordance with metrics and values related to the repetition value (e.g., process time, number or percentage related cases, differences from baseline, etc.). For instance, the platform 105 may determine and depict at least various data in accordance with the following:
   a. Metrics for cases in which the loop exists;
   b. Calculations for the overall cycle process time. The platform 105 may determine that when a user selects a repetition, the user wants to look at the cases in which the repetition exists to determine what attributes are most correlated with the repetition occurring;
   c. Attributes, activities, and sequences as available options;
   d. Impact calculation for attribute values as defined by: ((mean/median duration of cases that contain the attribute value and the repetition added as a factor)–(mean/median duration of cases of only the repetition factor with investigation filters)*(count of cases with attribute value plus factors))/(number months in data/12);
   e. Impact calculation for activities and sequences: ((mean/median cycle time of activities/sequences that contain the repetition added as a factor)–(mean/median cycle time of activity/sequence duration without factors and only including the investigation filters)*(count of activity/sequence including factors))/(number of months in data/12).

In the case of adding an activity value as a factor to the thread, the platform 105 may determine and depict various data in accordance with metrics and values related to the activity value (e.g., process time, number or percentage related cases, differences from baseline, etc.). For instance, the platform 105 may determine and depict at least various data in accordance with the following:
   a. Metrics for cases having a specific activity duration that exceeds a threshold. The platform 105 may determine that when a user selects an activity, the user wants to analyze how they can improve the cycle time of that activity;
   b. Impact calculation for attribute values as defined by: ((mean/median duration of factor activities that contain the attribute value)–(mean/median duration of factor activities with investigation filters)*(count of cases with the factor activities with attribute value))/(number of months in data/12).

In the case of adding a sequence value as a factor to the thread, the platform 105 may determine and depict various data in accordance with metrics and values related to the sequence value (e.g., process time, number or percentage related cases, deltas from baseline, etc.). For instance, the platform 105 may determine and depict at least various data in accordance with the following:
   a. Metrics for cases with the specific sequence. The platform 105 may determine that when a user selects a specific sequence, the user is looking to evaluate improvement opportunities for that specific sequence. For instance, this may be valuable to look at ways to reduce waiting time, and when activities are single timestamps so that sequence durations reflect activity durations;
   b. Impact calculation for attribute values as defined by: ((mean/median duration of factor sequences that contain the attribute value)–(mean/median duration of factor sequences with investigation filters)*(count of cases with factor paths with attribute value))/number months in data/12).

In FIG. 16P, GUI 1600P may depict a save insight panel 1600P-1. The save insight panel 1600P-1 may enable user selections to name, describe, and add users who are able to view or modify the investigation and, thus, see the insight.

In FIG. 16Q, GUI 1600Q may depict a simulation panel 1600Q-1. The simulation panel 1600Q-1 may display analytics for the thread 1600N-1, simulation parameters of a simulation, and estimated impacts of changing the software process. The simulation panel 1600Q-1 may also include a simulation adjustment request element 1600Q-2 to launch an adjustment panel.

In FIG. 16R, GUI 1600R may depict an adjustment panel 1600R-1. The adjustment panel 1600R-1 may enable user selections to adjust target duration to complete an activity associated with a software process and improvement potential as a percentage of activities that could be improved to meet the target duration.

Turning to FIG. 17, the flowchart 1700 may depict operations to find factors affecting performance of software processes in investigation pipelines. The flowchart 1700 may be performed by one or more components described herein, such as the process mining system 110.

In block 1702, the process mining system 110 may provide, to a user device, a first graphical user interface. The first graphical user interface may include a user-selectable-parameter element and at least one representation of at least one process, as discussed herein.

In block 1704, the process mining system 110 may, in response to a user selection of a first representation corresponding to a first process, launch a guided investigation of the first process based on a current setting of the user-selectable-parameter element, as discussed herein.

In block 1706, the process mining system 110 may, upon completion of the guided investigation of the first process, provide a second graphical user interface. The second graphical user interface may be configured to provide data regarding the first process based on user interactions during the guided investigation, as discussed herein.

Computer System

Figure 18:
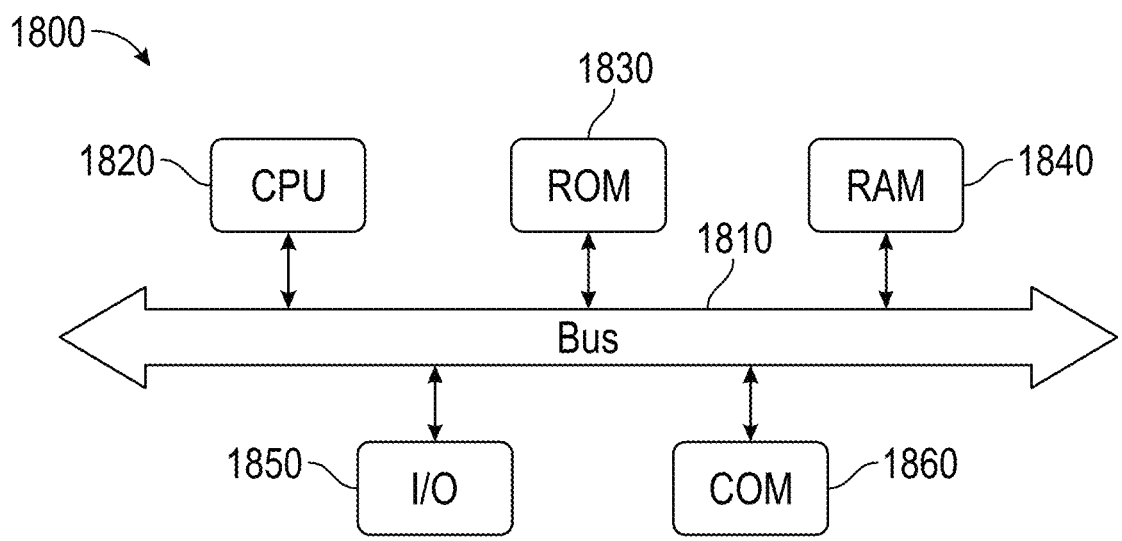
FIG. 18 depicts an example system that may execute techniques presented herein.

FIG. 18 depicts an example system that may execute techniques presented herein. FIG. 18 is a simplified functional block diagram of a computer that may be configured to execute techniques described herein, according to exemplary cases of the present disclosure. Specifically, the computer (or "platform" as it may not be a single physical computer infrastructure) may include a data communication interface 1860 for packet data communication. The platform may also include a central processing unit ("CPU") 1820, in the form of one or more processors, for executing program instructions. The platform may include an internal communication bus 1810, and the platform may also include a program storage and/or a data storage for various data files to be processed and/or communicated by the platform such as ROM 1830 and RAM 1840, although the system 1800 may receive programming and data via network communications. The system 1800 also may include input and output ports 1850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Examples

Exemplary embodiments of the systems and methods disclosed herein are described in the numbered paragraphs below.

A1. A system for guided process mining, the system comprising: at least one processor; and at least one memory configured to store instructions that, when executed by the at least one processor, cause the at least one processor to perform operations, wherein the operations include: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

A2. The system of A1, wherein the user-selectable-parameter element comprises a plurality of predefined parameters, each parameter corresponding to a different aspect of process optimization.

A3. The system of A2, wherein the predefined parameters include at least one of: cost reduction, decreased time for part or all of a process, resource optimization, quality improvement, or compliance adherence.

A4. The system of A1, wherein the user-selectable-parameter element corresponds to a parameter of a set of parameters.

A5. The system of A4, wherein the set of parameters include one or combinations of: an end-to-end duration parameter, an activity duration at a node, a node-to-node duration parameter, a cost parameter, a revenue parameter, an error parameter, a compliance parameter, a user-defined parameter, and a factor-based parameter.

A6. The system of A1, wherein the guided investigation includes a series of prompts provided to the user, the prompts being configured to display an ordered list of factors.

A7. The system of A6, wherein the prompts are dynamically generated based on the current setting of the user-selectable-parameter element and the first process's historical data.

A8. The system of A6, wherein the list of factors is prioritized based on the selected parameter.

A9. The system of A8, wherein the list of factors includes at least one of: attributes, repetitions of process steps, activities, sequences, users, groups, regions, or event data associated with the at least one process or data used in the at least one process.

A10. The system of A8, wherein the system further comprises a user interface element for allowing the user to select a factor from the list of factors, and in response to the user selection, the system updates the order of the series of prompts to prioritize the selected factor.

A11. The system of A10, wherein the operations further include updating the dataset associated with the first process based on the user's selection of the factor, thereby refining the guided investigation to focus on areas of the first process that are directly related to the selected factor.

A12. The system of A10, wherein, upon updating the dataset, the system provides a display of a new ordered list of factors, reflecting the prioritization of the selected factor and any subsequent changes in the relevance of the remaining factors.

A13. The system of A6, wherein the order of the list of factors is determined based on a cost function.

A14. The system of A13, wherein the cost function is a gradient ascent algorithm.

A15. The system of A13, wherein each factor in the list of factors is displayed alongside an impact assessment that evaluates the effect of the factor on the first process.

A16. The system of A13, wherein the operations further include filtering the dataset associated with the first process to refine the guided investigation, the filtering being based on successive selections of factors from the list of factors, thereby allowing for a more targeted analysis of the first process.

A17. The system of A16, wherein the list of factors is dynamically adjusted based on the filtered dataset to reflect the relevance of each factor in the context of the refined guided investigation.

A18. The system of A17, wherein the system further comprises a user interface element for allowing the user to suppress a factor from the list of factors, and in response to the user suppression, the system excludes the suppressed factor from the guided investigation, thereby enabling the user to disregard factors deemed not relevant to the analysis of the first process.

A19. The system of A1, wherein the second graphical user interface includes interactive elements that allow the user to simulate changes to the first process and view potential outcomes.

A20. The system of A19, wherein the interactive elements for simulating changes include sliders, checkboxes, or input fields to adjust simulation parameters of the first process.

A21. The system of A1, wherein the second graphical user interface provides estimated impacts based on changes to the first process.

A22. The system of A21, wherein the estimated impacts provided in the second graphical user interface are calculated using a predictive model that takes into account the user interactions during the guided investigation and historical data of the first process.

A23. The system of A22, wherein the predictive model is updated in real-time based on the user's interactions with the second graphical user interface.

A24. The system of A1, wherein the operations further include storing a record of the guided investigation, including user selections and inputs, to facilitate subsequent analysis or audits of the process mining activity.

A25. A computer-implemented method for guided process mining, the computer-implemented method comprising: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

A26. A non-transitory computer readable medium storing instructions that, when executed by at least processor, cause the at least processor to execute a method for guided process mining, wherein the method comprises: providing, to a user device, a first graphical user interface, wherein the first graphical user interface includes a user-selectable-parameter element and at least one representation of at least one process; in response to a user selection of a first representation corresponding to a first process, launching a guided investigation of the first process based on a current setting of the user-selectable-parameter element; and upon completion of the guided investigation of the first process, providing a second graphical user interface, wherein the second graphical user interface is configured to provide data regarding the first process based on user interactions during the guided investigation.

B1. A system for process mining using an integrated set of data from one or more systems, the system comprising: at least one processor; and at least one memory configured to store instructions that, when executed by the at least one processor, cause the at least one processor to perform operations, wherein the operations include: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

B2. The system of B1, wherein, before obtaining the schema of the set of data fields and the set of relationships, in response to a user selection of a first representation corresponding to the first process, launch the guided development interface for the investigation pipeline of the first process; and in response to launching the guided development interface, obtain the schema of the set of data fields and the set of relationships.

B3. The system of B1, wherein the set of relationships includes nested relationships between data fields, and wherein the data field selection element of the second graphical user interface enables a user to select data fields based on the nested relationships within the data in the one or more databases or the platforms that can be accessed in the first process.

B4. The system of B3, wherein the nested relationships are represented in a hierarchical structure, and wherein the data field selection element allows for the expansion and collapse of hierarchical levels to facilitate user selection of data fields.

B5. The system of B4, wherein the investigation pipeline is further configured to obtain process mining data that includes data from multiple levels of the hierarchical structure based on the user's selection of nested data fields.

B6. The system of B5, wherein the guided development interface provides visual indicators of the nested relationships, thereby aiding the user in understanding the hierarchy and connectivity of the data fields within the data in the one or more databases or the platforms that can be accessed by the first process.

B7. The system of B1, wherein the operations further include populating the preview element of the second graphical user interface with a preview of data corresponding to the selected data fields from the set of data fields.

B8. The system of B7, wherein the preview element is configured to update dynamically in response to each user selection or deselection of data fields within the data field selection element.

B9. The system of B8, wherein the preview element provides a sample subset of the process mining data for the first process, allowing the user to verify the relevance and accuracy of the selected data fields before generating the investigation pipeline.

B10. The system of B9, wherein the preview element includes interactive features that enable the user to sort, filter, or search within the previewed data based on user-defined criteria.

B11. The system of B1, wherein the operations further include recommending a subset of data fields from the set of data fields for selection.

B12. The system of B11, wherein the recommended subset of data fields is determined based on a data type of the data fields, a cardinality of underlying data for the data fields, and/or a frequency of use in previous investigation pipelines.

B13. The system of B11, wherein the guided development interface is further configured to highlight the recommended subset of data fields within the data field selection element to guide the user in the selection process.

B14. The system of B1, wherein the operations further include generating a custom data field by combining or transforming selected existing data fields from the set of data fields based on user selection(s) in the guided development interface.

B15. The system of B14, wherein combining the selected existing data fields includes performing mathematical operations, concatenations, or logical operations on data of the selected existing data fields to create the custom data field.

B16. The system of B14, wherein transforming the selected existing data fields includes applying data transformation functions on data of the selected data fields to create the custom data field.

B17. The system of B14, wherein the guided development interface provides a custom field creation element that enables the user to specify the operations for generating the custom data field.

B18. The system of B17, wherein the custom field creation element includes a user interface for entering formulas or selecting functions to apply to the selected existing data fields for the creation of the custom data field.

B19. The system of B14, wherein the operations further include generating a second custom data field based on the custom data field.

B20. The system of B19, wherein the second custom data field is generated by applying additional data transformation functions to the custom data field.

B21. The system of B19, wherein the guided development interface provides a second custom field creation element that enables the user to specify operations for generating the second custom data field using data of the custom data field.

B22. The system of B21, wherein the second custom field creation element includes a user interface for entering formulas or selecting functions to apply to the data of the custom data field for the creation of the second custom data field.

B23. The system of B1, wherein the operations further include filtering the process mining data for the first process before populating the process mining data in the process mining system.

B24. The system of B23, wherein the filtering includes removing data that does not meet selection criteria.

B25. The system of B23, wherein the selection criteria is specified by the user through the guided development interface, or by the process mining system.

B26. The system of B1, wherein the operations further include providing a semantic filter within the guided development interface, wherein the semantic filter is configured to refine the set of data fields based on semantic criteria.

B27. The system of B1, wherein the first graphical user interface includes an indicator for the first representation corresponding to the first process when the first process has event log features.

B28. The system of B27, wherein the event log features are programmatically defined for a developer of the first process.

B29. A computer-implemented method for process mining using an integrated set of data from one or more systems, the computer-implemented method comprising: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

B30. A non-transitory computer readable medium storing instructions that, when executed by at least processor, cause the at least processor to execute a method for process mining using an integrated set of data from one or more systems, wherein the method comprises: providing, to a user device, a first graphical user interface, wherein the first graphical user interface includes at least one representation of at least one process; obtaining a schema of a set of data fields and a set of relationships for a first process of the of at least one process, wherein the set of data fields correspond to data in one or more databases or platforms that can be accessed in the first process, and the set of relationships indicate connections between data fields in the set of data fields; generating and providing, in a guided development interface, a second graphical user interface, wherein the second graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

C1. A system for generating templated objects for process mining, the system comprising: at least one processor; and at least one memory configured to store instructions that, when executed by the at least one processor, cause the at least one processor to perform operations, wherein the operations include: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

C2. The system of C1, wherein the event logs comprise a timestamp indicating when the create, write, update, or delete actions occurred.

C3. The system of C2, wherein the event logs further comprise an identifier associated with the create, write, update, or delete actions.

C4. The system of C3, wherein the identifier is for a user who performed an action or an instantiation of the object.

C5. The system of C3, wherein the event logs further comprise a description of the create, write, update, or delete actions performed.

C6. The system of C5, wherein the event logs are configured to record the state of the object before and after the create, write, update, or delete actions.

C7. The system of C1, wherein the event logs are further configured to be written as a co-transaction with a respective create, write, update, or delete action.

C8. The system of C7, wherein the co-transaction is configured to succeed if both the event log entry and the associated create, write, update, or delete action are successfully completed.

C9. The system of C7, wherein the co-transaction is configured to fail if either the event log entry or the associated create, write, update, or delete action is not successfully completed.

C10. The system of C1, wherein updating the seed data includes adding additional event types to the event logs.

C11. The system of C10, wherein the additional event types include categories of business actions and/or categories of activity.

C12. The system of C10, wherein the updating the seed data includes receiving a text string based on a user input, and automatically modifying the data structure to automatically generate the event logs for the create, write, update, or delete actions based on the text string.

C13. The system of C1, wherein generating the object includes receiving user selections via an interface, the user selections being guided by one or more fields that are required for a create, write, update, or delete action, to thereby cause generation of associated event logs.

C14. The system of C13, wherein the interface provides visual indicators for the one or more fields that are required to guide the user in completing the create, write, update, or delete action.

C15. The system of C13, wherein the associated event logs generated are based on user selections in the one or more fields.

C16. The system of C13, wherein the user selections include choices from a set of predefined options presented within the interface.

C17. The system of C13, wherein the one or more fields are pre-populated with recommended data types.

C18. The system of C17, wherein the pre-populated recommended data types are determined by analyzing past event logs to identify common data types used in similar instances of the object.

C19. The system of C18, wherein the pre-population of recommended data types is further refined based on user role or permissions, ensuring that the data types are relevant to the user's context and authorization level.

C20. The system of C19, wherein the interface is configured to allow the user to accept, modify, or reject the pre-populated recommended data types before completing a create, write, update, or delete action.

C21. The system of C13, wherein the interface is configured to allow the user to create customized event fields for the create, write, update, or delete actions.

C22. The system of C21, wherein the customized event fields are associated with specific create, write, update, or delete actions, thereby enabling differentiated logging for various operations.

C23. A computer-implemented method for generating templated objects for process mining, the computer-implemented method comprising: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

C24. A non-transitory computer readable medium storing instructions that, when executed by at least processor, cause the at least processor to execute a method for generating templated objects for process mining, wherein the method comprises: receiving a request to initiate an object templating subroutine; in response to the request to initiate the object templating subroutine, obtaining a seed file, wherein the seed file contains seed data relating to an object to be generated, and the seed data includes code to automatically generate a data structure with fields associated with a set of data to perform event logging for create, write, update, or delete actions associated with the set of data; performing validation and/or update actions to the seed data to obtain production data; and generating the object by performing at least one action based on the production data, wherein the system includes code associated with a create, write, update, or delete action that automatically generate an event logs when any said create, write, update, or delete action occurs, and the event logs are automatically stored in the data structure and processed in a process mining process associated with the object.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for process mining using an integrated set of data from one or more systems, the system comprising:
   at least one processor; and
   at least one memory configured to store instructions that, when executed by the at least one processor, cause the at least one processor to perform operations, wherein the operations include:
      obtaining a schema of a set of data fields and a set of relationships for a first process, wherein the set of data fields correspond to data in one or more databases or platforms that can be accessed in the first process, and the set of relationships indicate connections between data fields in the set of data fields;
      generating and providing, in a guided development interface, a graphical user interface, wherein the graphical user interface provides a data field selection element and a preview element; and
      based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

2. The system of claim 1, wherein the first process is selected from a set of processes, and the system is configured, based on user selections, to generate one or more investigation pipelines for any one or more of the set of processes.

3. The system of claim 1, wherein the set of relationships includes nested relationships between data fields, and wherein the data field selection element of the graphical user interface enables a user to select data fields based on the nested relationships within the data in the one or more databases or the platforms that can be accessed in the first process.

4. The system of claim 3, wherein the nested relationships are represented in a hierarchical structure, and wherein the data field selection element allows for expansion and collapse of hierarchical levels to facilitate user selection of data fields.

5. The system of claim 4, wherein the investigation pipeline is further configured to obtain the process mining data that includes data from multiple levels of the hierarchical structure based on the user selection(s) of nested data fields.

6. The system of claim 5, wherein the guided development interface provides visual indicators of the nested relationships.

7. The system of claim 1, wherein the operations further include populating the preview element of the graphical user interface with a preview of data corresponding to at least selected data fields from the set of data fields.

8. The system of claim 7, wherein the preview element is configured to update in response to a user selection or deselection of a data field within the data field selection element.

9. The system of claim 8, wherein the preview element provides a sample subset of the process mining data for the first process.

10. The system of claim 9, wherein the preview element includes interactive features that enable a user to sort, filter, or search within previewed data based on user-defined criteria.

11. The system of claim 1, wherein the operations further include recommending a recommended subset of data fields from the set of data fields for selection.

12. The system of claim 11, wherein the recommended subset of data fields is determined based on a data type of the data fields, a cardinality of underlying data for the data fields, and/or a frequency of use in previous investigation pipelines.

13. The system of claim 11, wherein the guided development interface is further configured to highlight the recommended subset of data fields within the data field selection element to guide a user in a selection process.

14. The system of claim 1, wherein the operations further include generating a custom data field by combining or transforming selected existing data fields from the set of data fields based on the user selection(s) in the guided development interface.

15. The system of claim 14, wherein combining the selected existing data fields includes performing mathematical operations, concatenations, or logical operations on data of the selected existing data fields to create the custom data field.

16. The system of claim 14, wherein transforming the selected existing data fields includes applying data transformation functions on data of the selected existing data fields to create the custom data field.

17. The system of claim 14, wherein the guided development interface provides a custom field creation element that enables a user to specify the operations for generating the custom data field.

18. The system of claim 17, wherein the custom field creation element includes a user interface for entering formulas or selecting functions to apply to the selected existing data fields for creation of the custom data field.

19. A computer-implemented method for process mining using an integrated set of data from one or more systems, the computer-implemented method comprising:

obtaining a schema of a set of data fields and a set of relationships for a first process, wherein the set of data fields correspond to data in one or more databases or platforms that can be accessed in the first process, and the set of relationships indicate connections between data fields in the set of data fields;

generating and providing, in a guided development interface, a graphical user interface, wherein the graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

20. A non-transitory computer readable medium storing instructions that, when executed by at least processor, cause the at least processor to execute a method for process mining using an integrated set of data from one or more systems, wherein the method comprises:

obtaining a schema of a set of data fields and a set of relationships for a first process, wherein the set of data fields correspond to data in one or more databases or platforms that can be accessed in the first process, and the set of relationships indicate connections between data fields in the set of data fields;

generating and providing, in a guided development interface, a graphical user interface, wherein the graphical user interface provides a data field selection element and a preview element; and based on user selection(s) on the guided development interface, generating an investigation pipeline for the first process, wherein the investigation pipeline is configured to obtain process mining data for the first process in accordance with at least a subset of the set of data fields, and populate a process mining system with the process mining data for the first process.

* * * * *